US012641277B2

(12) United States Patent
Alshin et al.

(10) Patent No.:     US 12,641,277 B2
(45) Date of Patent:     *May 26, 2026

(54) VIDEO DECODING METHOD AND APPARATUS AND VIDEO ENCODING METHOD AND APPARATUS

(71) Applicant: SAMSUNG ELECTRONICS CO., LTD., Suwon-si (KR)

(72) Inventors: Alexander Alshin, Seoul (RU); Elena Alshina, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1 day.

This patent is subject to a terminal disclaimer.

(21) Appl. No.: 18/961,164

(22) Filed: Nov. 26, 2024

(65) Prior Publication Data

US 2025/0097451 A1     Mar. 20, 2025

Related U.S. Application Data

(63) Continuation of application No. 18/151,266, filed on Jan. 6, 2023, now Pat. No. 12,192,508, which is a
(Continued)

(51) Int. Cl.
H04N 19/139     (2014.01)
H04N 19/105     (2014.01)
(Continued)

(52) U.S. Cl.
CPC ......... H04N 19/513 (2014.11); H04N 19/105 (2014.11); H04N 19/139 (2014.11); H04N 19/159 (2014.11); H04N 19/176 (2014.11)

(58) Field of Classification Search
CPC .. H04N 19/513; H04N 19/176; H04N 19/159; H04N 19/139; H04N 19/105; H04N 19/117; H04N 19/109
(Continued)

(56) References Cited

U.S. PATENT DOCUMENTS 9,264,705 B2 *     2/2016  Lee ......................... H04N 19/48
9,571,852 B2 *     2/2017  Lim ......................... H04N 19/13
(Continued)

FOREIGN PATENT DOCUMENTS

CN        102934444 A      2/2013
CN        103460700 A      12/2013
(Continued)

OTHER PUBLICATIONS

Communication issued May 17, 2025 by the National Intellectual Property Administration, PRC in Chinese Patent Application No. 202310357090.9.
(Continued)

*Primary Examiner* — Tung T Vo
(74) *Attorney, Agent, or Firm* — Sughrue Mion, PLLC

(57)     ABSTRACT

Provided is a video decoding method including determining a displacement vector per unit time of pixels of a current block in a horizontal direction or a vertical direction, the pixels including a pixel adjacent to an inside of a boundary of the current block, by using values about reference pixels included in a first reference block and a second reference block, without using a stored value about a pixel located outside boundaries of the first reference block and the second reference block; and obtaining a prediction block of the current block by performing block-unit motion compensation and pixel group unit motion compensation on the current block by using a gradient value in the horizontal direction or the vertical direction of a first corresponding reference pixel in the first reference block which corresponds to a current pixel included in a current pixel group in the current block, a gradient value in the horizontal direction or the vertical direction of a second corresponding reference pixel in the second reference block which corresponds to the current pixel, a pixel value of the first corresponding refer-
(Continued)

ence pixel, a pixel value of the second corresponding reference pixel, and a displacement vector per unit time of the current pixel in the horizontal direction or the vertical direction. In this regard, the current pixel group may include at least one pixel.

3 Claims, 38 Drawing Sheets

Related U.S. Application Data continuation of application No. 17/317,331, filed on May 11, 2021, now Pat. No. 11,582,476, which is a continuation of application No. 16/476,173, filed as application No. PCT/KR2018/000181 on Jan. 4, 2018, now Pat. No. 11,051,033.

(60) Provisional application No. 62/442,108, filed on Jan. 4, 2017.

(51) Int. Cl.
*H04N 19/159* (2014.01)
*H04N 19/176* (2014.01)
*H04N 19/513* (2014.01)

(58) Field of Classification Search
USPC ................................................. 375/240.12
See application file for complete search history.

(56) References Cited

U.S. PATENT DOCUMENTS

| | | | | |
|---|---|---|---|---|
| 10,728,572 | B2 * | 7/2020 | Lee ...................... | H04N 19/573 |
| 10,986,367 | B2 * | 4/2021 | Lee ........................ | H04N 19/52 |
| 11,051,033 | B2 * | 6/2021 | Alshin ................. | H04N 19/117 |
| 11,582,476 | B2 * | 2/2023 | Alshin ................. | H04N 19/105 |
| 12,192,508 | B2 * | 1/2025 | Alshin ................. | H04N 19/117 |
| 2013/0083851 | A1 * | 4/2013 | Alshin ................. | H04N 19/577 |
| | | | | 375/240.14 |
| 2013/0094582 | A1 | 4/2013 | Wittman et al. | |
| 2015/0154468 | A1 * | 6/2015 | Li ........................... | G06T 5/008 |
| | | | | 382/197 |
| 2015/0229962 | A1 | 8/2015 | Kim et al. | |
| 2015/0350671 | A1 * | 12/2015 | Alshin ................. | H04N 19/105 |
| | | | | 375/240.15 |
| 2016/0037177 | A1 | 2/2016 | Park et al. | |
| 2018/0376165 | A1 * | 12/2018 | Alshin ................. | H04N 19/176 |
| 2019/0082192 | A1 * | 3/2019 | Chuang ................. | H04N 19/56 |
| 2019/0238880 | A1 * | 8/2019 | Lee ...................... | H04N 19/147 |
| 2019/0320199 | A1 * | 10/2019 | Chen .................... | H04N 19/105 |
| 2019/0349589 | A1 * | 11/2019 | Lee ...................... | H04N 19/105 |
| 2020/0053387 | A1 * | 2/2020 | Lee ...................... | H04N 19/139 |
| 2021/0281872 | A1 * | 9/2021 | Alshin ................. | H04N 19/139 |
| 2022/0150549 | A1 | 5/2022 | Kim et al. | |

FOREIGN PATENT DOCUMENTS

| | | |
|---|---|---|
| KR | 10-2010-0074137 A | 7/2010 |
| KR | 10-2014-0089486 A | 7/2014 |
| KR | 10-2015-0041760 A | 4/2015 |
| KR | 10-2015-0100355 A | 9/2015 |
| KR | 10-2015-0122106 A | 10/2015 |
| WO | 2014/107074 A1 | 7/2014 |
| WO | 2018/124329 A1 | 7/2018 |
| WO | 2018169989 A1 | 9/2018 |

OTHER PUBLICATIONS

Communication issued May 17, 2025 by the National Intellectual Property Administration, PRC in Chinese Patent Application No. 202310354269.9.

Communication issued May 21, 2025 by the National Intellectual Property Administration, PRC in Chinese Patent Application No. 202310354285.8.
Communication issued May 23, 2025 by the National Intellectual Property Administration, PRC in Chinese Patent Application No. 202310354998.4.
Communication dated Apr. 1, 2025, issued by Intellectual Property India in Indian Application No. 202328053620.
Communication dated Feb. 17, 2025, issued by Intellectual Property India in Indian Application No. 202328053811.
Communication dated Feb. 4, 2025, issued by Intellectual Property India in Indian Application No. 202328053741.
Communication dated Mar. 11, 2025, issued by the Japanese Patent Office in Japanese Application No. 2024-032612.
Chen et al., "Algorithm Description of Joint Exploration Test Model 7 (JEM 7)", Joint Video Exploration Team (JVET) of ITU-T SG 16 WP 3 and ISO/IEC JTC 1/SC 29/WG 11, JVET-G1001-v1, 2017 (48 pages total).
Hsiao-Chiang Chuang et al. "A block-based design for Bi-directional optical flow (BIO)" JVET of ITU-T SG 16 WP 3 and ISO/IEC JTC 1/SC 29/WG 11, 6th Meeting: Hobart, AU, Mar. 31-Apr. 7, 2017, JVET-F0022, XP030150669.
A. Alshin et al. "AHG6: On BIO memory bandwidth" JVET Meeting; Oct. 15, 2016-Oct. 21, 2016, 4th Meeting: Chengdu, (5 pages total) XP030150270.
Jianle Chen et al. "Algorithm description of Joint Exploration Test Model 3" JVET 3rd Meeting: Geneva, May 26-Jun. 1, 2016, (35 pages total) XP030150223.
Search Report dated Apr. 26, 2018, issued by the International Searching Authority in International Application No. PCT/KR2018/000181 (PCT/ISA/210).
Written Opinion dated Apr. 26, 2018, issued by the International Searching Authority in International Application No. PCT/KR2018/000181 (PCT/ISA/237).
Communication dated Sep. 12, 2023 issued by the European Patent Office in counterpart European Application No. 23185207.0.
Communication dated Oct. 17, 2023 issued by the Japanese Intellectual Property Office in counterpart Japanese Application No. 2022-209181.
Communication issued May 22, 2023 by the European Patent Office for EP Patent Application No. 18736440.1.
Communication issued Apr. 26, 2023 by the European Patent Office for EP Patent Application No. 18736440.1.
Communication issued Jul. 4, 2023 by the Indian Patent Office for IN Patent Application No. 201927031054.
Communication dated Sep. 3, 2024, issued by IP Australia in Australian Application No. 2023285833.
Communication issued Mar. 7, 2022 by the Australian Patent Office in Australian Patent Application No. 2018206271.
Communication issued Mar. 31, 2022 by the State Intellectual Property Office in the People's Republic of China in Chinese Patent Application No. 201880017180.0.
Communication issued Mar. 16, 2021 by the Intellectual Property Office of India in counterpart Indian Patent Application No. 201927031054.
Communication issued Apr. 26, 2022 by the Japanese Patent Office in Japanese Patent Application No. 2021-54050.
Communication dated Oct. 25, 2019, from the European Patent Office in counterpart European Application No. 18736440.1.
Communication dated Nov. 29, 2022 issued by the Japanese Patent Office in application No. 2021-054050.
Communication dated Jul. 5, 2022 issued by the European Patent Office in counterpart European Application No. 18 736 440.1.
Communication dated Jun. 10, 2020, from the European Patent Office in counterpart European Application No. 18736440.1.
U.S. Appl. No. 18/151,266, filed Jan. 6, 2023.
U.S. Appl. No. 17/317,331, filed May 11, 2021.
U.S. Appl. No. 16/476,173, filed Jul. 5, 2019.
Application No. PCT/KR2018/000181, Filed, Jan. 4, 2018.
U.S. Appl. No. 62/442,108, filed Jan. 4, 2017.
Communication issued Oct. 8, 2025 by the European Patent Office in European Patent Application No. 23185207.0.

(56)          References Cited

OTHER PUBLICATIONS

Communication issued Nov. 18, 2025 by the Japan Patent Office in
Japanese Patent Application No. 2025-064119.
Alshin, A. et al., "EE3: bi-directional optical flow w/o block
extension", Joint Video Exploration Team (JVET) of ITU-T SG 16
WP 3 and ISO/IEC JTC 1/SC 29/WG 11, 5th Meeting: Geneva, CH,
Jan. 12-20, 2017, Document: JVET-E0028. (6 pages total).

* cited by examiner

FIG. 1B

OBTAIN, FROM BITSTREAM, MOTION PREDICTION MODE INFORMATION ABOUT CURRENT BLOCK IN CURRENT PICTURE — S105

WHEN MOTION PREDICTION MODE INFORMATION INDICATES BI-DIRECTIONAL MOTION PREDICTION MODE, OBTAIN, FROM BITSTREAM, INFORMATION ABOUT FIRST MOTION VECTOR INDICATING FIRST REFERENCE BLOCK OF CURRENT BLOCK IN FIRST REFERENCE PICTURE AND INFORMATION ABOUT SECOND MOTION VECTOR INDICATING SECOND REFERENCE BLOCK OF CURRENT BLOCK IN SECOND REFERENCE PICTURE — S110

DETERMINE DISPLACEMENT VECTOR OF PIXELS OF CURRENT BLOCK IN HORIZONTAL DIRECTION OR VERTICAL DIRECTION, PIXELS INCLUDING PIXEL ADJACENT TO INSIDE OF BOUNDARY OF CURRENT BLOCK, BY USING VALUES ABOUT REFERENCE PIXELS INCLUDED IN FIRST REFERENCE BLOCK AND SECOND REFERENCE BLOCK, WITHOUT USING STORED VALUE ABOUT PIXEL LOCATED OUTSIDE BOUNDARIES FIRST REFERENCE BLOCK AND SECOND REFERENCE BLOCK — S115

OBTAIN PREDICTION BLOCK OF CURRENT BLOCK BY PERFORMING BLOCK-UNIT MOTION COMPENSATION AND PIXEL GROUP UNIT MOTION COMPENSATION ON CURRENT BLOCK BY USING GRADIENT VALUE IN HORIZONTAL DIRECTION OR VERTICAL DIRECTION OF FIRST CORRESPONDING REFERENCE PIXEL IN FIRST REFERENCE BLOCK WHICH CORRESPONDS TO CURRENT PIXEL INCLUDED IN CURRENT PIXEL GROUP IN CURRENT BLOCK, GRADIENT VALUE IN HORIZONTAL DIRECTION OR VERTICAL DIRECTION OF SECOND CORRESPONDING REFERENCE PIXEL IN SECOND REFERENCE BLOCK WHICH CORRESPONDS TO CURRENT PIXEL, PIXEL VALUE OF FIRST CORRESPONDING REFERENCE PIXEL, PIXEL VALUE OF SECOND CORRESPONDING REFERENCE PIXEL, AND DISPLACEMENT VECTOR OF CURRENT PIXEL IN HORIZONTAL DIRECTION OR VERTICAL DIRECTION — S120

OBTAIN, FROM BITSTREAM, INFORMATION ABOUT RESIDUAL BLOCK OF CURRENT BLOCK — S125

RECONSTRUCT CURRENT BLOCK BASED ON PREDICTION BLOCK AND RESIDUAL BLOCK — S130

END

Mmin = ~2, Mmax = 3

| α | gradFilter$_\alpha$ |
|---|---|
| 0 | { 8, ~39, ~3, 46, ~17, 5 } |
| 1/4 | { 4, ~17, ~36, 60, ~15, 4 } |
| 1/2 | { ~1, 4, ~57, 57, ~4, 1 } |
| 3/4 | { 4, ~15, ~60, 36, 17, ~4 } |

FIG. 7B

Mmin = ~2, Mmax = 3

| α | fracFilter$_\alpha$ |
|---|---|
| 0 | { 0, 0, 64, 0, 0, 0 } |
| 1/4 | { 2, ~9, 57, 19, ~7, 2 } |
| 1/2 | { 1, ~7, 38, 38, ~7, 1 } |
| 3/4 | { 2, ~7, 19, 57, ~9, 2 } |

FIG. 7C

Mmin = ~3, Mmax = 4

| α | fracFilter$_\alpha$ |
|---|---|
| 0 | { 0, 0, 0, 64, 0, 0, 0, 0 } |
| 1/4 | { ~1, 4, ~10, 58, 17, ~5, 1, 0 } |
| 1/2 | { ~1, 4, ~11, 40, 40, ~11, 4, ~1 } |
| 3/4 | { 0, 1, ~5, 17, 58, ~10, 4, ~1 } |

FIG. 7D

| α | gradFilter$_\alpha$ |
|---|---|
| 0 | { 8, −39, −3, 46, −17, 5 } |
| 1/16 | { 8, −32, −13, 50, −18, 5 } |
| 1/8 | { 7, −27, −20, 54, −19, 5 } |
| 3/16 | { 6, −21, −29, 57, −18, 5 } |
| 1/4 | { 4, −17, −36, 60, −15, 4 } |
| 5/16 | { 3, −9, −44, 61, −15, 4 } |
| 3/8 | { 1, −4, −48, 61, −13, 3 } |
| 7/16 | { 0, 1, −54, 60, −9, 2 } |
| 1/2 | { −1, 4, −57, 57, −4, 1 } |

FIG. 7E

| α | fracFilter$_\alpha$ |
|---|---|
| 0 | { 0, 0, 64, 0, 0, 0 } |
| 1/16 | { 1, −3, 64, 4, −2, 0 } |
| 1/8 | { 1, −6, 62, 9, −3, 1 } |
| 3/16 | { 2, −8, 60, 14, −5, 1 } |
| 1/4 | { 2, −9, 57, 19, −7, 2 } |
| 5/16 | { 3, −10, 53, 24, −8, 2 } |
| 3/8 | { 3, −11, 50, 29, −9, 2 } |
| 7/16 | { 3, −11, 44, 35, −10, 3 } |
| 1/2 | { 3, −10, 35, 44, −11, 3 } |

| BLOCK SHAPE / DEPTH | 0: SQUARE | 1: NS_VER | 2: NS_HOR |
|---|---|---|---|
| DEPTH D | 2000 | 2010 | 2020 |
| DEPTH D+1 | 2002 | 2012 | 2022 |
| DEPTH D+2 | 2004 | 2014 | 2024 |
| ... | ... | ... | ... |

VIDEO DECODING METHOD AND APPARATUS AND VIDEO ENCODING METHOD AND APPARATUS

CROSS REFERENCE TO RELATED APPLICATIONS

This is a Continuation of U.S. application Ser. No. 18/151,266 filed Jan. 6, 2023, which is a continuation of U.S. application Ser. No. 17/317,331 filed May 11, 2021, which is a continuation of U.S. patent application Ser. No. 16/476,173, filed on Jul. 5, 2019, which is a National Stage Entry of PCT Application No. PCT/KR2018/000181, filed on Jan. 4, 2018, which claims priority from U.S. Provisional Application No. 62/442,108, filed on Jan. 4, 2017, in the United States Patent and Trademark Office, the disclosures of which are incorporated herein by reference in their entireties.

TECHNICAL FIELD

The disclosure relates to a video decoding method and apparatus and a video encoding method and apparatus. More particularly, the disclosure relates to video decoding and video encoding methods and apparatuses for performing inter prediction in a bi-directional motion prediction mode.

BACKGROUND ART

With the development and spread of hardware capable of reproducing and storing high-resolution or high-definition video content, the need for a video codec that effectively encodes or decodes high-resolution or high-definition video content is increasing. According to an existing video codec, video is encoded according to a limited encoding scheme based on coding units having a tree structure.

Image data in a spatial domain is transformed into coefficients in a frequency domain by using a frequency transform. To perform a fast calculation in the frequency transform, a video codec splits an image into blocks having a predetermined size, performs discrete cosine transform (DCT) transformation on each of the blocks, and thus encodes frequency coefficients in each block unit. Compared to the image data in the spatial domain, the coefficients in the frequency domain are easily compressed. Because an image pixel value in the spatial domain is expressed as a prediction error via inter prediction or intra prediction by the video codec, when the frequency transform is performed on prediction errors, much data may be transformed into 0. The video codec decreases an amount of data by changing data, which occurs sequentially and repeatedly, into small-sized data.

DESCRIPTION OF EMBODIMENTS

Technical Problem

According to various embodiments, a predicted pixel value of a current block may be generated by using not only a pixel value of a first reference block of a first reference picture and a pixel value of a second reference block of a second reference picture in a bi-directional motion prediction mode but also using a first gradient value of a first reference block and a second gradient value of a second reference block. Therefore, a prediction block similar to an original block may be generated such that encoding and decoding efficiency may be enhanced.

The pixel value of the first reference block, the pixel value of the second reference block, the first gradient value of the first reference block, and the second gradient value of the second reference block may be used to determine a displacement vector of the current block in a horizontal direction or a vertical direction when pixel group unit motion compensation is performed. In particular, to determine a displacement vector of a current pixel in the current block in a horizontal direction or a vertical direction, not only a pixel value and a gradient value of a first reference pixel in the first reference block, the first reference pixel corresponding to the current pixel, and a pixel value and a gradient value of a second reference pixel in the second reference block but also pixel values and gradient values of neighboring pixels included in a window having a predetermined size with respect to the first reference pixel and the second reference pixel are used. Therefore, when the current pixel is located at a boundary, there is a problem that an additional access to a memory is required because, when a neighboring pixel of a reference pixel corresponding to the current pixel is located outside a reference block, a pixel value and a gradient value of a pixel located outside the reference block have to be referenced.

According to various embodiments, the displacement vector of the current block in the horizontal direction or the vertical direction is determined by referring to only a pixel value and a gradient value of a pixel located in the reference block, without referring to the pixel value and the gradient value that are stored with respect to the pixel located outside the reference block, such that the number of memory accesses may be minimized.

According to various embodiments, to determine a gradient value of the reference pixel in the horizontal direction or the vertical direction, a gradient filter and an interpolation filter in the horizontal direction or the vertical direction that use an input of a pixel value of an integer pixel are not used, but instead, a pixel value of a pixel at a location of a fractional pixel unit is determined by applying the interpolation filter to the pixel value of the integer pixel, and the gradient value of the reference pixel in the horizontal direction or the vertical direction is determined by applying the gradient filter in the horizontal direction or the vertical direction to the pixel value of the pixel at the location of the fractional pixel unit, the gradient filter having a relatively less length, such that the number of complicated multiplication operations may be minimized.

According to various embodiments, motion compensation is performed in a pixel group unit, such that the number of complicated multiplication operations may be minimized, compared to motion compensation performed in a pixel unit.

Provided is a computer-readable recording medium having recorded thereon a program for executing a method according to various embodiments.

The technical problems of various embodiments are not limited to the aforementioned features, and other unstated technical problems will be clearly understood by one of ordinary skill in the art in view of descriptions below.

Solution to Problem

The technical problems of the present disclosure are not limited to the aforementioned features, and other unstated technical problems will be clearly understood by one of ordinary skill in the art in view of descriptions below.

According to various embodiments, a video decoding method may include obtaining, from a bitstream, motion prediction mode information about a current block in a current picture;

when the obtained motion prediction mode information indicates a bi-directional motion prediction mode, obtaining, from the bitstream, information about a first motion vector indicating a first reference block of a current block in a first reference picture and information about a second motion vector indicating a second reference block of the current block in a second reference picture;

determining a displacement vector per unit time of pixels of the current block in a horizontal direction or a vertical direction, the pixels including a pixel adjacent to an inside of a boundary of the current block, by using values about reference pixels included in the first reference block and the second reference block, without using a stored value about a pixel located outside boundaries of the first reference block and the second reference block;

obtaining a prediction block of the current block by performing block-unit motion compensation and pixel group unit motion compensation on the current block by using a gradient value in the horizontal direction or the vertical direction of a first corresponding reference pixel in the first reference block which corresponds to a current pixel included in a current pixel group in the current block, a gradient value in the horizontal direction or the vertical direction of a second corresponding reference pixel in the second reference block which corresponds to the current pixel, a pixel value of the first corresponding reference pixel, a pixel value of the second corresponding reference pixel, and a displacement vector per unit time of the current pixel in the horizontal direction or the vertical direction;

obtaining, from the bitstream, information about a residual block of the current block; and reconstructing the current block based on the prediction block and the residual block, wherein the current pixel group includes at least one pixel.

In the video decoding method according to various embodiments, the obtaining of the prediction block of the current block may further include calculating the gradient value in the horizontal direction or the vertical direction of the first corresponding reference pixel or the second corresponding reference pixel by applying a gradient filter in the horizontal direction or the vertical direction to pixel values of pixels at fractional locations in the first reference block or the second reference block, the gradient filter may a 5-tap filter, and the pixels at the fractional locations may be each a pixel in which at least one of a horizontal component or a vertical component of coordinates indicating a location of the pixel has a fractional value.

In the video decoding method according to various embodiments, pixel values of the pixels at the fractional locations in the first reference block or the second reference block may be calculated by applying an interpolation filter in the horizontal direction or the vertical direction to pixel values of pixels at integer locations.

In the video decoding method according to various embodiments, a size of the current pixel group may be determined based on a minimum value from among values of a height and a width of the current block.

In the video decoding method according to various embodiments, the displacement vector per unit time in the horizontal direction or the vertical direction with respect to the current pixel group may be a displacement vector per unit time determined by using pixel values of first corresponding reference pixels and neighboring pixels of the first corresponding reference pixels in a first corresponding reference pixel group in the first reference picture, the first corresponding reference pixel group corresponding to the current pixel group, pixel values of second corresponding reference pixels and neighboring pixels of the second corresponding reference pixels in a second corresponding reference pixel group in the second reference picture, gradient values, a first picture order count (POC) difference between the first reference picture and the current picture, and a second POC difference between the second reference picture and the current picture.

In the video decoding method according to various embodiments, the determining of the displacement vector per unit time of the pixels of the current block in the horizontal direction or the vertical direction may include, when the first corresponding reference pixel or the second corresponding reference pixel is a boundary neighboring pixel adjacent to an inside of a boundary of the first reference block or the second reference block, deriving, by using a pixel value of the boundary neighboring pixel, a pixel value and a gradient value of a pixel located outside the boundary of the first reference block or the second reference block, and determining the displacement vector per unit time of the current pixel in the horizontal direction or the vertical direction, based on the pixel value and a gradient value of the boundary neighboring pixel and a pixel value and a gradient value of a pixel located outside the boundary of the current block, the pixel value and the gradient value of the pixel being derived by using the pixel value of the boundary neighboring pixel.

In the video decoding method according to various embodiments, the determining of the displacement vector per unit time of the pixels of the current block in the horizontal direction or the vertical direction may include:

calculating a value about the current pixel by using a pixel value of the first corresponding reference pixel included in the first reference block, a pixel value of the second corresponding reference pixel included in the second reference block, the gradient value of the first corresponding reference pixel, the gradient value of the second corresponding reference pixel, a first POC difference between the first reference picture and the current picture, and a second POC difference between the second reference picture and the current picture;

calculating values about neighboring pixels by using pixel values of first corresponding neighboring pixels of the first corresponding reference pixel, pixel values of second corresponding neighboring pixels of the second corresponding reference pixel, gradient values of the first corresponding neighboring pixels, gradient values of the second corresponding neighboring pixels, the first POC difference between the first reference picture and the current picture, and the second POC difference between the second reference picture and the current picture;

calculating a weighted average value for the current pixel, the weighted average value being required to calculate a displacement vector per unit time in the horizontal direction or the vertical direction, by using the value about the current pixel, values about neighboring pixels, and a weight; and determining the displacement vector per unit time of the current pixel in the horizontal direction or the vertical direction by using the calculated weighted average value for the current pixel.

In the video decoding method according to various embodiments, the weighted average value for the current pixel may be a value calculated by applying an exponential smoothing technique in the vertical and horizontal directions to values about pixels included in the first reference block and the second reference block.

According to various embodiment, a video decoding apparatus may include an obtainer configured to obtain, from a bitstream, motion prediction mode information about a current block in a current picture, when the obtained motion prediction mode information indicates a bi-directional motion prediction mode, obtain, from the bitstream, information about a first motion vector indicating a first reference block of a current block in a first reference picture and information about a second motion vector indicating a second reference block of the current block in a second reference picture, and obtain, from the bitstream, information about a residual block of the current block;

an inter predictor configured to determine a displacement vector per unit time of pixels of the current block in a horizontal direction or a vertical direction, the pixels including a pixel adjacent to an inside of a boundary of the current block, by using values about reference pixels included in the first reference block and the second reference block, without using a stored value about a pixel located outside boundaries of the first reference block and the second reference block, and obtain a prediction block of the current block by performing block-unit motion compensation and pixel group unit motion compensation on the current block by using a gradient value in the horizontal direction or the vertical direction of a first corresponding reference pixel in the first reference block which corresponds to a current pixel included in a current pixel group in the current block, a gradient value in the horizontal direction or the vertical direction of a second corresponding reference pixel in the second reference block which corresponds to the current pixel, a pixel value of the first corresponding reference pixel, a pixel value of the second corresponding reference pixel, and a displacement vector per unit time of the current pixel in the horizontal direction or the vertical direction; and a decoder configured to reconstruct the current block based on the prediction block and the residual block, wherein the current pixel group includes at least one pixel.

In the video decoding apparatus according to various embodiments, the inter predictor may be configured to calculate the gradient value in the horizontal direction or the vertical direction of the first corresponding reference pixel or the second corresponding reference pixel by applying a gradient filter in the horizontal direction or the vertical direction to pixel values of pixels at fractional locations in the first reference block or the second reference block, the gradient filter may be a 5-tap filter, and the pixels at the fractional locations may be each a pixel in which at least one of a horizontal component or a vertical component of coordinates indicating a location of the pixel has a fractional value.

In the video decoding apparatus according to various embodiments, the displacement vector per unit time in the horizontal direction or the vertical direction with respect to the current pixel group may be a displacement vector per unit time determined by the inter predictor using pixel values of first corresponding reference pixels and neighboring pixels of the first corresponding reference pixels in a first corresponding reference pixel group in the first reference picture, the first corresponding reference pixel group corresponding to the current pixel group, pixel values of second corresponding reference pixels and neighboring pixels of the second corresponding reference pixels in a second corresponding reference pixel group in the second reference picture, gradient values, a first picture order count (POC) difference between the first reference picture and the current picture, and a second POC difference between the second reference picture and the current picture.

In the video decoding apparatus according to various embodiments, the inter predictor may be configured to calculate a value about the current pixel by using a pixel value of the first corresponding reference pixel included in the first reference block, a pixel value of the second corresponding reference pixel included in the second reference block, the gradient value of the first corresponding reference pixel, the gradient value of the second corresponding reference pixel, a first POC difference between the first reference picture and the current picture, and a second POC difference between the second reference picture and the current picture, calculate values about neighboring pixels by using pixel values of first corresponding neighboring pixels of the first corresponding reference pixel, pixel values of second corresponding neighboring pixels of the second corresponding reference pixel, gradient values of the first corresponding neighboring pixels, gradient values of the second corresponding neighboring pixels, the first POC difference between the first reference picture and the current picture, and the second POC difference between the second reference picture and the current picture, calculate a weighted average value for the current pixel, the weighted average value being required to calculate a displacement vector per unit time in the horizontal direction or the vertical direction, by using the value about the current pixel, the values about neighboring pixels, and a weight, and determine the displacement vector per unit time of the current pixel in the horizontal direction or the vertical direction by using the calculated weighted average value for the current pixel.

According to various embodiments, a video encoding method may include obtaining a prediction block, a first motion vector, and a second motion vector of a current block by performing motion compensation and pixel group unit motion compensation on the current block; and generating a bitstream including information about a first motion vector and a second motion vector, and motion prediction mode information indicating that a motion prediction mode of the current block is a bi-directional motion prediction mode, wherein a pixel group for the pixel group unit motion compensation includes at least one pixel, wherein the first motion vector is a motion vector indicating, from the current block, a first reference block of a first reference picture which corresponds to the current block in a current picture, wherein the second motion vector is a motion vector indicating, from the current block, a second reference block of a second reference picture which corresponds to the current block in the current picture, wherein a prediction block of the current block is obtained by performing block-unit motion compensation and pixel group unit motion compensation on the current block by using a gradient value in the horizontal direction or the vertical direction of a first corresponding reference pixel in the first reference block which corresponds to a current pixel included in a current pixel group in the current block, a gradient value in the horizontal direction or the vertical direction of a second corresponding reference pixel in the second reference block which corresponds to the current pixel, a pixel value of the first corresponding reference pixel, a pixel value of the second corresponding reference pixel, and a displacement vector per unit time of the current pixel in the horizontal direction or the vertical direction, and wherein a displacement vector per unit time of pixels of the current block in the horizontal direction or the vertical direction, the pixels including a pixel adjacent to an inside of a boundary of the current block, is determined by using values about reference pixels included in the first reference block and the second reference block, without using a stored value about a pixel located outside boundaries of the first reference block and the second reference block.

According to various embodiments, a video encoding apparatus may include an inter predictor configured to obtain a prediction block, a first motion vector, and a second motion vector of a current block by performing motion compensation and pixel group unit motion compensation on the current block; and a bitstream generator configured to generate a bitstream including information about a first motion vector and a second motion vector, and motion prediction mode information indicating that a motion prediction mode of the current block is a bi-directional motion prediction mode, wherein a pixel group for the pixel group unit motion compensation includes at least one pixel, wherein the first motion vector is a motion vector indicating, from the current block, a first reference block of a first reference picture which corresponds to the current block in a current picture, and the second motion vector is a motion vector indicating, from the current block, a second reference block of a second reference picture which corresponds to the current block in the current picture, wherein a prediction block of the current block is obtained by performing block-unit motion compensation and pixel group unit motion compensation on the current block by using a gradient value in the horizontal direction or the vertical direction of a first corresponding reference pixel in the first reference block which corresponds to a current pixel included in a current pixel group in the current block, a gradient value in the horizontal direction or the vertical direction of a second corresponding reference pixel in the second reference block which corresponds to the current pixel, a pixel value of the first corresponding reference pixel, a pixel value of the second corresponding reference pixel, and a displacement vector per unit time of the current pixel in the horizontal direction or the vertical direction, and wherein a displacement vector per unit time of pixels of the current block in the horizontal direction or the vertical direction, the pixels including a pixel adjacent to an inside of a boundary of the current block, is determined by using values about reference pixels included in the first reference block and the second reference block, without using a stored value about a pixel located outside boundaries of the first reference block and the second reference block.

Provided is a computer-readable recording medium having recorded thereon a program for executing a method according to various embodiments.

Advantageous Effects of Disclosure

According to various embodiments, a value similar to a value of an original block of a current block is predicted by performing inter prediction on the current block by using a gradient value of a reference block of a reference picture in a bi-directional motion prediction mode, such that encoding and decoding efficiency may be enhanced.

BRIEF DESCRIPTION OF DRAWINGS

FIG. 1B illustrates a flowchart of a video decoding method, according to various embodiments.

FIG. 1E illustrates a block diagram of an image decoder according to various embodiments.

FIGS. 7A to 7E are Tables showing filter coefficients of filters used to determine a pixel value at a fractional pixel location of a fractional pixel unit, and gradient values in horizontal and vertical directions, according to an embodiment.

FIG. 17 illustrates that, when a second coding unit having a non-square shape is determined by splitting a first coding unit and satisfies a predetermined condition, a shape into which the second coding unit is splittable is restricted, according to an embodiment.

FIG. 20 illustrates a process of determining a depth of a coding unit as a shape and size of the coding unit change, when the coding unit is recursively split such that a plurality of coding units are determined, according to an embodiment.

BEST MODE

Figure 1A:
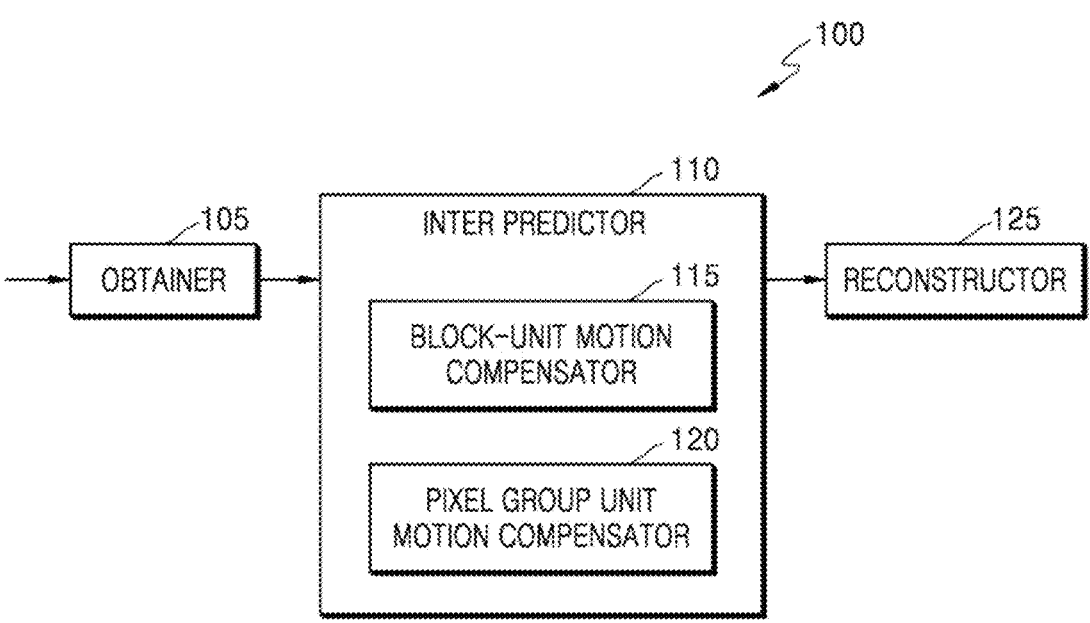
FIG. 1A illustrates a block diagram of a video decoding apparatus, according to various embodiments.

According to various embodiments, a video decoding method may include obtaining, from a bitstream, motion prediction mode information about a current block in a current picture;

when the obtained motion prediction mode information indicates a bi-directional motion prediction mode, obtaining, from the bitstream, information about a first motion vector indicating a first reference block of a current block in a first reference picture and information about a second motion vector indicating a second reference block of the current block in a second reference picture;

determining a displacement vector per unit time of pixels of the current block in a horizontal direction or a vertical direction, the pixels including a pixel adjacent to an inside of a boundary of the current block, by using values about reference pixels included in the first reference block and the second reference block, without using a stored value of a pixel located outside boundaries of the first reference block and the second reference block;

obtaining a prediction block of the current block by performing block-unit motion compensation and pixel group unit motion compensation on the current block by using a gradient value in the horizontal direction or the vertical direction of a first corresponding reference pixel in the first reference block which corresponds to a current pixel included in a current pixel group in the current block, a gradient value in the horizontal direction or the vertical direction of a second corresponding reference pixel in the second reference block which corresponds to the current pixel, a pixel value of the first corresponding reference pixel, a pixel value of the second corresponding reference pixel, and a displacement vector per unit time of the current pixel in the horizontal direction or the vertical direction;

obtaining, from the bitstream, information about a residual block of the current block; and reconstructing the current block based on the prediction block and the residual block, wherein the current pixel group includes at least one pixel.

According to various embodiments, a video decoding apparatus includes an obtainer configured to obtain, from a bitstream, motion prediction mode information about a current block in a current picture, when the obtained motion prediction mode information indicates a bi-directional motion prediction mode, obtain, from the bitstream, information about a first motion vector indicating a first reference block of a current block in a first reference picture and information about a second motion vector indicating a second reference block of the current block in a second reference picture, and obtain, from the bitstream, information about a residual block of the current block;

an inter predictor configured to determine a displacement vector per unit time of pixels of the current block in a horizontal direction or a vertical direction, the pixels including a pixel adjacent to an inside of a boundary of the current block, by using values about reference pixels included in the first reference block and the second reference block, without using a stored value about a pixel located outside boundaries of the first reference block and the second reference block, and obtain a prediction block of the current block by performing block-unit motion compensation and pixel group unit motion compensation on the current block by using a gradient value in the horizontal direction or the vertical direction of a first corresponding reference pixel in the first reference block which corresponds to a current pixel included in a current pixel group in the current block, a gradient value in the horizontal direction or the vertical direction of a second corresponding reference pixel in the second reference block which corresponds to the current pixel, a pixel value of the first corresponding reference pixel, a pixel value of the second corresponding reference pixel, and a displacement vector per unit time of the current pixel in the horizontal direction or the vertical direction; and a decoder configured to reconstruct the current block based on the prediction block and the residual block, wherein the current pixel group includes at least one pixel.

According to various embodiments, a video encoding method includes obtaining a prediction block, a first motion vector, and a second motion vector of a current block by performing motion compensation and pixel group unit motion compensation on the current block; and generating a bitstream including information about a first motion vector and a second motion vector, and motion prediction mode information indicating that a motion prediction mode of the current block is a bi-directional motion prediction mode, wherein a pixel group for the pixel group unit motion compensation includes at least one pixel, wherein the first motion vector is a motion vector indicating, from the current block, a first reference block of a first reference picture which corresponds to the current block in a current picture, wherein the second motion vector is a motion vector indicating, from the current block, a second reference block of a second reference picture which corresponds to the current block in the current picture, wherein a prediction block of the current block is obtained by performing block-unit motion compensation and pixel group unit motion compensation on the current block by using a gradient value in the horizontal direction or the vertical direction of a first corresponding reference pixel in the first reference block which corresponds to a current pixel included in a current pixel group in the current block, a gradient value in the horizontal direction or the vertical direction of a second corresponding reference pixel in the second reference block which corresponds to the current pixel, a pixel value of the first corresponding reference pixel, a pixel value of the second corresponding reference pixel, and a displacement vector per unit time of the current pixel in the horizontal direction or the vertical direction, and wherein a displacement vector per unit time of pixels of the current block in the horizontal direction or the vertical direction, the pixels including a pixel being adjacent to an inside of a boundary of the current block, is determined by using values about reference pixels included in the first reference block and the second reference block, without using a stored value about a pixel located outside boundaries of the first reference block and the second reference block.

According to various embodiments, a video encoding apparatus includes an inter predictor configured to obtain a prediction block, a first motion vector, and a second motion vector of a current block by performing motion compensation and pixel group unit motion compensation on the current block; and a bitstream generator configured to generate a bitstream including information about a first motion vector and a second motion vector, and motion prediction mode information indicating that a motion prediction mode of the current block is a bi-directional motion prediction mode, wherein a pixel group for the pixel group unit motion compensation includes at least one pixel, wherein the first motion vector is a motion vector indicating, from the current block, a first reference block of a first reference picture which corresponds to the current block in a current picture, and the second motion vector is a motion vector indicating, from the current block, a second reference block of a second reference picture which corresponds to the current block in the current picture, wherein a prediction block of the current block is obtained by performing block-unit motion compensation and pixel group unit motion compensation on the current block by using a gradient value in the horizontal direction or the vertical direction of a first corresponding reference pixel in the first reference block which corresponds to a current pixel included in a current pixel group in the current block, a gradient value in the horizontal direction or the vertical direction of a second corresponding reference pixel in the second reference block which corresponds to the current pixel, a pixel value of the first corresponding reference pixel, a pixel value of the second corresponding reference pixel, and a displacement vector per unit time of the current pixel in the horizontal direction or the vertical direction, and wherein a displacement vector per unit time of pixels of the current block in the horizontal direction or the vertical direction, the pixels including a pixel being adjacent to an inside of a boundary of the current block, is determined by using values about reference pixels included in the first reference block and the second reference block, without using a stored value about a pixel located outside boundaries of the first reference block and the second reference block.

According to various embodiments, a computer-readable recording medium may include a recorded program for executing the methods.

MODE OF DISCLOSURE

Hereinafter, an "image" may indicate a still image of a video or may indicate a moving picture that is the video itself.

Hereinafter, a "sample" may refer to data that is allocated to a sampling location of an image and is a processing target. For example, pixels in an image of a spatial domain may be samples.

Hereinafter, a "current block" may refer to a block of an image which is to be encoded or decoded FIG. 1A illustrates a block diagram of a video decoding apparatus, according to various embodiments.

A video decoding apparatus 100 according to various embodiments includes an obtainer 105, an inter predictor 110, and a reconstructor 125.

The obtainer 105 receives a bitstream including prediction mode information about a current block, motion prediction mode information about the current block, and motion vector information.

The obtainer 105 may obtain, from the received bitstream, the prediction mode information about the current block, the motion prediction mode information about the current block, and the motion vector information. Also, the obtainer 105 may obtain, from the received bitstream, a reference picture index indicating a reference picture from among pictures that have been previously decoded.

When a prediction mode of a current block is an inter prediction mode, the inter predictor 110 performs inter prediction on the current block. That is, the inter predictor 110 may generate a predicted pixel value of the current block by using at least one of the pictures that have been decoded prior to a current picture including the current block. For example, when a motion prediction mode of the current block is a bi-directional motion prediction mode, the inter predictor 110 may generate the predicted pixel value of the current block by using two pictures that have been decoded prior to the current picture. That is, when the motion prediction mode information received from the bitstream indicates the bi-directional motion prediction mode, the inter predictor 110 may generate the predicted pixel value of the current block by using two pictures that have been decoded prior to the current picture.

The inter predictor 110 may include a block-unit motion compensator 115 and a pixel group unit motion compensator 120.

The block-unit motion compensator 115 may perform block-unit motion compensation on the current block.

The block-unit motion compensator 115 may determine at least one reference picture from among the pictures that have been previously decoded, by using the reference picture index obtained from the bitstream. In this regard, the reference picture index may refer to reference picture indexes with respect to respective prediction directions including an L0 direction and an L1 direction. Here, the reference picture index with respect to the L0 direction refers to an index indicating a reference picture from among pictures included in an L0 reference picture list, and the reference picture index with respect to the L1 direction refers to an index indicating a reference picture from among pictures included in an L1 reference picture list.

The block-unit motion compensator 115 may determine a reference block of the current block, which is located in at least one reference picture, by using the motion vector information received from the bitstream. In this regard, a corresponding block in the reference picture, which corresponds to the current block in the current picture, may be the reference block. That is, the block-unit motion compensator 115 may determine the reference block of the current block by using a motion vector indicating the reference block from the current block. In this regard, the motion vector means a vector indicating variation between reference coordinates of the current block in the current picture and reference coordinates of the reference block in the reference picture. For example, when upper-left coordinates of the current block are (1,1), and upper-left coordinates of the reference block in the reference picture are (3,3), a motion vector may be (2,2).

In this regard, the motion vector information may include a difference value of the motion vector, and the block-unit motion compensator 115 may reconstruct the motion vector by using a predictor of the motion vector and the difference value of the motion vector, which is obtained from the bitstream, and may determine, by using the reconstructed motion vector, the reference block of the current block which is located in at least one reference picture. The difference value of the motion vector may indicate the difference value of the motion vector which is related to respective prediction directions including the L0 direction and the L1 direction. In this regard, the difference value of the motion vector with respect to the L0 direction refers to a difference value of a motion vector indicating a reference block in the reference picture included in the L0 reference picture list, and the difference value of the motion vector with respect to the L1 direction refers to a difference value of a motion vector indicating a reference block in the reference picture included in the L1 reference picture list.

The block-unit motion compensator 115 may perform block-unit motion compensation on the current block by using a pixel value of the reference block. The block-unit motion compensator 115 may perform block-unit motion compensation on the current block by using a value of a reference pixel in the reference block which corresponds to a current pixel in the current block. In this regard, the reference pixel may be a pixel included in the reference block and may correspond to the current pixel in the current block.

The block-unit motion compensator 115 may perform block-unit motion compensation on the current block by using a plurality of reference blocks included in a plurality of reference pictures, respectively. For example, when the motion prediction mode of the current block is the bi-directional motion prediction mode, the block-unit motion compensator 115 may determine two reference pictures from among the pictures that have been previously encoded, and may determine two reference blocks included in the two reference pictures.

The block-unit motion compensator 115 may perform block-unit motion compensation on the current block by using pixel values of two reference pixels in the two reference blocks. The block-unit motion compensator 115 may generate a block-unit motion-compensated value by performing block-unit motion compensation on the current block by using an average value or a weighted sum with respect to the pixel values of the two reference pixels.

A reference location of the reference block may be a location of an integer pixel but is not limited thereto and thus may be a location of a fractional pixel. In this regard, the integer pixel may refer to a pixel of which location component is an integer and that is at an integer pixel location. The fractional pixel may refer to a pixel in which a location component is a faction and that is at a fractional pixel location.

For example, when the upper-left coordinates of the current block are (1,1), and the motion vector is (2.5,2.5), upper-left coordinates of the reference block in the reference picture may be (3.5,3.5). In this regard, a location of the fractional pixel may be determined in a ¼ or ¹⁄₁₆ pixel element (pel) unit. However, the disclosure is not limited thereto, and thus the location of the fractional pixel may be determined according to various fraction pel units.

When the reference location of the reference block is the location of the fractional pixel, the block-unit motion compensator 115 may apply an interpolation filter on a first neighboring region including a first pixel from among pixels of a first reference block indicated by a first motion vector and a second neighboring region including a second pixel from among pixels of a second reference block indicated by a second motion vector, and thus may generate a pixel value of the first pixel and a pixel value of the second pixel.

That is, a value of the reference pixel in the reference block may be determined by using pixel values of neighboring pixels in which predetermined directional components are integers. In this regard, a predetermined direction may be a horizontal direction or a vertical direction.

For example, the block-unit motion compensator 115 may perform, by using an interpolation filter, filtering on pixel values of pixels in which predetermined directional components are integers, may determine a reference pixel value as a result of the filtering, and may determine the block-unit motion-compensated value with respect to the current block by using the reference pixel value The block-unit motion-compensated value may be determined by using an average value or a value of a weighted sum with respect to reference pixels. In this regard, the interpolation filter may be an M-tap interpolation filter based on discrete cosine transform (DCT). A coefficient of the M-tap interpolation filter based on DCT may be derived from DCT and inverse discrete cosine transform (IDCT). In this regard, a coefficient of an interpolation filter may be a filter coefficient that is scaled to an integer coefficient to decrease real number operations while filtering is performed. In this regard, the interpolation filter may be a one-dimensional (1D) interpolation filter in a horizontal direction or a vertical direction. For example, when a location of a pixel is expressed as x and y perpendicular coordinate components, a horizontal direction may refer to a direction that is in parallel with an x axis. A vertical direction may refer to a direction that is in parallel with a y axis.

The block-unit motion compensator 115 may first perform filtering on values of pixels at integer locations by using the 1D vertical direction interpolation filter, and may determine the reference pixel value at the location of the fractional pixel by performing filtering on a value generated via the filtering, by using the 1D horizontal direction interpolation filter.

When a scaled filter coefficient is used, the value generated via the filtering may be greater than a case in which a not-scaled filter coefficient is used. Therefore, the block-unit motion compensator 115 may perform de-scaling on the value generated via the filtering.

The block-unit motion compensator 115 may perform filtering on the values of the pixels at integer locations by using the 1D vertical direction interpolation filter, and then may perform de-scaling. In this regard, the de-scaling may include bit-shifting to the right by the number of de-scaling bits. The number of de-scaling bits may be determined based on a bit depth of a sample of an input image. For example, the number of de-scaling bits may be a value obtained by subtracting 8 from the bit depth of the sample.

Also, the block-unit motion compensator 115 may perform filtering on the values of the pixels at integer locations by using the 1D vertical direction interpolation filter, may perform filtering on the value generated via the filtering by using the 1D horizontal direction interpolation filter, and then may perform the de-scaling. In this regard, the de-scaling may include bit-shifting to the right by the number of de-scaling bits. The number of de-scaling bits may be determined based on a scaling bit number of the 1D vertical direction interpolation filter, a scaling bit number of the 1D horizontal direction interpolation filter, and the bit depth of the sample. For example, when a scaling bit number p of the 1D vertical direction interpolation filter is 6, a scaling bit number q of the 1D horizontal direction interpolation filter is 6, and the bit depth of the sample is b, the number of de-scaling bits may be p+q+8−b, i.e., 20−b.

When the block-unit motion compensator 115 performs filtering on a pixel in which a predetermined directional component is an integer by using the ID interpolation filter, and then performs bit-shifting to the right by the number of de-scaling bits, a round-off error may occur. Therefore, the block-unit motion compensator 115 may perform filtering on the pixel in which a predetermined directional component is an integer by using the ID interpolation filter, may add an offset value, and then may perform de-scaling. In this regard, the offset value may be 2^(number of de-scaling bits−1).

The pixel group unit motion compensator 120 may generate a pixel group unit motion-compensated value by performing pixel group unit motion compensation on the current block. When the motion prediction mode of the current block is the bi-directional motion prediction mode, the pixel group unit motion compensator 120 may generate the pixel group unit motion-compensated value by performing pixel group unit motion compensation on the current block.

The pixel group unit motion compensator 120 may generate the pixel group unit motion-compensated value by performing pixel group unit motion compensation on the current block, based on an optical flow of pixel groups of a first reference picture and a second reference picture. The optical flow will be described below in descriptions with reference to FIG. 3A.

The pixel group unit motion compensator 120 may generate the pixel group unit motion-compensated value by performing pixel group unit motion compensation on pixel groups included in the reference block of the current block. A pixel group may include at least one pixel. For example, the pixel group may be a pixel. Alternatively, the pixel group may be a plurality of pixels including two or more pixels. The pixel group may be a plurality of pixels included in a block with a size of K×K (where K is an integer).

The pixel group unit motion compensator 120 may determine the pixel group, and may perform pixel group unit motion compensation on the current block, based on the determined pixel group.

The pixel group unit motion compensator 120 may determine a size of the pixel group, based on a size of the current block. For example, the pixel group unit motion compensator 120 may determine a maximum value to be a height and a width of the pixel group, the maximum value being selected from among 2 and a value obtained by dividing a minimum value from among a height and a width of the current block by 8.

The pixel group unit motion compensator 120 may perform motion compensation in a pixel group unit including a plurality of pixels and thus may decrease complexity in encoding/decoding, compared to a case in which motion compensation in a pixel unit is performed in a high image resolution. Also, the pixel group unit motion compensator 120 may perform motion compensation in a pixel group unit including a plurality of pixels and thus may decrease complexity in encoding/decoding, compared to a case in which motion compensation in a pixel unit is performed at a high frame rate.

The obtainer 105 may obtain pixel group size information included in the bitstream. When a size of the pixel group is K×K, the pixel group size information may be information indicating a height or a width K. The pixel group size information may be included in a high level syntax carrier.

The pixel group unit motion compensator 120 may determine at least one pixel group partition including pixels having similar pixel values from among the plurality of pixels included in the pixel group, and may perform motion compensation on pixel group partitions. In this regard, there is a high probability that the pixel group partition including the pixels having the similar pixel values is a same object and motions are similar to each other, and thus, the pixel group unit motion compensator 120 may perform further detailed motion compensation in a pixel group unit.

The pixel group unit motion compensation is performed when the motion prediction mode information indicates the bi-directional motion prediction mode, but even in this case, the pixel group unit motion compensation may not always performed but may be selectively performed.

The pixel group unit motion compensator 120 may determine a reference pixel group in the reference block which corresponds to a current pixel group of the current block, and may determine a gradient value of the reference pixel group. For example, the pixel group unit motion compensator 120 may determine the gradient value of the reference pixel group by using a gradient value of at least one pixel value included in the reference pixel group.

The pixel group unit motion compensator 120 may generate the pixel group unit motion-compensated value by performing pixel group unit motion compensation on the current block by using the gradient value of the reference pixel group.

The pixel group unit motion compensator 120 may apply a filter to a first neighboring region of a first pixel group which includes the first pixel group from among pixel groups indicated by the first motion vector and a second neighboring region of a second pixel group which includes the second pixel group from among pixel groups indicated by the second motion vector, and thus may generate a gradient value of the first pixel group and a gradient value of the second pixel group.

The pixel group unit motion compensator 120 may determine pixel values and gradient values of pixels in a predetermined-size first window including the first pixel group with respect to the first pixel group in the first reference picture, and may determine pixel values and gradient values of pixels in a predetermined-size second window including the second pixel group with respect to the second pixel group in the second reference picture.

The pixel group unit motion compensator 120 may determine a displacement vector per unit time with respect to the current pixel group by using the pixel values and the gradient values of the pixels in the first window and the pixel values and the gradient values of the pixels in the second window. In this regard, a value of the displacement vector per unit time with respect to the current pixel group may be adjusted by a regularization parameter. The regularization parameter is a parameter used to prevent an error from occurring when an ill-posed displacement vector per unit time with respect to the current pixel group is determined to perform motion compensation on a pixel group. The pixel group unit motion compensator 120 may perform pixel group unit motion compensation on the current block, based on a regularization parameter about a displacement vector per unit time in a horizontal direction or vertical direction. The regularization parameter will be described below in descriptions with reference to FIG. 8A.

The pixel group unit motion compensator 120 may perform pixel group unit motion compensation on the current block by using the displacement vector per unit time with respect to the current pixel group and the gradient value of the reference pixel.

The reference location of the reference block may be the location of the integer pixel but is not limited thereto and thus may be the location of the fractional pixel.

When the reference location of the reference block is the location of the fractional pixel, the gradient value of the reference pixel in the reference block may be determined by using pixel values of neighboring pixels in which predetermined directional components are integers.

For example, the pixel group unit motion compensator 120 may perform filtering, by using a gradient filter, on the pixel values of the neighboring pixels in which predetermined directional components are integers, and may determine the gradient value of the reference pixel as a resultant value thereof. In this regard, a filter coefficient of the gradient filter may be determined by using a coefficient predetermined with respect to a DCT-based interpolation filter. A coefficient of the gradient filter may be the filter coefficient that is scaled to an integer coefficient to decrease real number operations while filtering is performed.

In this regard, the gradient filter may be a 1D horizontal direction gradient filter or a 1D vertical direction gradient filter.

The pixel group unit motion compensator 120 may perform, by using the 1D horizontal direction gradient filter or the 1D vertical direction gradient filter, filtering on a neighboring pixel in which a corresponding directional component is an integer so as to determine a gradient value in a horizontal direction or a vertical direction with respect to the reference pixel.

For example, the pixel group unit motion compensator 120 may perform, by using the 1D horizontal direction gradient filter, filtering on a pixel located in a horizontal direction from a pixel in which a horizontal direction component is an integer from among pixels located adjacent to the reference pixel, and thus may determine the gradient value in a horizontal direction with respect to the reference pixel.

When a location of the reference pixel is $(x+\alpha, y+\beta)$ (where, x and y are integers and a and 3 are fractions), the pixel group unit motion compensator 120 may perform, by using the 1D vertical direction interpolation filter, filtering on a pixel at a (x, y) location and a pixel in which a vertical component is an integer and is from among pixels located in a vertical direction from the pixel at the (x, y) location, and may determine a pixel value of (x, y+β) as a resultant value thereof.

The pixel group unit motion compensator 120 may perform, by using the horizontal direction gradient filter, filtering on a value of a pixel at a (x, y+β) location and pixels in which horizontal components are integers and are from among pixels located in a horizontal direction from the (x, y+β) location, and may determine a gradient value at a (x+α, y+β) location as a resultant value thereof.

An order of using the ID gradient filter and the ID interpolation filter is not limited. In the above descriptions, first, an interpolated filtering value in a vertical direction is generated by performing filtering on a pixel at an integer location by using 1D vertical direction interpolation filter, and then filtering is performed on the interpolated filtering value in a vertical direction by using a 1D horizontal direction gradient filter. However, first, an interpolated filtering value in a horizontal direction may be generated by performing on the pixel at the integer location by using the 1D horizontal direction gradient filter, and then filtering may be performed on the interpolated filtering value in a horizontal direction by using the 1D vertical direction interpolation filter.

In the above descriptions, a method, performed by the pixel group unit motion compensator 120, of determining the gradient value in a horizontal direction at the (x+α, y+β) location has been particularly described. The pixel group unit motion compensator 120 determines a gradient value in a vertical direction at the (x+α, y+β) location in a similar manner to that of determining the gradient value in a horizontal direction, and thus detailed descriptions thereof are omitted.

In the above descriptions, a method, performed by the pixel group unit motion compensator 230, of using the 1D gradient filter and the 1D interpolation filter so as to determine a gradient value at the location of the fractional pixel has been particularly described. However, the disclosure is not limited thereto, and the gradient filter and the interpolation filter may also be used to determine a gradient value at the location of the integer pixel. Even when a pixel value of the integer pixel may be determined without using the interpolation filter, for processes uniform with respect to processes in the fractional pixel, the pixel value of the integer pixel may be determined by performing, by using the interpolation filter, filtering on the integer pixel and a neighboring pixel in which a predetermined directional component is an integer. For example, the interpolation filter coefficient in the integer pixel may be {0, 0, 64, 0, 0}, and because an interpolation filter coefficient related to a neighboring integer pixel is 0, filtering may be performed by using only a pixel value of a current integer pixel, and as a result, filtering may be performed on the current integer pixel and the neighboring integer pixel by using an interpolation filter so as to determine the pixel value of the current integer pixel.

The pixel group unit motion compensator 120 may perform de-scaling after performing filtering on a pixel at an integer location by using the 1D vertical direction interpolation filter. In this regard, the de-scaling may include bit-shifting to the right by the number of de-scaling bits. The number of de-scaling bits may be determined based on a bit depth of a sample. Also, the number of de-scaling bits may be determined based on specific input data in a block.

For example, the number of de-scaling bits may be a value obtained by subtracting 8 from the bit depth of the sample.

The pixel group unit motion compensator 120 may perform de-scaling after performing filtering on a value generated via the de-scaling using the horizontal direction gradient filter. Equally, the de-scaling may include bit-shifting to the right by the number of de-scaling bits. The number of de-scaling bits may be determined based on a scaled-bit number of the 1D vertical direction interpolation filter, a scaled-bit number of the 1D horizontal direction gradient filter, and the bit depth of the sample. For example, when a scaled-bit number p of the 1D interpolation filter is 6, a scaled-bit number q of the 1D gradient filter is 4, and the bit depth of the sample is b, the number of de-scaling bits may be p+q+8−b, i.e., 18−b.

When the pixel group unit motion compensator 120 performs only bit-shifting to the right by the number of de-scaling bits on a value generated via filtering after performing the filtering, a round-off error may occur, such that the pixel group unit motion compensator 120 may add an offset value to the value generated via the filtering and then may perform the de-scaling. Here, the offset value may be 2^(number of de-scaling bits−1).

The inter predictor 110 may generate a predicted pixel value of the current block by using the block-unit motion-compensated value and the pixel group unit motion-compensated value with respect to the current block. For example, the inter predictor 110 may generate a predicted pixel value of the current block by adding the block-unit motion-compensated value to the pixel group unit motion-compensated value with respect to the current block. In this regard, the block-unit motion-compensated value refers to a value generated by performing the block-unit motion compensation, and the pixel group unit motion-compensated value refers to a value generated by performing the pixel group unit motion compensation, wherein the block-unit motion-compensated value may be an average value or a weighted sum with respect to reference pixels, and the pixel group unit motion-compensated value may be a value determined based on the displacement vector per unit time with respect to the current pixel and the gradient value of the reference pixel.

The pixel group unit motion compensator 120 may obtain a shift value for the de-scaling after performing interpolation calculation or gradient calculation based on at least one of the bit depth of the sample, an input range of a filter used in the interpolation calculation or the gradient calculation, and a coefficient of the filter. The pixel group unit motion compensator 120 may perform the interpolation calculation or the gradient calculation with respect to pixels included in the first reference block and the second reference block by using the shift value for the de-scaling, and then may perform the de-scaling.

The inter predictor 110 may use a motion vector while performing the block-unit motion compensation, and may store the motion vector. In this regard, a unit of the motion vector may be a block of a 4×4 size. When the motion vector is stored after the block-unit motion compensation is performed, a motion vector storage unit may not be the 4×4 size but may be a block having various sizes (e.g., a block of an R×R size; where R is an integer). In this regard, the motion vector storage unit may be a block larger than the 4×4 size. For example, it may be a block of a 16×16 size.

When the pixel group unit motion compensation is performed, a size of a target block on which the pixel group unit motion compensation is to be performed may be enlarged, based on a size of the current block, a size of a window, and a length of the interpolation filter. The reason why the size of the target block is enlarged based on the size of the current block, compared to the size of the current block, is because, for a pixel located at an edge of the current block, the pixel group unit motion compensation is performed on the current block based on the pixel located at the edge of the current block and a neighboring pixel by using the window.

Therefore, to decrease the number of memory accesses and decrease performing of a multiplication operation, while the pixel group unit motion compensation is performed by using the window, the pixel group unit motion compensator 120 may adjust a location of a pixel deviating from the current block from among pixels in the window to a location of a pixel adjacent to the inside of the current block, and thus may determine a pixel value and a gradient value at the adjusted location of the pixel, such that the number of memory accesses and the number of multiplication operations may be decreased.

The pixel group unit motion compensator 120 may not use the pixel values of the pixels at the integer locations so as to determine gradient values of the reference pixels which are necessary values for the pixel group unit motion compensation. That is, the pixel group unit motion compensator 120 may calculate a gradient value of a first corresponding reference pixel in the first reference block in a horizontal direction or a vertical direction or a second corresponding reference pixel in the second reference block by applying the horizontal direction gradient filter or the vertical direction gradient filter to pixel values of pixels at fractional locations. In this regard, a length of the gradient filter may be 5. A coefficient of the gradient filter may have coefficients that are symmetrical with respect to a center coefficient of the filter. A pixel at a fractional location may be a pixel in which at least one of a horizontal direction component and a vertical direction component which indicate a location of the pixel has a fractional value.

Pixel values of pixels at fractional locations in the first reference block or the second reference block may have been calculated by applying the horizontal direction interpolation filter or the vertical direction interpolation filter to pixel values of pixels at integer locations.

A displacement vector per unit time in a horizontal direction or a vertical direction with respect to a current pixel group may be a displacement vector per unit time determined by using pixel values of first corresponding reference pixels in a first corresponding reference pixel group in the first reference picture, the first corresponding reference pixel group corresponding to the current pixel group, pixel values of second corresponding reference pixels in a second corresponding reference pixel group in the second reference picture and neighboring pixels of the first corresponding reference pixels and the second corresponding reference pixels, gradient values, a first picture order count (POC) difference between the first reference picture and the current picture, and a second POC difference between the second reference picture and the current picture.

When the first corresponding reference pixel or the second corresponding reference pixel is a boundary neighboring pixel adjacent to the inside of a boundary of the first reference block or the second reference block, the pixel group unit motion compensator 120 may derive, by using a pixel value of the boundary neighboring pixel, a pixel value of a pixel located outside the boundary of the first reference block or the second reference block.

The pixel group unit motion compensator 120 may determine a displacement vector per unit time of the current block in a horizontal direction or a vertical direction, based on the pixel value of the boundary neighboring pixel and the pixel value of the pixel located outside the boundary of the current block, the pixel value of the pixel being derived by using the pixel value of the boundary neighboring pixel. That is, the pixel located outside the boundary may be present from among pixels included in a window with respect to the boundary neighboring pixel, and in this regard, the pixel value and a gradient value of the pixel located outside the boundary may be a pixel value and a gradient value of the pixel which are not included in a memory but are derived from the boundary neighboring pixel.

The pixel group unit motion compensator 120 may calculate a value about the current pixel by using a pixel value of the first corresponding reference pixel included in the first reference block, a pixel value of the second corresponding reference pixel included in the second reference block, a gradient value of the first corresponding reference pixel, a gradient value of the second corresponding reference pixel, a first POC difference between the first reference picture and the current picture, and a second POC difference between the second reference picture and the current picture. That is, the value about the current pixel may be a resultant value of a function based on a pixel value of a corresponding reference pixel of each reference picture, a gradient value, and a POC difference between each reference picture and the current picture.

The pixel group unit motion compensator 120 may calculate values about neighboring pixels by using pixel values of first corresponding neighboring pixels of the first corresponding reference pixel, gradient values of the first corresponding neighboring pixels, pixel values of second corresponding neighboring pixels of the second corresponding reference pixel, gradient values of the second corresponding neighboring pixels, the first POC difference between the first reference picture and the current picture, and the second POC difference between the second reference picture and the current picture. That is, the value about the neighboring pixel may be a resultant value of a function based on the pixel value of the corresponding reference pixel of each reference picture, the gradient value the corresponding reference pixel of each reference picture, and the POC difference between each reference picture and the current picture. That is, the value about the neighboring pixel may be a resultant value of a function based on a pixel value of a corresponding neighboring pixel of each reference picture, a gradient value, and the POC difference between each reference picture and the current picture.

The pixel group unit motion compensator 120 may calculate a weighted average value for the current pixel which is required to calculate a displacement vector per unit time in a horizontal direction, by using the value about the current pixel, the values about the neighboring pixels, and a weight. In this regard, the weight may be determined based on a distance between the current pixel and the neighboring pixel, a distance between a pixel and a boundary of a block, the number of pixels located outside the boundary, or whether the pixel is located in the inside of the boundary or outside the boundary.

The weighted average value for the current pixel may be a value that is calculated by applying an exponential smoothing technique in vertical and horizontal directions to values about the pixels included in the first reference block and the second reference block. The value that has been calculated with respect to the current pixel by applying the exponential smoothing technique in vertical and horizontal directions to the values about the pixels may be a value of which weight with respect to the value of the current pixel is largest and weight with respect to a value of a neighboring pixel thereof is exponentially decreased according to distances from the current pixel.

The pixel group unit motion compensator 120 may determine the displacement vector per unit time of the current pixel in a horizontal direction or a vertical direction by using the weighted average value of the current pixel.

The reconstructor 125 may obtain a residual block of the current block form a bitstream, and may reconstruct the current block by using the residual block and a prediction block of the current block. For example, the reconstructor 125 may generate a pixel value of a reconstructed block by summing a pixel value of the residual block of the current block from the bitstream and a pixel value of the prediction block of the current block.

The video decoding apparatus 100 may include an image decoder (not shown), and the image decoder (not shown) may include the obtainer 105, the inter predictor 110, and the reconstructor 125. The image decoder will be described with reference to FIG. 1E.

FIG. 1B illustrates a flowchart of a video decoding method according to various embodiments.

In operation S105, the video decoding apparatus 100 may obtain, from a bitstream, motion prediction mode information about a current block in a current picture. The video decoding apparatus 100 may receive the bitstream including the motion prediction mode information about the current block in the current picture, and may obtain the motion prediction mode information about the current block from the received bitstream. The video decoding apparatus 100 may obtain the motion prediction mode information about the current block from the bitstream, and may determine a prediction mode of the current block based on the motion prediction mode information. In this regard, when the prediction mode of the current block is an inter prediction mode, the video decoding apparatus 100 may obtain the motion prediction mode information about the current block.

For example, the video decoding apparatus 100 may determine the prediction mode of the current block as the inter prediction mode, based on the motion prediction mode information about the current block. When the prediction mode of the current block is an inter prediction mode, the video decoding apparatus 100 may obtain the motion prediction mode information about the current block from the bitstream.

In operation S110, when the motion prediction mode information indicates a bi-directional motion prediction mode, the video decoding apparatus 100 may obtain, from the bitstream, a first motion vector indicating a first reference block of the current block in a first reference picture and a second motion vector indicating a second reference block of the current block in a second reference picture.

That is, the video decoding apparatus 100 may receive the bitstream including information about the first motion vector and the second motion vector, and may obtain the first motion vector and the second motion vector from the received bitstream. The video decoding apparatus 100 may obtain a reference picture index from the bitstream, and may determine, based on the reference picture index, the first reference picture and the second reference picture from among a plurality of pictures that have been previously decoded.

In operation S115, the video decoding apparatus 100 may determine a displacement vector of pixels of the current block in a horizontal direction or a vertical direction, the pixels including a pixel adjacent to the inside of a boundary of the current block, by using values about reference pixels included in the first reference block and the second reference block, without using a stored value about a pixel located outside boundaries of the first reference block and the second reference block. In this regard, the stored value about the pixel located outside boundaries of the first reference block and the second reference block, and the values about the reference pixels included in the first reference block and the second reference block may be a pixel value of a related pixel or a gradient value in a horizontal direction or a gradient value in a vertical direction of the related pixel. Alternatively, the stored value about the pixel located outside boundaries of the first reference block and the second reference block, and the values about the reference pixels included in the first reference block and the second reference block may be a value determined by using the pixel value of the related pixel or a gradient value of the related pixel.

In operation S120, the video decoding apparatus 100 may obtain the prediction block of the current block by performing block-unit motion compensation and pixel group unit motion compensation on the current block by using a gradient value in a horizontal direction or a vertical direction of a first corresponding reference pixel in the first reference block which corresponds to a current pixel included in a current pixel group in the current block, a gradient value in a horizontal direction or a vertical direction of a second corresponding reference pixel in the second reference block which corresponds to the current pixel, a pixel value of the first corresponding reference pixel, a pixel value of the second corresponding reference pixel, and a displacement vector of the current pixel in a horizontal direction or vertical direction.

That is, the video decoding apparatus 100 may generate the prediction block of the current block by performing the block-unit motion compensation and the pixel group unit motion compensation on the current block, based on the first motion vector and the second motion vector. The video decoding apparatus 100 may perform the block-unit motion compensation on the current block by using pixel values of the first reference block indicated by first motion vector and pixel values of the second reference block indicated by the second motion vector. Also, the video decoding apparatus 100 may perform pixel group unit motion compensation on the current pixel group by using a gradient value in a horizontal direction or a vertical direction of at least one first corresponding reference pixel in the first reference block corresponding to at least one pixel included in the current pixel group in the current block, a gradient value in a horizontal direction or a vertical direction of at least one second corresponding reference pixel in the second reference block corresponding to the at least one pixel, the pixel value of the first corresponding reference pixel, the pixel value of the second corresponding reference pixel, and the displacement vector of the current pixel in a horizontal direction or a vertical direction.

The video decoding apparatus 100 may obtain the prediction block of the current block by using a block-unit motion-compensated value generated by performing the block-unit motion compensation on the current block, and a pixel group unit motion-compensated value generated by performing the pixel group unit motion compensation on the current pixel group.

In operation S125, the video decoding apparatus 100 may obtain, from the bitstream, information about a residual block of the current block.

In operation S130, the video decoding apparatus 100 may reconstruct the current block based on the prediction block and the residual block. That is, the video decoding apparatus 100 may generate a pixel value of a reconstructed block of the current block by summing a pixel value of the residual block which is indicated by the information about the residual block of the current block and a predicted pixel value of the prediction block.

Figure 1C:
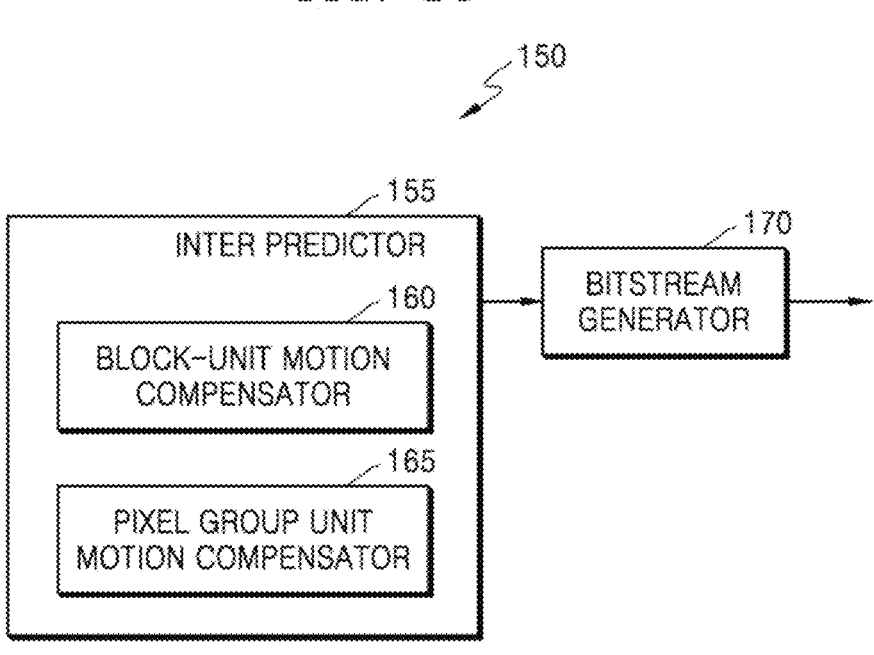
FIG. 1C illustrates a block diagram of a video encoding apparatus, according to various embodiments.

FIG. 1C illustrates a block diagram of a video encoding apparatus, according to various embodiments.

A video encoding apparatus 150 according to various embodiments includes an inter predictor 155 and a bitstream generator 170.

The inter predictor 155 performs inter prediction on a current block by referring to various blocks based on rate and distortion costs. That is, the inter predictor 155 may generate a predicted pixel value of the current block by using at least one of pictures that have been encoded prior to a current picture including the current block.

The inter predictor 155 may include a block-unit motion compensator 160 and a pixel group unit motion compensator 165.

The block-unit motion compensator 160 may generate a block-unit motion-compensated value by performing block-unit motion compensation on the current block.

The block-unit motion compensator 160 may determine at least one reference picture from among picture that have been previously decoded, and may determine a reference block of the current block which is located in the at least one reference picture.

The block-unit motion compensator 160 may generate the block-unit motion-compensated value by performing the block-unit motion compensation on the current block by using a pixel value of the reference block. The block-unit motion compensator 160 may generate the block-unit motion-compensated value by performing the block-unit motion compensation on the current block by using a value of a reference pixel of the reference block, the reference pixel corresponding to a current pixel of the current block.

The block-unit motion compensator 160 may generate the block-unit motion-compensated value by performing the block-unit motion compensation on the current block by using a plurality of reference blocks respectively included in a plurality of reference pictures. For example, when a motion prediction mode of the current block indicates a bi-directional prediction mode, the block-unit motion compensator 160 may determine two reference pictures from among the previously-encoded pictures, and may determine two reference blocks included in the two reference pictures. In this regard, bi-directional prediction may not be limited to inter prediction using a picture of which display order is prior to the current block and a picture of which display order is after the current block, and may indicate inter prediction using two pictures that have been encoded prior to the current picture, regardless of a display order.

The block-unit motion compensator 160 may generate the block-unit motion-compensated value by performing the block-unit motion compensation on the current block by using values of two reference pixels in the two reference blocks. The block-unit motion compensator 160 may generate the block-unit motion-compensated value by performing the block-unit motion compensation on the current block by using an average pixel value or a weighted sum of the two reference pixels.

The block-unit motion compensator 160 may output a reference picture index indicating a reference picture for motion compensation on the current block, the reference picture being from among the previously-encoded pictures.

The block-unit motion compensator 160 may determine a motion vector of which start point is the current block and end point is a reference block of the current block, and may output the motion vector. The motion vector may mean a vector indicating displacement between reference coordi-nates of the current block in the current picture and reference coordinates of the reference block in the reference picture. For example, when upper-left coordinates of the current block are (1,1), and upper-left coordinates of the reference block in the reference picture are (3,3), a motion vector may be (2,2).

A reference location of the reference block may be a location of an integer pixel but is not limited thereto and thus may be a location of a fractional pixel. In this regard, a location of the fractional pixel may be determined in a ¼ pel unit or a 1/16 pel unit. However, the disclosure is not limited thereto, and thus the location of the fractional pixel may be determined according to various fraction pel units.

For example, when the reference location of the reference block is (1.5, 1.5), and coordinates of an upper-left corner of the current block are (1,1), the motion vector may be (0.5,0.5). When the motion vector is determined in a ¼ or 1/16 pel unit to indicate the reference location of the reference block, which is a location of a fractional pixel, a motion vector of an integer may be determined by scaling the motion vector, and the reference location of the reference block may be determined by using the up-scaled motion vector. When the reference location of the reference block is a location of a fractional pixel, a location of the reference pixel of the reference block may also be a location of a fractional pixel. Accordingly, a pixel value at a fractional pixel location in the reference block may be determined by using pixel values of neighboring pixels in which a com-ponent in a predetermined direction is an integer.

For example, the block-unit motion compensator 160 may determine, as the pixel value of the reference pixel at the fractional pixel location, a value obtained by performing filtering on pixel values of neighboring pixels in which a component in a predetermined direction is an integer, by using an interpolation filter, and may determine the motion-compensated value in block units with respect to the current block, by using the pixel value of the reference pixel. In this regard, the interpolation filter may be a DCT-based M-tap interpolation filter. A coefficient of the DCT-based M-tap interpolation filter may be derived from DCT and IDCT. In this regard, the coefficient of the interpolation filter may be a filter coefficient scaled to an integer coefficient so as to decrease real number operations while the filtering is per-formed.

In this regard, the interpolation filter may be a 1D interpolation filter in a horizontal direction or a vertical direction.

The block-unit motion compensator 160 may determine the pixel value of the reference pixel at the fractional pixel location by first performing filtering on neighboring integer pixels by using a 1D vertical direction interpolation filter, and then performing filtering on a value on which the filtering has been performed, by using a 1D horizontal direction interpolation filter. When a scaled filter coefficient is used, the block-unit motion compensator 160 may per-form de-scaling on a value on which filtering has been performed, after performing filtering on a pixel at an integer location by using the 1D vertical direction interpolation filter. In this regard, the de-scaling may include bit-shifting to the right by the number of de-scaling bits. The number of de-scaling bits may be determined based on a bit depth of a sample. For example, the number of de-scaling bits may be a value obtained by subtracting 8 from the bit depth of the sample.

Also, the block-unit motion compensator 160 may per-form filtering on a pixel, in which a horizontal direction component is an integer, by using the 1D vertical direction interpolation filter, and then may perform the bit-shifting to the right by the number of de-scaling bits. The number of de-scaling bits may be determined based on a scaling bit number with respect to a coefficient of the 1D vertical direction interpolation filter, a scaling bit number with respect to a coefficient of the 1D horizontal direction interpolation filter, and the bit depth of the sample.

When the block-unit motion compensator 160 only performs bit-shifting to the right by the number of de-scaling bits, a round-off error may occur. Therefore, the block-unit motion compensator 160 may perform filtering on the pixel in which a predetermined directional component is an integer by using a ID interpolation filter in a predetermined direction, may add an offset value to a value on which the filtering has been performed, and then may perform de-scaling on the value to which the offset value has been added. In this regard, the offset value may be 2^(number of de-scaling bits−1).

Hereinabove, determining of the number of de-scaling bits based on the bit depth of the sample after filtering using the 1D vertical direction interpolation filter has been described, but the disclosure is not limited thereto, and thus the number of de-scaling bits may be determined not only the bit depth of the sample but also based on a number of bits scaled with respect to an interpolation filter coefficient. That is, the number of de-scaling bits may be determined based on the bit depth of the sample and the number of bits scaled with respect to the interpolation filter coefficient, within a range that overflow does not occur, while considering a size of a register used during filtering and a size of a buffer storing a value generated during the filtering.

The pixel group unit motion compensator 165 may generate a pixel group unit motion-compensated value by performing pixel group unit motion compensation on the current block. In this regard, when a motion prediction mode is a bi-directional motion prediction mode, the pixel group unit motion compensator 165 may generate the pixel group unit motion-compensated value by performing the pixel group unit motion compensation on the current block.

The pixel group unit motion compensator 165 may generate the pixel group unit motion-compensated value by performing the pixel group unit motion compensation on the current block by using gradient values of pixels included in a reference block of the current block.

The pixel group unit motion compensator 165 may generate a gradient value of a first pixel from among pixels of a first reference block in a first reference picture and a gradient value of a second pixel from among pixels of a second reference block in a second reference picture by applying a filter to a first neighboring region of the first pixel and a second neighboring region of the second pixel.

The pixel group unit motion compensator 165 may determine pixel values and gradient values of pixels in a first window having a predetermined size and including the first reference pixel with respect to the first reference pixel in the first reference picture, and may determine pixel values and gradient values of pixels in a second window having a predetermined size and including the second reference pixel with respect to the second reference pixel in the second reference picture. The pixel group unit motion compensator 165 may determine a displacement vector per unit time with respect to the current pixel by using the pixel values and gradient values of the pixels in the first window and the pixel values and gradient values of the pixels in the second window.

The pixel group unit motion compensator 165 may generate the pixel group unit motion-compensated value by performing the pixel group unit motion compensation on the current block by using the displacement vector per unit time and the gradient value of the reference pixel.

A reference location of the reference pixel may be a location of an integer pixel but is not limited thereto and thus may be a location of a fractional pixel.

When the reference location of the reference block is the location of the fractional pixel, the gradient value of the reference pixel in the reference block may be determined by using pixel values of neighboring pixels in which predetermined directional components are integers.

For example, the pixel group unit motion compensator 165 may determine, as the gradient value of the reference pixel, a resultant value obtained by performing filtering on the pixel values of the neighboring pixels, in which a predetermined directional component is an integer, by using a gradient filter. In this regard, a filter coefficient of the gradient filter may be determined by using a coefficient predetermined with respect to a DCT-based interpolation filter.

A coefficient of the gradient filter may be the filter coefficient that is scaled to an integer coefficient to decrease real number operations while filtering is performed. In this regard, the gradient filter may be a 1D horizontal direction gradient filter or a 1D vertical direction gradient filter.

The pixel group unit motion compensator 165 may perform, by using the 1D horizontal direction gradient filter or the 1D vertical direction gradient filter, filtering on a neighboring pixel in which a corresponding directional component is an integer so as to determine a gradient value in a horizontal direction or a vertical direction with respect to the reference pixel.

For example, the pixel group unit motion compensator 165 may determine a pixel value of a pixel, in which a vertical component is a fraction, by performing filtering on pixels, in which a vertical component is an integer, from among pixels in a vertical direction from an integer pixel adjacent to a reference pixel, by using the 1D vertical direction interpolation filter.

With respect to a pixel located in another column adjacent to the integer pixel adjacent to the reference pixel, the pixel group unit motion compensator 165 may determine a pixel value of a fractional pixel location located in the other column by performing filtering on a neighboring integer pixel in the vertical direction, by using the 1D vertical direction interpolation filter. In this regard, a location of the pixel located in the other column may be a location of a fractional pixel in the vertical direction and a location of an integer pixel in the horizontal direction.

That is, when the location of the reference pixel is (x+α, y+β) (where, x and y are integers and a and 3 are fractions), the pixel group unit motion compensator 165 may determine a pixel value at a (x, y+β) location by performing filtering on a neighboring integer pixel in the vertical direction from a (x, y) location by using a vertical direction interpolation filter.

The pixel group unit motion compensator 165 may determine a gradient value at a (x+α, y+β) location in the horizontal direction by performing filtering on the pixel value at the (x, y+β) location and a pixel value of a pixel, in which a horizontal component is an integer, from among pixels located in the horizontal direction from the pixel value at the (x, y+β) location, by using a horizontal direction gradient filter.

An order of using the 1D gradient filter and the 1D interpolation filter is not limited. As described above, an interpolation filtered value in a vertical direction may be first generated by performing filtering on a pixel at an integer location by using the 1D vertical direction interpolation filter, and then filtering may be performed on the interpolation filtered value in the vertical direction by using the 1D horizontal direction gradient filter, but the disclosure is not limited thereto, and thus a gradient filtered value in the horizontal direction may be generated first by performing filtering on the pixel at the integer location by using the 1D horizontal direction gradient filter, and then filtering may be performed on the gradient filtered value in the horizontal direction by using the 1D vertical direction interpolation filter.

Hereinabove, the pixel group unit motion compensator 165 determining the gradient value in the horizontal direction at the $(x+\alpha, y+\beta)$ location has been described in detail.

The pixel group unit motion compensator 165 may determine a gradient value in a vertical direction at a $(x+\alpha, y+\beta)$ location in the similar manner as determining of the gradient value in the horizontal direction.

The pixel group unit motion compensator 165 may determine a gradient value of a reference pixel in a vertical direction by performing filtering on a neighboring integer pixel in the vertical direction from integer pixels adjacent to the reference pixel, by using the 1D vertical direction gradient filter. With respect to a pixel adjacent to the reference pixel and located in another column, the pixel group unit motion compensator 165 may determine a gradient value in the vertical direction with respect to the pixel adjacent to the reference pixel and located in the other column by performing filtering on a neighboring integer pixel in the vertical direction, by using the 1D vertical direction gradient filter. In this regard, a location of the pixel may be a location of a fractional pixel in the vertical direction and a location of an integer pixel in a horizontal direction.

That is, when a location of a reference pixel is $(x+\alpha, y+\beta)$ (where, x and y are integers and $\alpha$ and $\beta$ are fractions), the pixel group unit motion compensator 165 may determine a gradient value in a vertical direction at a $(x, y+3)$ location by performing filtering on a neighboring integer pixel in the vertical direction from a $(x, y)$ location, by using the vertical direction gradient filter.

The pixel group unit motion compensator 165 may determine a gradient value in a vertical direction at a $(x+\alpha, y+\beta)$ location by performing filtering on a gradient value at a $(x, y+\beta)$ location and a gradient value of a neighboring integer pixel located in a horizontal direction from the $(x, y+\beta)$ location, by using the horizontal direction interpolation filter.

An order of using the 1D gradient filter and the 1D interpolation filter is not limited. As described above, a gradient filtered value in a vertical direction may be first generated by performing filtering on pixels at an integer location by using the 1D vertical direction gradient filter, and then filtering may be performed on the gradient filtered value in the vertical direction by using the 1D horizontal direction interpolation filter, but the disclosure is not limited thereto and thus, an interpolation filtered value in the horizontal direction may be generated first by performing filtering on the pixel at the integer location by using the 1D horizontal direction interpolation filter, and then filtering may be performed on the interpolation filtered value in the horizontal direction by using the 1D vertical direction gradient filter.

Hereinabove, the pixel group unit motion compensator 165 using a gradient filter and an interpolation filter so as to determine a gradient value at a fractional pixel location has been described in detail. However, the disclosure is not limited thereto and thus, a gradient filter and an interpolation filter may be used to determine a gradient value at an integer pixel location.

In a case of an integer pixel, a pixel value thereof may be determined without using an interpolation filter, but filtering may be performed on the integer pixel and a neighboring integer pixel by using the interpolation filter for processes uniform with respect to processes in a fractional pixel. For example, the interpolation filter coefficient in the integer pixel may be $\{0, 0, 64, 0, 0\}$, and because an interpolation filter coefficient related to a neighboring integer pixel is 0, filtering may be performed by using only a pixel value of a current integer pixel, and as a result, filtering may be performed on the current integer pixel and the neighboring integer pixel by using an interpolation filter so as to determine the pixel value of the current integer pixel.

When a scaled filter coefficient is used, the pixel group unit motion compensator 165 may perform filtering on a pixel at an integer location by using the 1D horizontal direction gradient filter, and then may perform de-scaling on a value on which the filtering has been performed. In this regard, the de-scaling may include bit-shifting to the right by the number of de-scaling bits. The number of de-scaling bits may be determined based on a bit depth of a sample. For example, the number of de-scaling bits may be a value obtained by subtracting 8 from the bit depth of the sample.

The pixel group unit motion compensator 165 may perform filtering on a pixel, in which a vertical directional component is an integer, by using the vertical direction interpolation filter, and then may perform de-scaling. In this regard, the de-scaling may include bit-shifting to the right by the number of de-scaling bits. The number of de-scaling bits may be determined based on a scaling bit number of the 1D vertical direction interpolation filter, a scaling bit number of the 1D horizontal direction gradient filter, and the bit depth of the sample.

When the pixel group unit motion compensator 165 only performs bit-shifting to the right by the number of de-scaling bits, a round-off error may occur. Therefore, after filtering is performed by using the 1D interpolation filter, an offset value may be added to a value on which the filtering has been performed, and de-scaling may be performed on the value to which the offset value has been added. In this regard, the offset value may be $2^{(\text{bit shifting number}-1)}$ The inter predictor 110 may use a motion vector while performing block-unit motion compensation, and may store the motion vector. In this regard, a unit of the motion vector may be a block of a 4×4 size. When the motion vector is stored after the block-unit motion compensation is performed, a motion vector storage unit may not be the 4×4 size but may be a block having various sizes (e.g., a block of an R×R size; where R is an integer). In this regard, the motion vector storage unit may be a block larger than the 4×4 size. For example, it may be a block of a 16×16 size.

When the pixel group unit motion compensation is performed, a size of a target block on which the pixel group unit motion compensation is to be performed may be enlarged, based on a size of the current block, a size of a window, and a length of the interpolation filter. The reason why the size of the target block is enlarged based on the size of the window, compared to the size of the current block, is because, for a pixel located at an edge of the current block, the pixel group unit motion compensation is performed on the current block based on the pixel located at the edge of the current block and a neighboring pixel by using the window.

Therefore, to decrease the number of memory accesses and decrease performing of a multiplication operation, while the pixel group unit motion compensation is performed by using the window, the pixel group unit motion compensator 120 adjust a location of a pixel deviating from the current block from among pixels in the window to a location of a pixel adjacent to the inside of the current block, and thus may determine a pixel value and a gradient value at the adjusted location of the pixel, such that the number of memory accesses and the number of multiplication operations may be decreased.

The pixel group unit motion compensator 120 may not use the pixel values of the pixels at the integer locations so as to determine gradient values of the reference pixels which are necessary values for the pixel group unit motion compensation. That is, the pixel group unit motion compensator 120 may calculate a gradient value of a first corresponding reference pixel in the first reference block in a horizontal direction or a vertical direction or a second corresponding reference pixel in the second reference block by applying the horizontal direction gradient filter or the vertical direction gradient filter to pixel values of pixels at fractional locations. In this regard, a length of the gradient filter may be 5. A coefficient of the gradient filter may have coefficients that are symmetrical with respect to a center coefficient of the filter. A pixel at a fractional location may be a pixel in which at least one of a horizontal direction component and a vertical direction component which indicate a location of the pixel has a fractional value.

Pixel values of pixels at fractional locations in the first reference block or the second reference block may have been calculated by applying the horizontal direction interpolation filter or the vertical direction interpolation filter to pixel values of pixels at integer locations.

A displacement vector per unit time in a horizontal direction or a vertical direction with respect to a current pixel group may be a displacement vector per unit time determined by using first corresponding reference pixels in a first corresponding reference pixel group in the first reference picture and second corresponding reference pixels in a second corresponding reference pixel group in the second reference picture which correspond to the current pixel group, pixel values of neighboring pixels of the first and second corresponding reference pixels thereof, gradient values of the first and second corresponding reference pixels and the neighboring pixels of the first and second corresponding reference pixels, a first POC difference between the first reference picture and the current picture, and a second POC difference between the second reference picture and the current picture.

When the first corresponding reference pixel or the second corresponding reference pixel is a boundary neighboring pixel adjacent to the inside of a boundary of the first reference block or the second reference block, the pixel group unit motion compensator 120 may derive, by using a pixel value of the boundary neighboring pixel, a pixel value of a pixel located outside the boundary of the first reference block or the second reference block.

The pixel group unit motion compensator 120 may determine a displacement vector per unit time of the current block in a horizontal direction or a vertical direction, based on the pixel value of the boundary neighboring pixel and the pixel value of the pixel located outside the boundary of the current block, the pixel value of the pixel being derived by using the pixel value of the boundary neighboring pixel. That is, the pixel located outside the boundary may be present from among pixels included in a window with respect to the boundary neighboring pixel, and in this regard, the pixel value and a gradient value of the pixel located outside the boundary may be a pixel value and a gradient value of the pixel which are not included in a memory but are derived from the boundary neighboring pixel.

The pixel group unit motion compensator 120 may calculate a value about the current pixel by using a pixel value of the first corresponding reference pixel included in the first reference block, a pixel value of the second corresponding reference pixel included in the second reference block, a gradient value of the first corresponding reference pixel, a gradient value of the second corresponding reference pixel, a first POC difference between the first reference picture and the current picture, and a second POC difference between the second reference picture and the current picture. That is, the value about the current pixel may be a resultant value of a function based on a pixel value of a corresponding reference pixel of each reference picture, a gradient value, and a POC difference between each reference picture and the current picture.

The pixel group unit motion compensator 120 may calculate values about neighboring pixels by using pixel values of first corresponding neighboring pixels of the first corresponding reference pixel, gradient values of the first corresponding neighboring pixels, pixel values of second corresponding neighboring pixels of the second corresponding reference pixel, gradient values of the second corresponding neighboring pixels, the first POC difference between the first reference picture and the current picture, and the second POC difference between the second reference picture and the current picture. That is, the value about the neighboring pixel may be a resultant value of a function based on the pixel value of the corresponding reference pixel of each reference picture, the gradient value, and the POC difference between each reference picture and the current picture. That is, the value about the corresponding neighboring pixel may be a resultant value of a function based on a pixel value of a corresponding neighboring pixel of each reference picture, a gradient, and the POC difference between each reference picture and the current picture.

The pixel group unit motion compensator 120 may calculate a weighted average value for the current pixel which is required to calculate a displacement vector per unit time in a horizontal direction, by using the value about the current pixel, the values about the corresponding neighboring pixels, and a weight. In this regard, the weight may be determined based on a distance between the current pixel and the neighboring pixel, a distance between a pixel and a boundary of a block, the number of pixels located outside the boundary, or whether the pixel is located in the inside of the boundary or outside the boundary.

The weighted average value for the current pixel may be a value that has been calculated by applying an exponential smoothing technique in vertical and horizontal directions to values about the pixels included in the first reference block and the second reference block. The value that has been calculated with respect to the current pixel by applying the exponential smoothing technique in vertical and horizontal directions to the values about the pixels may be a value of which weight with respect to the value about the current pixel is largest and weight with respect to a value about a neighboring pixel thereof is exponentially decreased according to distances from the current pixel.

The pixel group unit motion compensator 120 may determine the displacement vector per unit time of the current pixel in a horizontal direction or a vertical direction by using the weighted average value of the current pixel.

The inter predictor 155 may generate the predicted pixel value of the current block by using the block-unit motion-compensated value with respect to the current block and the pixel group unit motion-compensated value with respect to the current block. For example, the inter predictor 155 may generate the predicted pixel value of the current block by adding the block-unit motion-compensated value and the pixel group unit motion-compensated value with respect to the current block. In particular, when the motion prediction mode of the current block is a bi-directional motion prediction mode, the inter predictor 155 may generate the predicted pixel value of the current block by using the block-unit motion-compensated value and the pixel group unit motion-compensated value with respect to the current block.

When the motion prediction mode of the current block is a uni-directional motion prediction mode, the inter predictor 155 may generate the predicted pixel value of the current block by using the block-unit motion-compensated value and the pixel group unit motion-compensated value with respect to the current block. In this regard, a uni-direction indicates using of one reference picture from among pictures that were previously encoded. The one reference picture is not limited to a picture prior to the current picture in a display order but may be a picture displayed after the current picture.

The inter predictor 155 may determine the motion prediction mode of the current block, and may output information indicating the motion prediction mode of the current block. For example, the inter predictor 155 may determine the motion prediction mode of the current block to be a bi-directional motion prediction mode, and may output information indicating the bi-directional motion prediction mode. In this regard, the bi-directional motion prediction mode refers to a mode in which motion is predicted by using reference blocks in two decoded reference pictures.

The bitstream generator 170 may generate a bitstream including a motion vector indicating the reference block. The bitstream generator 170 may encode the motion vector indicating the reference block, and may generate a bitstream including the encoded motion vector. The bitstream generator 170 may encode a difference value of the motion vector indicating the reference block, and may generate a bitstream including the encoded difference value of the motion vector. In this regard, the difference value of the motion vector may indicate a difference between the motion vector and a predictor of the motion vector. In this regard, the difference value of the motion vector may indicate a difference value of motion vectors with respect to reference pictures respectively related to prediction directions including an L0 direction and an L1 direction. In this regard, the difference value of the motion vector with respect to the L0 direction may indicate a difference value of a motion vector indicating a reference block in a reference picture included in an L0 reference picture list, and the difference value of the motion vector with respect to the L1 direction may indicate a difference value of a motion vector indicating a reference block in a reference picture included in an L1 reference picture list.

Also, the bitstream generator 170 may generate the bitstream further including information indicating the motion prediction mode of the current block. The bitstream generator 170 may encode a reference picture index indicating the reference picture of the current block from among the previously encoded pictures, and may generate a bitstream including the encoded reference picture index. In this regard, the reference picture index may indicate a reference picture index with respect to each of the prediction directions including the L0 direction and the L1 direction. In this regard, the reference picture index with respect to the L0 direction may indicate an index indicating a reference picture among pictures included in the L0 reference picture list, and the reference picture index with respect to the L1 direction may indicate an index indicating a reference picture among pictures included in the L1 reference picture list.

The video encoding apparatus 150 may include an image encoder (not shown), and the image encoder may include the inter predictor 155 and the bitstream generator 170. The image encoder will be described below with reference to FIG. 1F.

Figure 1D:
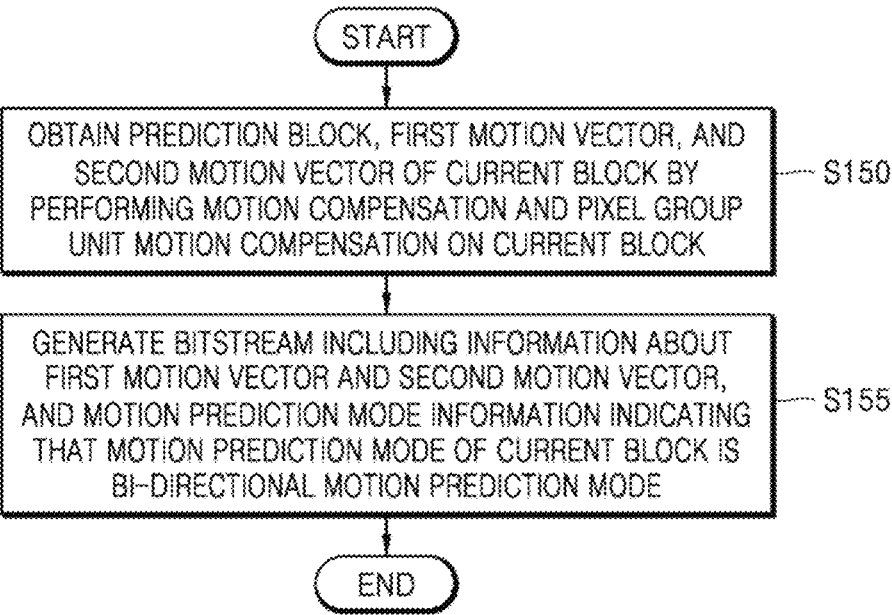
FIG. 1D illustrates a flowchart of a video encoding method, according to various embodiments.

FIG. 1D illustrates a flowchart of a video encoding method according to various embodiments.

Referring to FIG. 1D, in operation S150, the video encoding apparatus 150 may obtain a prediction block, a first motion vector, and a second motion vector of a current block, and a parameter with respect to pixel group unit motion compensation by performing motion compensation and the pixel group unit motion compensation on the current block.

In operation S155, the video encoding apparatus 150 may generate a bitstream including information about the first motion vector and the second motion vector, and motion prediction mode information indicating that a motion prediction mode of the current block is a bi-directional motion prediction mode. In this regard, the first motion vector may be a motion vector indicating, from the current block, a first reference block of a first reference picture which corresponds to the current block in a current picture, and the second motion vector may be a motion vector indicating, from the current block, a second reference block of a second reference picture which corresponds to the current block in the current picture.

The video encoding apparatus 150 may encode a residual block of the current block which indicates a difference between a pixel of the prediction block of the current block and an original block of the current block, and may generate the bitstream further including the encoded residual signal. The video encoding apparatus 150 may encode information about the prediction mode of the current block and a reference picture index, and may generate the bitstream further including the encoded information about the prediction mode of the current block and the encoded reference picture index. For example, the video encoding apparatus 150 may encode information indicating that the prediction mode of the current block is an inter prediction mode and the reference picture index indicating at least one picture from among previously decoded pictures, and may generate the bitstream further including the encoded information about the prediction mode of the current block and the encoded reference picture index.

The video encoding apparatus 150 may perform block-unit motion compensation and pixel group unit motion compensation on the current block by using a gradient value in a horizontal direction or a vertical direction of a first corresponding reference pixel in the first reference block which corresponds to a current pixel included in a current pixel group in the current block, a gradient value in a horizontal direction or a vertical direction of a second corresponding reference pixel in the second reference block which corresponds to the current pixel, a pixel value of the first corresponding reference pixel, a pixel value of the second corresponding reference pixel, and a displacement vector per unit time of the current pixel in a horizontal direction or vertical direction. The video encoding apparatus 150 may obtain the prediction block of the current block by performing the block-unit motion compensation and the pixel group unit motion compensation on the current block.

In this regard, the displacement vector per unit time in a horizontal direction or vertical direction of pixels of the current block including a pixel adjacent to the inside of a boundary of the current block may be determined by using values about reference pixels included in the first reference block and the second reference block, without using a stored value about a pixel located outside boundaries of the first reference block and the second reference block. The values about the reference pixels included in the first reference block and the second reference block may be pixel values or gradient values of the reference pixels.

Figure 1E:
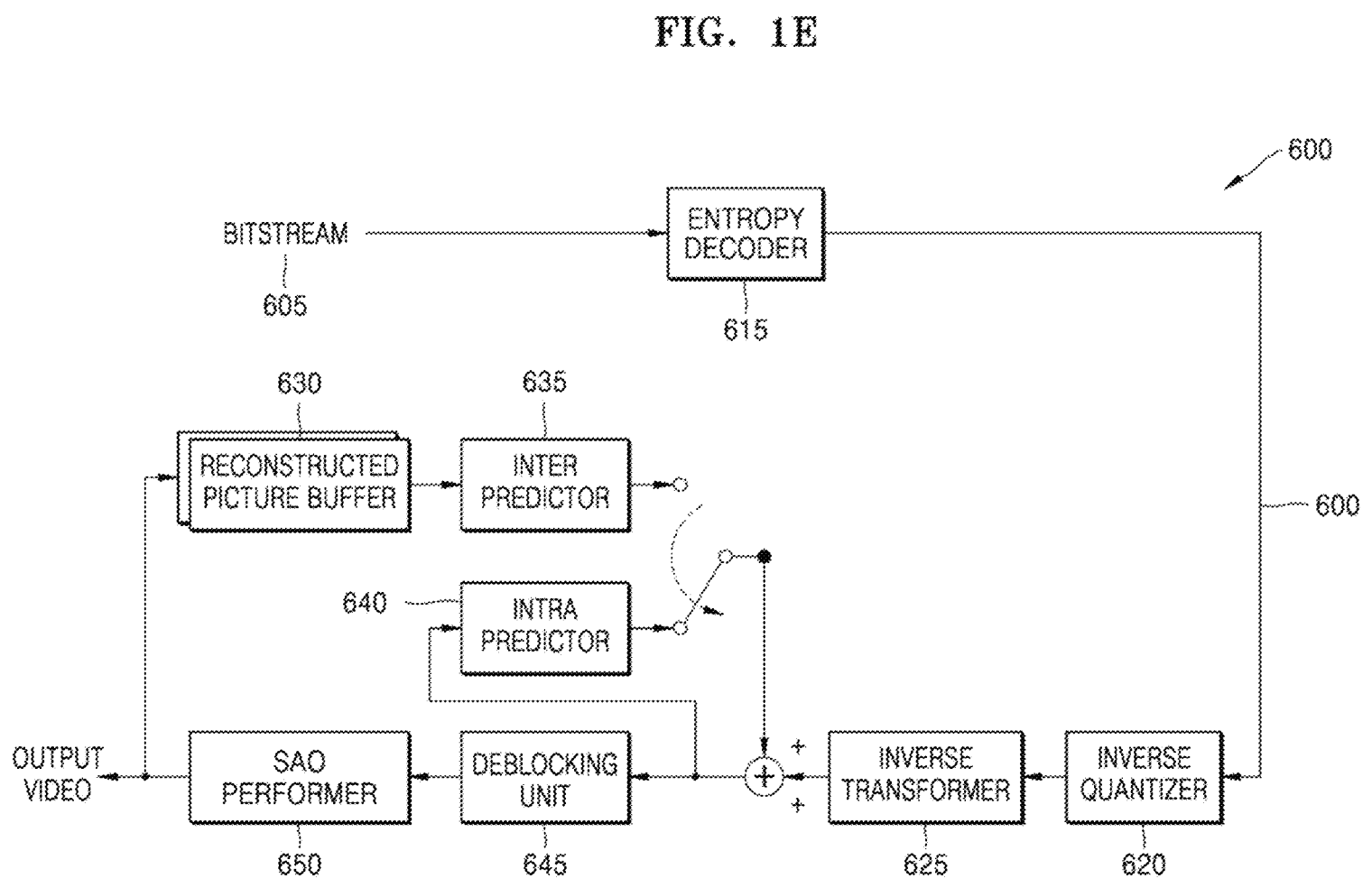

FIG. 1E illustrates a block diagram of an image decoder 600 according to various embodiments.

The image decoder 600 according to various embodiments performs operations performed by the image decoder (not shown) of the video decoding apparatus 100 to decode image data.

Referring to FIG. 1E, an entropy decoder 615 parses, from a bitstream 605, encoded image data to be decoded and encoding information required for decoding. The encoded image data is a quantized transform coefficient, and an inverse quantizer 620 and an inverse transformer 625 reconstruct residue data from the quantized transform coefficient.

An intra predictor 640 performs intra prediction per block. An inter predictor 635 performs inter prediction by using a reference image obtained from a reconstructed picture buffer 630, per block. The inter predictor 635 of FIG. 1E may correspond to the inter predictor 110 of FIG. 1A.

Data of a spatial domain with respect to a block of a current image 605 may be reconstructed by adding prediction data and the residue data of each block generated by the intra predictor 640 or the inter predictor 635, and a deblocking unit 645 and a sample-adaptive offset (SAO) performer 650 may output a filtered reconstructed image 660 by performing loop filtering on the reconstructed data of the spatial domain. Also, reconstructed images stored in the reconstructed picture buffer 630 may be output as a reference image.

In order for a decoder (not shown) of the video decoding apparatus 100 to decode image data, stepwise operations of the image decoder 600 according to various embodiments may be performed per block.

Figure 1F:
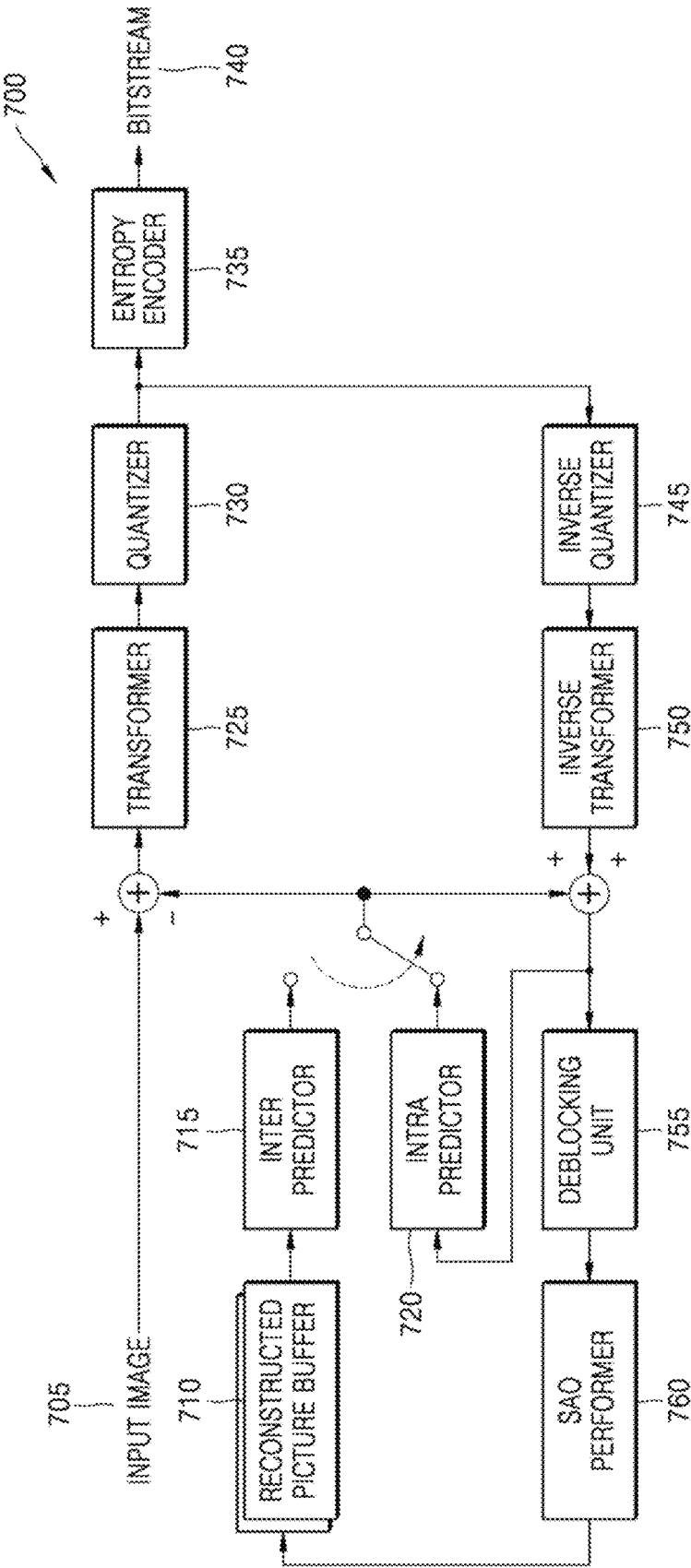
FIG. 1F illustrates a block diagram of an image encoder according to various embodiments.

FIG. 1F illustrates a block diagram of an image encoder according to various embodiments.

An image encoder 700 according to various embodiments performs operations performed by the image encoder (not shown) of the video encoding apparatus 150 to encode image data.

That is, an intra predictor 720 performs intra prediction per block on a current image 705, and an inter predictor 715 performs inter prediction by using the current image 705 per block and a reference image obtained from a reconstructed picture buffer 710. In this regard, the inter predictor 715 of FIG. 1E may correspond to the inter predictor 155 of FIG. 1C.

Residue data may be generated by subtracting prediction data regarding each block output from the intra predictor 720 or the inter predictor 715 from data regarding an encoded block of the current image 705, and a transformer 725 and a quantizer 730 may output a transform coefficient quantized per block by performing transform and quantization on the residue data. An inverse quantizer 745 and an inverse transformer 750 may reconstruct residue data of a spatial domain by performing inverse quantization and inverse transform on the quantized transform coefficient.

The reconstructed residue data of the spatial domain may be added to the prediction data regarding each block output from the intra predictor 720 or the inter predictor 715 to be reconstructed as data in spatial domain regarding a block of the current image 705. A deblocking unit 755 and an SAO performer 760 generate a filtered reconstructed image by performing in-loop filtering on the reconstructed data of the spatial domain. The generated reconstructed image is stored in the reconstructed picture buffer 710. Reconstructed images stored in the reconstructed picture buffer 710 may be used as reference images for inter prediction of another image. An entropy encoder 735 may entropy-encode the quantized transform coefficient, and the entropy-encoded coefficient may be output as a bitstream 740.

In order for the image encoder 700 according to various embodiments to be applied to the video encoding apparatus 150, stepwise operations of the image encoder 700 according to various embodiments may be performed per block.

Figure 2:
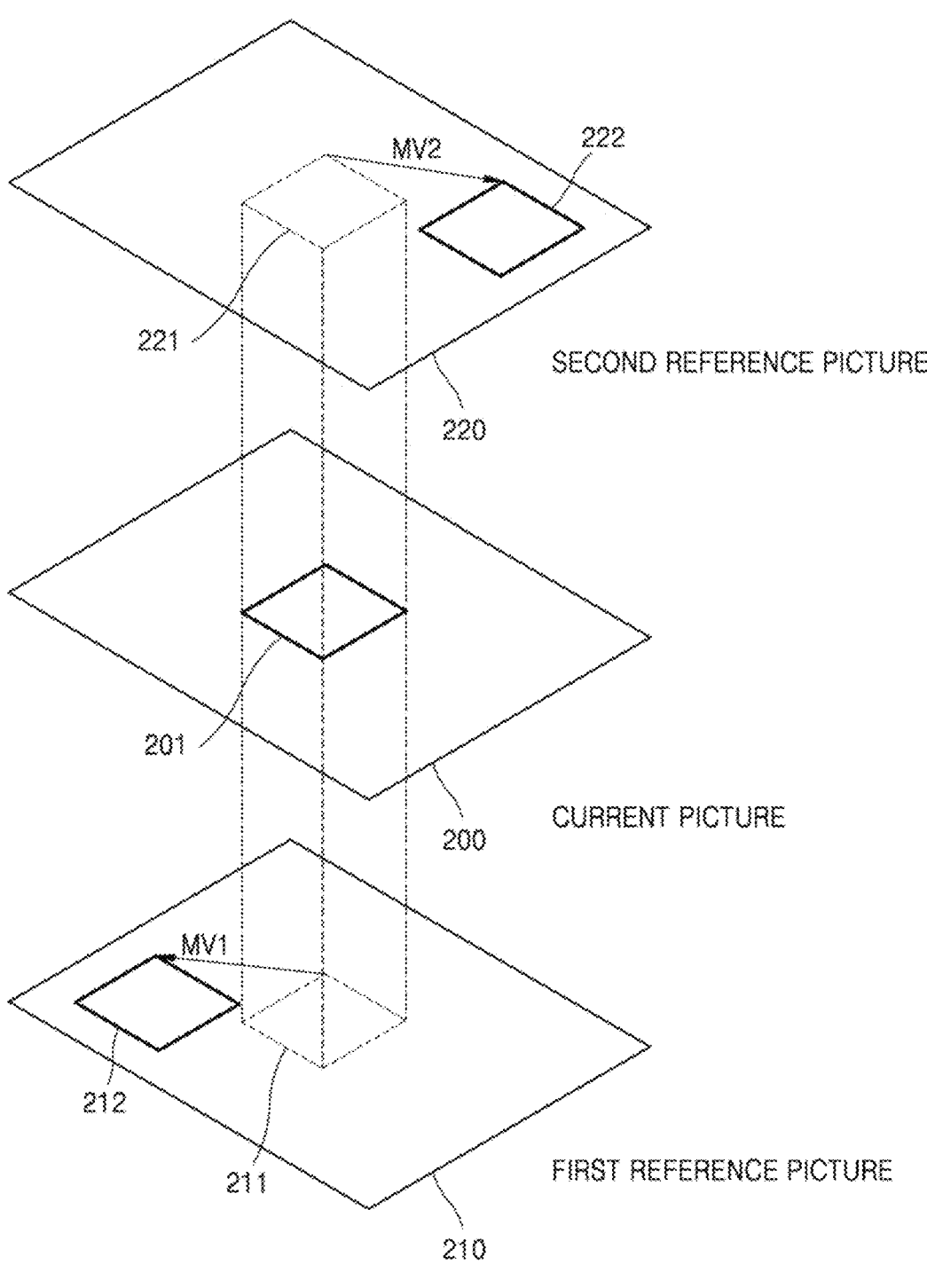
FIG. 2 is a reference diagram for describing block-based bi-directional motion prediction and compensation processes, according to an embodiment.

FIG. 2 is a reference diagram for describing block-based bi-directional motion prediction and compensation processes, according to an embodiment.

Referring to FIG. 2, the video encoding apparatus 150 performs bi-directional motion prediction in which a region most similar to a current block 201 of a current picture 200 to be encoded is searched for in a first reference picture 210 and a second reference picture 220. In this regard, it is assumed that the first reference picture 210 is a picture prior to the current picture 200, and the second reference picture 220 is a picture after the current picture 200. As a result of the bi-directional motion prediction, the video encoding apparatus 150 determines a first corresponding region 212 most similar to the current block 201 from the first reference picture 210, and a second corresponding region 222 most similar to the current block 201 from the second reference picture 220. In this regard, the first corresponding region 212 and the second corresponding region 222 may be reference regions of the current block 201.

The video encoding apparatus 150 may determine a first motion vector MV1 based on a location difference between the first corresponding region 212 and a block 211 of the first reference picture 210 at the same location as the current block 201, and may determine a second motion vector MV2 based on a location difference between the second corresponding region 222 and a block 221 of the second reference picture 220 at the same location as the current block 201.

The video encoding apparatus 150 performs block-unit bi-directional motion compensation on the current block 201 by using the first motion vector MV1 and the second motion vector MV2.

For example, when a pixel value located at (i, j) of the first reference picture 210 is $P0(i,j)$, a pixel value located at (i, j) of the second reference picture 220 is $P1(i,j)$, $MV1=(MVx1, MVy1)$, and $MV2=(MVx2, MVy2)$, wherein i and j are integers, a block-unit bi-directional motion compensation value $P\_BiPredBlock(i,j)$ of a pixel at a (i, j) location of the current block 201 may be calculated according to an equation: $P\_BiPredBlock(i,j)=\{P0(i+MVx1, j+MVy1)+P1(i+MVx2, j+MVy2)\}/2$. In this manner, the video encoding apparatus 150 may generate a block-unit motion-compensated value by performing block-unit motion compensation on the current block 201 by using an average value or weighted sum of pixels in the first and second corresponding regions 212 and 222 indicated by the first and second motion vectors MV1 and MV2.

Figure 3A:
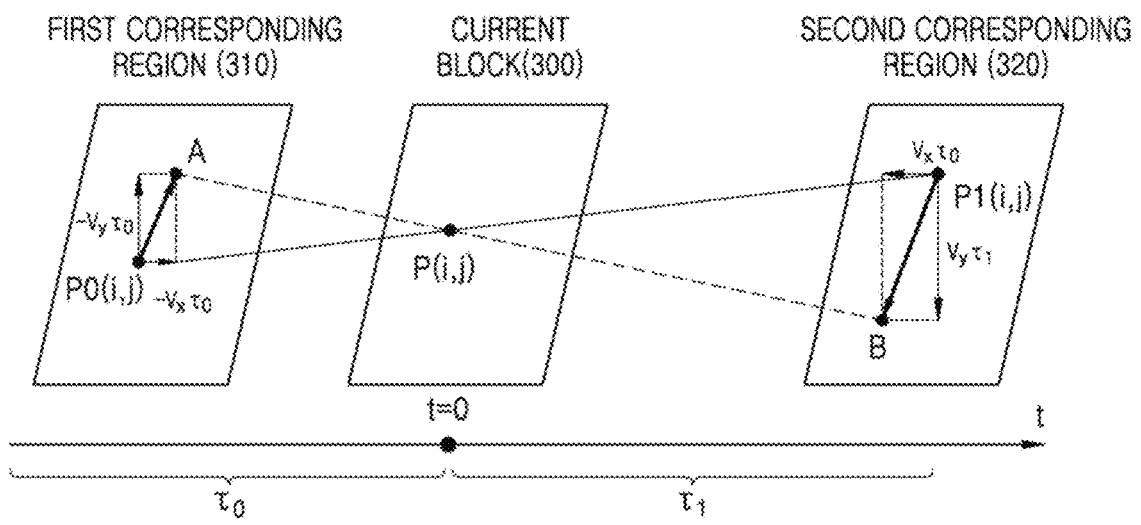
FIGS. 3A to 3C are reference diagrams for describing processes of performing pixel group unit motion compensation, according to an embodiment.
Figure 3B:
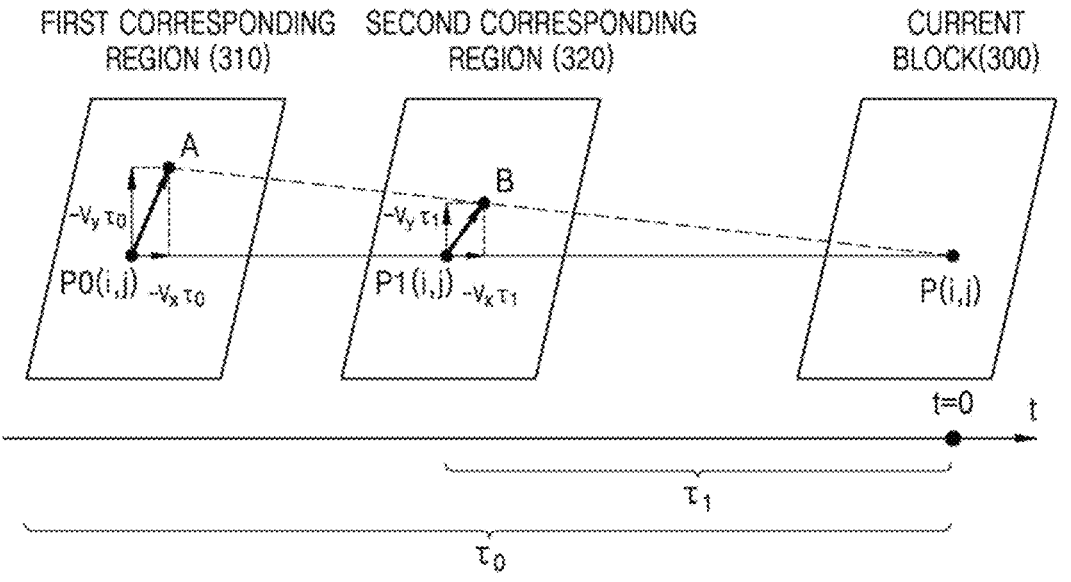
Figure 3C:
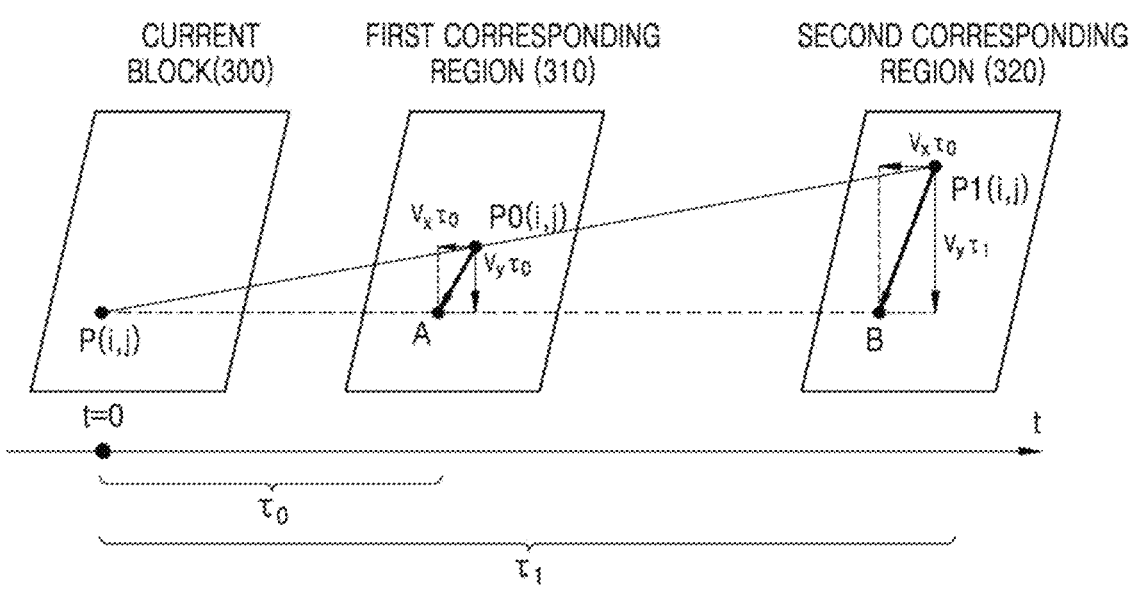

FIGS. 3A to 3C are reference diagrams for describing processes of performing pixel group unit motion compensation, according to an embodiment.

In FIG. 3A, it is assumed that a first corresponding region 310 and a second corresponding region 320 respectively correspond to the first corresponding region 212 and the second corresponding region 222 of FIG. 2, and have shifted to overlap a current block 300 by using bi-directional motion vectors MV1 and MV2.

Also, P(i,j) indicates a pixel of the current block 300 at a (i, j) location (where, i and j are integers) that is bi-directionally predicted, P0(i,j) indicates a first reference pixel value of a first reference picture corresponding to the pixel P(i,j) of the current block 300 that is bi-directionally predicted, and P1(i,j) indicates a second reference pixel value of a second reference picture corresponding to the pixel P(i,j) of the current block 300 that is bi-directionally predicted.

In other words, the first reference pixel value P0(i,j) is a pixel value of a pixel corresponding to the pixel P(i,j) of the current block 300 determined by the bi-directional motion vector MV1 indicating the first reference picture, and the second reference pixel value P1(i,j) is a pixel value of a pixel corresponding to the pixel P(i,j) of the current block 300 determined by the bi-directional motion vector MV2 indicating the second reference picture.

Also, it is defined that $$\frac{\partial P0(i,\ j)}{\partial x}$$

indicates a gradient value of a first reference pixel in a horizontal direction, $$\frac{\partial P0(i,\ j)}{\partial y}$$

indicates a gradient value of the first reference pixel in a vertical direction, $$\frac{\partial P1(i,\ j)}{\partial x}$$

indicates a gradient value of a second reference pixel in the horizontal direction, and $$\frac{\partial P1(i,\ j)}{\partial y}$$

indicates a gradient value of the second reference pixel in the vertical direction. Also, it is defined that $\tau_0$ indicates a temporal distance between a current picture to which the current block 300 belongs and the first reference picture to which the first corresponding region 310 belongs, and $\tau_1$ indicates a temporal distance between the current picture and the second reference picture to which the second corresponding region 320 belongs. In this regard, a temporal distance between pictures may indicate a difference of POCs of the pictures.

When there is uniform small motion in a video sequence, a pixel in the first corresponding region 310 of the first reference picture, which is most similar to the pixel P(i,j) on which bi-directional pixel group unit motion compensation is performed, is not the first reference pixel P0(i,j), but is a first displacement reference pixel PA, in which the first reference pixel P0(i,j) is moved by a predetermined displacement vector. Because it is assumed that, as described above, there is uniform motion in the video sequence, a pixel in the second corresponding region 320 of the second reference picture, which is most similar to the pixel P(i,j), may be a second displacement reference pixel PB, in which the second reference pixel P1(i,j) is moved by a predetermined displacement vector.

A displacement vector may include a displacement vector Vx in an x-axis direction and a displacement vector Vy in a y-axis direction. Accordingly, the pixel group unit motion compensator 165 calculates the displacement vector Vx in the x-axis direction and the displacement vector Vy in the y-axis direction included in the displacement vector, and may perform pixel group unit motion compensation by using the displacement vector.

An optical flow indicates a pattern of apparent motion on an object or surface, which is caused by relative motion between a scene and an observer (eyes or a video image obtaining apparatus such as a camera). In a video sequence, an optical flow may be expressed by calculating motion between frames obtained at arbitrary times t and t+Δt. A pixel value located at (x, y) in the frame of the time t may be defined as I(x,y,t). That is, I(x,y,t) may be a value that changes temporally and spatially. I(x,y,t) may be differentiated according to Equation 1 with respect to the time t.

$$\frac{dI}{dt} = \frac{\partial I}{\partial x}\frac{dx}{dt} + \frac{\partial I}{\partial y}\frac{dy}{dt} + \frac{\partial I}{\partial t} \qquad \text{[Equation 1]}$$

When a pixel value changes according to motion but does not change according to time with respect to small motion in a block, dI/dt is 0. Also, when it is assumed that motion of a change in a pixel value according to time is constant, dx/dt may indicate the displacement vector Vx of the pixel value I(x,y,t) in the x-axis direction and dy/dt may indicate the displacement vector Vy of the pixel value I(x,y,t) in the y-axis direction, and accordingly, Equation 1 may be expressed as Equation 2.

$$\frac{\partial I}{\partial t} + Vx \cdot \frac{\partial I}{\partial x} + Vy \cdot \frac{\partial I}{\partial y} = 0 \qquad \text{[Equation 2]}$$

In this regard, sizes of the displacement vector Vx in the x-axis direction and the displacement vector Vy in the y-axis direction may have a value smaller than pixel accuracy used in bi-directional motion prediction. For example, when the pixel accuracy is ¼ or ¹⁄₁₆ during the bi-directional motion prediction, the sizes of the displacement vectors Vx and Vy may have a value smaller than ¼ or ¹⁄₁₆.

The pixel group unit motion compensator 165 calculates the displacement vector Vx in the x-axis direction and the displacement vector Vy in the y-axis direction according to Equation 2, and performs pixel group unit motion compensation by using the displacement vectors Vx and Vy. In Equation 2, because the pixel value I(x,y,t) is a value of an original signal, high overheads may be caused during encoding when the value of the original signal is changelessly used. Accordingly, the pixel group unit motion compensator 165 may calculate the displacement vectors Vx and Vy according to Equation 2 by using pixels of the first reference picture and the second reference picture, which are determined as results of performing bi-directional block-unit motion compensation. That is, the pixel group unit motion compensator 165 determines the displacement vector Vx in the x-axis direction and the displacement vector Vy in the y-axis direction, in which $\Delta$ is minimum in a window $\Omega$ij having a predetermined size and including neighboring pixels around the pixel P(i,j) on which bi-directional motion compensation is performed. $\Delta$ may be 0, but the displacement vector Vx in the x-axis direction and the displacement vector Vy in the y-axis direction, which satisfy $\Delta=0$ with respect to all pixels in the window $\Omega$ij, may not exist, and thus the displacement vector Vx in the x-axis direction and the displacement vector Vy in the y-axis direction, in which $\Delta$ is minimum, are determined. Processes of obtaining the displacement vectors Vx and Vy will be described in detail with reference to FIG. 8A.

To determine a predicted pixel value of a current pixel, a function P(t) with respect to t may be determined according to Equation 3.

$$P(t) = a3 * t^3 + a2 * t^2 + a1 * t + a0 \qquad \text{[Equation 3]}$$

In this regard, it is assumed that a picture when t=0 is a current picture including a current block. Accordingly, the predicted pixel value of the current pixel included in the current block may be defined as a value of P(t) when t is 0.

When the temporal distance between the current picture and the first reference picture (the first reference picture is temporally prior to the current picture) is $\tau_0$ and the temporal distance between the current picture and the second reference picture (the second reference picture is temporally after the current picture) is $\tau_1$, a reference pixel value in the first reference picture is equal to $P(-\tau_0)$, and a reference pixel value in the second reference picture is equal to $P(\tau_1)$. Hereinafter, for convenience of calculation, it is assumed that $\tau_0$ and $\tau_1$ are both equal to $\tau$.

Coefficients of each degree of P(t) may be determined according to Equation 4. Here, P0(i,j) may indicate a pixel value at a (i,j) location of the first reference picture, and P1(i,j) may indicate a pixel value at a (i,j) location of the second reference picture.

$$a0 = \frac{1}{2}\left( P0(i,j) + P1(i,j) + \frac{\tau}{2}\left( \frac{\partial P0(i,j)}{\partial t} - \frac{\partial P1(i,j)}{\partial t} \right) \right) \qquad \text{[Equation 4]}$$

$$a1 = \frac{1}{4}\left( \frac{3}{\tau}(P0(i,j) - P1(i,j)) - \frac{\partial P0(i,j)}{\partial t} - \frac{\partial P1(i,j)}{\partial t} \right)$$

$$a2 = \frac{1}{4\tau}\left( \frac{\partial P0(i,j)}{\partial t} - \frac{\partial P1(i,j)}{\partial t} \right)$$

$$a3 = \frac{1}{4\tau^2}\left( \frac{1}{\tau}(P0(i,j) - P1(i,j)) + \frac{\partial P0(i,j)}{\partial t} + \frac{\partial P1(i,i)}{\partial t} \right)$$

Accordingly, a predicted pixel value P(0) of the current pixel in the current block may be determined according to Equation 5.

$$P(0) =$$
$$a0 = a0 = \frac{1}{2}\left( P0(i,j) + P1(i,j) + \frac{\tau}{2}\left( \frac{\partial P0(i,j)}{\partial t} - \frac{\partial P1(i,j)}{\partial t} \right) \right) \qquad \text{[Equation 5]}$$

Equation 5 may be expressed as Equation 6, in consideration of Equation 2.

$$P(0) = \qquad \text{[Equation 6]}$$
$$a0 = \frac{1}{2}\left( P0(j,i) + P1(i,j) + \frac{\tau Vx}{2}\left( \frac{\partial P1(i,j)}{\partial x} - \frac{\partial P0(i,j)}{\partial x} \right) + \frac{\tau Vy}{2}\left( \frac{\partial P1(i,j)}{\partial y} - \frac{\partial P0(i,j)}{\partial y} \right) \right)$$

Accordingly, the predicted pixel value of the current pixel may be determined by using the displacement vector Vx, the displacement vector Vy, gradient values of the first reference pixel in the horizontal and vertical directions, and gradient values of the second reference pixel in the horizontal and vertical directions. In this regard, a portion (P0(i,j)+P1(i,j))/2) that is not related to the displacement vectors Vx and Vy may be a block-unit motion-compensated value, and a portion that is related to the displacement vectors Vx and Vy may be a pixel group unit motion-compensated value. As a result, the predicted pixel value of the current pixel may be determined by adding the block-unit motion-compensated value and the pixel group unit motion-compensated value.

Hereinabove, processes of determining the predicted pixel value of the current pixel when the temporal distance between the first reference picture and the current picture and the temporal distance between the second reference picture and the current picture are both $\tau$ and thus are the same are described for convenience of descriptions, but the temporal distance between the first reference picture and the current picture may be $\tau_0$ and the temporal distance between the second reference picture and the current picture may be $\tau_1$. Here, the predicted pixel value P(0) of the current pixel may be determined according to Equation 7.

$$P(0) = P0(i,j) + P1(i,j) + \frac{1}{2}\left( \tau_0\frac{\partial P0(i,j)}{\partial t} - \tau_1\frac{\partial P1(i,j)}{\partial t} \right) \qquad \text{[Equation 7]}$$

Considering Equation 2, Equation 7 may be expressed as Equation 8.

$$P(0) = P0(i,j) + P1(i,j) + \frac{Vx}{2}\left( \tau_1\frac{\partial P1(i,j)}{\partial x} - \tau_0\frac{\partial P0(i,j)}{\partial x} \right) + \qquad \text{[Equation 8]}$$
$$\frac{Vy}{2}\left( \tau_1\frac{\partial P1(i,j)}{\partial y} - \tau_0\frac{\partial P0(i,j)}{\partial y} \right)$$

According to the aforementioned descriptions, the first reference picture is located temporally after the current picture and the second reference picture is located temporally prior to the current picture, but both the first reference picture and the second reference picture may be located temporally prior to the current picture or after the current picture.

For example, as illustrated in FIG. 3B, the first reference picture including the first corresponding region 310 and the second reference picture including the second corresponding region 320 may both be located temporally prior to the current picture including the current block 300.

In this case, the predicted pixel value P(0) of the current pixel may be determined according to Equation 9 in which $\tau_1$ indicating the temporal distance between the second reference picture and the current picture in Equation 8 indicated with reference to FIG. 3A is replaced by $-\tau_1$.

$$P(0) = \qquad \text{[Equation 9]}$$
$$P0(i,j) + P1(i,j) + \frac{Vx}{2}\left(-\tau_1\frac{\partial P1(i,j)}{\partial x} - \tau_0\frac{\partial P0(i,j)}{\partial x}\right) + \frac{Vy}{2}\left(-\tau_1\frac{\partial P1(i,j)}{\partial y} - \tau_0\frac{\partial P0(i,j)}{\partial y}\right)$$

For example, as illustrated in FIG. 3C, the first reference picture including the first corresponding region 310 and the second reference picture including the second corresponding region 320 may both be located temporally after the current picture including the current block 300.

In this case, the predicted pixel value P(0) of the current pixel may be determined according to Equation 10 in which $\tau_0$ indicating the temporal distance between the first reference picture and the current picture in Equation 8 indicated with reference to FIG. 3A is replaced by $-\tau_0$.

$$P(0) = \qquad \text{[Equation 10]}$$
$$P0(i,j) + P1(i,j) + \frac{Vx}{2}\left(\tau_1\frac{\partial P1(i,j)}{\partial x} + \tau_0\frac{\partial P0(i,j)}{\partial x}\right) + \frac{Vy}{2}\left(\tau_1\frac{\partial P1(i,j)}{\partial y} + \tau_0\frac{\partial P0(i,j)}{\partial y}\right)$$

However, when both the first reference picture and the second reference picture are located temporally prior to the current picture or after the current picture as illustrated in FIGS. 3B and 3C, pixel group unit motion compensation may be performed when the first reference picture and the second reference picture are not the same reference picture. Also, in this case, pixel group unit motion compensation may be performed only when the bi-directional motion vectors MV1 and MV2 each have a non-zero component. Also, in this case, the pixel group unit motion compensation may be performed only when a ratio of the motion vectors MV1 and MV2 is the same as a ratio of the temporal distance between the first reference picture and the current picture and the temporal distance between the second reference picture and the current picture. For example, the pixel group unit motion compensation may be performed when a ratio of an x component of the motion vector MV1 and an x component of the motion vector MV2 is the same as a ratio of a y component of the motion vector MV1 and a y component of the motion vector MV2, and is the same as a ratio of the temporal distance $\tau_0$ between the first reference picture and the current picture and the temporal distance $\tau_1$ between the second reference picture and the current picture.

Figure 4:
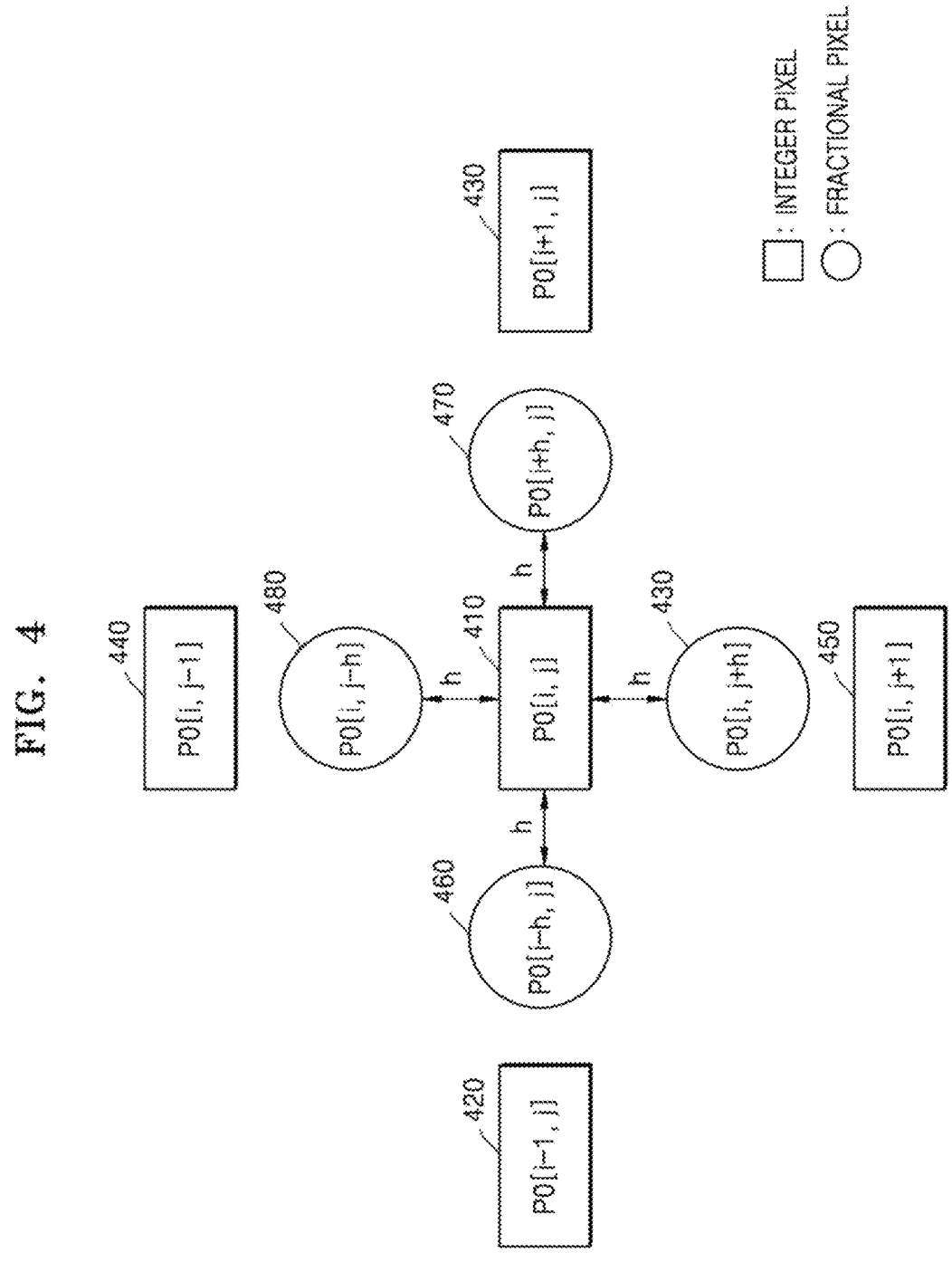
FIG. 4 is a reference diagram for describing processes of calculating gradient values in horizontal and vertical directions, according to an embodiment.

FIG. 4 is a reference diagram for describing processes of calculating gradient values in horizontal and vertical directions, according to an embodiment.

Referring to FIG. 4, a gradient value $$\frac{\partial P0(i,j)}{\partial x}$$

of a first reference pixel P0(i,j) 410 of a first reference picture in a horizontal direction and a gradient value $$\frac{\partial P0(i,j)}{\partial y}$$

of the first reference pixel P0(i,j) 410 in a vertical direction may be calculated by obtaining a variation of a pixel value at a neighboring fractional pixel location adjacent to the first reference pixel P0(i,j) 410 in the horizontal direction and a variation of a pixel value at a neighboring fractional pixel location adjacent to the first reference pixel P0(i,j) 410 in the vertical direction. That is, according to Equation 11, the gradient value $$\frac{\partial P0(i,j)}{\partial x}$$

in the horizontal direction may be calculated by calculating a variation of pixel values of a fractional pixel P0(i−h,j) 460 and a fractional pixel P0(i+h,j) 470 distant from P0(i,j) by h in the horizontal direction, wherein h is a fractional value smaller than 1, and the gradient value $$\frac{\partial P0(i,j)}{\partial y}$$

in the vertical direction may be calculated by calculating a variation of pixel values of a fractional pixel P0(i,j−h) 480 and a fractional pixel P0(i,j+h) 490 away from P0(i,j) by h in the vertical direction.

$$\frac{\partial P0(i,j)}{\partial x} = \frac{P0(i+h,j) - P0(i-h,j)}{2h} \qquad \text{[Equation 11]}$$
$$\frac{\partial P0(i,j)}{\partial y} = \frac{P0(i,j+h) - P0(i,j-h)}{2h}$$

Pixel values of the fractional pixels P0(i−h,j) 460, P0(i+h,j) 470, P0(i,j−h) 480, and P0(i,j+h) 490 may be calculated by using general interpolation. In addition, gradient values of a second reference pixel of another second reference picture in horizontal and vertical directions may also be calculated similarly to Equation 11.

According to an embodiment, instead of calculating a gradient value by calculating a variation of pixel values at fractional pixel locations as in Equation 11, a gradient value in a reference pixel may be calculated by using a predetermined filter. A filter coefficient of the predetermined filter may be determined based on a coefficient of an interpolation filter used to obtain a pixel value at a fractional pixel location, based on linearity of a filter.

Figure 5:
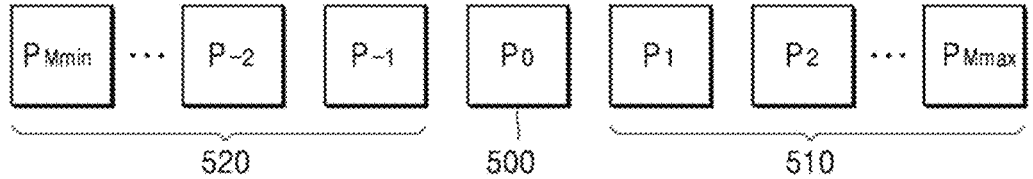
FIG. 5 is a reference diagram for describing processes of calculating gradient values in horizontal and vertical directions, according to another embodiment.

FIG. 5 is a reference diagram for describing processes of calculating gradient values in horizontal and vertical directions, according to another embodiment.

According to another embodiment, a gradient value may be determined by applying a predetermined filter to pixels of a reference picture. Referring to FIG. 5, the video decoding apparatus 100 may calculate a gradient value of a reference pixel P0 500 in a horizontal direction by applying a predetermined filter to $M_{Max}$ left pixels 520 and $|M_{Min}|$ right pixels 510 based on the reference pixel P0 500 of which a current horizontal gradient value is to be obtained. A filter coefficient used herein may be determined according to a value $\alpha$ indicating an interpolation location (fractional pel location) between $M_{Max}$ and $M_{Min}$ integer pixels used to determine a window size, as illustrated in FIGS. 7A to 7D. For example, referring to FIG. 7A, when $M_{Min}$ and $M_{Max}$ for determining a window size are respectively −2 and 3, and are distant from the reference pixel P0 500 by ¼, i.e., $\alpha=$¼, coefficient filters {4, −17, −36, 60, −15, 4} in a second row of FIG. 7A are applied to neighboring pixels $P_{-2}$, $P_{-1}$, $P_0$, $P_1$, $P_2$, and $P_3$. In this case, a gradient value $$\frac{\partial\,P0(i,\,j)}{\partial_x}$$

of the reference pixel P0 500 in the horizontal direction may be calculated according to a weighted sum using a filter coefficient and a neighboring pixel, such as an equation:

$$\frac{\partial\,P0(i,\,j)}{\partial_x}$$
$$4*P_{-2}-17*P_{-1}+36*P_0+60*P_1-15*P_2+4*P_3+32 \gg 6.$$

Similarly, a gradient value in a vertical direction may also be calculated by applying the filter coefficients shown in FIGS. 7A to 7E to neighboring pixels according to an interpolation location, and $M_{Min}$ and $M_{Max}$ for determining a window size.

Figure 6A:
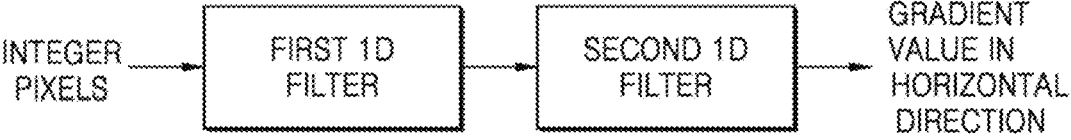
FIGS. 6A to 6B are diagrams for describing processes of determining gradient values in horizontal and vertical directions by using 1D filters, according to an embodiment.
Figure 6B:

FIGS. 6A to 6B are diagrams for describing processes of determining gradient values in horizontal and vertical directions by using 1D filters, according to an embodiment.

Referring to FIG. 6A, filtering may be performed by using a plurality of 1D filters with respect to an integer pixel so as to determine a gradient value of a reference pixel in a horizontal direction in a reference picture. Pixel group unit motion compensation is additional motion compensation performed after block-unit motion compensation is performed. Accordingly, a reference location of reference blocks of a current block indicated by a motion vector during the block-unit motion compensation may be a fractional pixel location, and the pixel group unit motion compensation may be performed on reference pixels in a reference block at a fractional pixel location. Therefore, filtering may be performed, in consideration that a gradient value of a pixel at a fractional pixel location is determined.

Referring to FIG. 6A, first, the video decoding apparatus 100 may perform filtering on pixels located in a horizontal or vertical direction from a neighboring integer pixel of a reference pixel in a reference picture, by using a first 1D filter. Equally, the video decoding apparatus 100 may perform filtering on neighboring integer pixels in a row or column which are different from the reference pixel, by using the first 1D filter. The video decoding apparatus 100 may generate a gradient value of the reference pixel in the horizontal direction by performing filtering on values generated via the filtering, by using a second 1D filter.

For example, when a location of a reference pixel is a location of a fractional pixel at $(x+\alpha,\ y+\beta)$ (where, x and y are integers and $\alpha$ and $\beta$ are fractions), filtering may be performed according to Equation 12 by using a 1D vertical interpolation filter on integer pixels $(x,y)$, $(x-1,y)$, $(x+1, y)$, through $(x+M_{Min},y)$ and $(x+M_{Max},y)$ (where, $M_{Min}$ and $M_{Mmax}$ are integers) in a horizontal direction.

[Equation 12]

$$Temp\,[i,\,j+\beta] =$$

$$\left(\sum_{j'=j+M_{min}}^{j'=j+M_{max}} fracFilter_\beta[j']I[i,\,j']+offset_1\right) \gg shift_1$$

Here, $fracFilter_\beta$ may indicate an interpolation filter for determining a pixel value at a fractional pixel location $\beta$ in a vertical direction, and $fracFilter_\beta[j']$ may indicate a coefficient of an interpolation filter to be applied to a pixel at a $(i,j')$ location. $I[i,j']$ may indicate a pixel value at the $(i,j')$ location.

That is, the first 1D filter may be an interpolation filter for determining a fractional pixel value in a vertical direction. $offset_1$ may indicate an offset for preventing a round-off error, and $shift_1$ may indicate the number of de-scaling bits. $Temp[i,j+\beta]$ may indicate pixel value at a fractional pixel location $(i,j+\beta)$. $Temp[i',j+\beta]$ (where, i' is an integer from $i+M_{min}$ to $i+M_{max}$ excluding i) may also be determined according to Equation 12 by replacing i by i'.

Afterward, the video decoding apparatus 100 may perform filtering on a pixel value at a fractional pixel location $(i,j+\beta)$ and a pixel value at a fractional pixel location $(i',j+\beta)$ by using a second 1D filter.

[Equation 13]

$$\frac{\partial I}{\partial x}[i+\alpha,\,j+\beta] =$$

$$\left(\sum_{i'=i+M_{min}}^{i'=i+M_{max}} gradFilter_\alpha[i']I[i',\,j+\beta]+offset_2\right) \gg shift_2$$

In this regard, $gradFilter_\alpha$ may be a gradient filter for determining a gradient value at a fractional pixel location $\alpha$ in a horizontal direction. $gradFilter_\alpha[i']$ may indicate a coefficient of an interpolation filter to be applied to a pixel at a $(i',j+\beta)$ location. That is, the second 1D filter may be a gradient filter for determining a gradient value in a horizontal direction. $offset_2$ may indicate an offset for preventing a round-off error, and $shift_2$ may indicate the number of de-scaling bits.

That is, according to Equation 13, the video decoding apparatus 100 may determine a gradient value $$\frac{\partial I}{\partial x}[i+\alpha,\,j+\beta]$$

in a horizontal direction at $(i+\alpha,j+\beta)$ by performing filtering on a pixel value $(Temp[i,j+\beta])$ at a pixel location $(i,\,j+\beta)$ and a pixel value $(Temp[i',j+\beta])$ located in a vertical direction from the pixel location $(i,\,j+3)$, by using the gradient filter $gradFilter_\alpha$.

Hereinabove, a gradient value in a horizontal direction is determined by first applying an interpolation filter and then applying a gradient filter, but the disclosure is not limited thereto and thus, the gradient value in the horizontal direction may be determined by first applying the gradient filter and then applying the interpolation filter. Hereinafter, an embodiment in which a gradient value in a horizontal direction is determined by applying a gradient filter and then an interpolation filter will now be described.

For example, when a location of a reference pixel is a location of a fractional pixel at $(x+\alpha,\ y+\beta)$ (wherein x and y are integers and $\alpha$ and $\beta$ are fractions), filtering may be performed according to Equation 14 by using the first 1D filter, with respect to integer pixels (x,y), (x−1,y), (x+1, y), through (x+$M_{Min}$,y) and (x+$M_{Max}$,y) (where, $M_{Min}$ and $M_{Mmax}$ are integers) in a horizontal direction.

$$Temp[i + \alpha, j] = \left( \sum_{i'=i+M_{min}}^{i'=i+M_{max}} gradFilter_\alpha[i']I[i', j] + offset_3 \right) >> shift_3 \qquad \text{[Equation 14]}$$

In this regard, gradFilter$_\alpha$ may indicate a gradient filter for determining a gradient value at a fractional pixel location $\alpha$ in a horizontal direction, and gradFilter$_\alpha$[i'] may indicate a coefficient of a gradient filter to be applied to a pixel at a (i',j) location. I[i',j] may indicate a pixel value at the (i',j) location.

That is, the first 1D filter may be an interpolation filter for determining a gradient value of a pixel in a horizontal direction, wherein a horizontal component of a pixel location is a fractional location. offset$_3$ may indicate an offset for preventing a round-off error, and shift$_3$ may indicate the number of de-scaling bits. Temp[i+$\alpha$,j] may indicate a gradient value at a pixel location (i+$\alpha$,j) in the horizontal direction. Temp[i+$\alpha$,j'](where, j' is an integer from j+$M_{min}$ to j+$M_{max}$ excluding j) may also be determined according to Equation 14 by replacing j by j'.

Then, the video decoding apparatus 100 may perform filtering on a gradient value at a pixel location (i+$\alpha$,j) in the horizontal direction and a gradient value at a pixel location (i+$\alpha$,j') in the horizontal direction by using the second 1D filter, according to Equation 15.

$$\frac{\partial I}{\partial x}[i + \alpha, j + \beta] = \left( \sum_{j'=j+M_{min}}^{j'=j+M_{max}} fracFilter_\beta[j']Temp[i + \alpha, j'] + offset_4 \right) >> shift_4 \qquad \text{[Equation 15]}$$

In this regard, fracFilter$_\beta$ may be an interpolation filter for determining a pixel value at a fractional pixel location 3 in a vertical direction. fracFilter$_\beta$[j'] may indicate a coefficient of an interpolation filter to be applied to a pixel at a (i+$\beta$, j') location. That is, the second 1D filter may be an interpolation filter for determining a pixel value at a fractional pixel location $\beta$ in a vertical direction. offset$_4$ may indicate an offset for preventing a round-off error, and shift$_4$ may indicate the number of de-scaling bits.

That is, according to Equation 15, the video decoding apparatus 100 may determine a gradient value $$\frac{\partial I}{\partial x}[i + \alpha, j + \beta]$$

in a horizontal direction at (i+$\alpha$,j+$\beta$) by performing filtering on a gradient value (Temp[i+$\alpha$,j]) at a pixel location (i+$\alpha$, j) in a horizontal direction and a gradient value (Temp[i+$\alpha$,j']) of pixels in a horizontal direction located in a vertical direction from the pixel location (i+$\alpha$, j), by using the gradient filter fracFilter$_\beta$.

Referring to FIG. 6B, filtering may be performed by using a plurality of 1D filters with respect to an integer pixel so as to determine a gradient value of a reference pixel in a vertical direction in a reference picture. Pixel group unit motion compensation is additional motion compensation performed after block-unit motion compensation is performed. Therefore, a reference location of reference blocks of a current block indicated by a motion vector during the block-unit motion compensation may be a fractional pixel location, and the pixel group unit motion compensation may be performed on reference pixels in a reference block at a fractional pixel location. Accordingly, filtering may be performed, in consideration that a gradient value of a pixel at a fractional pixel location is determined.

Referring to FIG. 6B, first, the video decoding apparatus 100 may perform filtering on pixels located in a horizontal or vertical direction from a neighboring integer pixel of a reference pixel in a reference picture, by using a first 1D filter. Equally, the video decoding apparatus 100 may perform filtering on neighboring pixels in a row or column which are different from the reference pixel, by using the first 1D filter. The video decoding apparatus 100 may generate a gradient value of the reference pixel in the vertical direction by performing filtering on values generated via the filtering, by using a second 1D filter.

For example, when a location of a reference pixel is a location of a fractional pixel at (x+$\alpha$, y+$\beta$) (where, x and y are integers and $\alpha$ and $\beta$ are fractions), filtering may be performed according to Equation 16 by using the first 1D filter with respect to integer pixels (x,y), (x−1,y−1), (x+1, y+1) through (x+$M_{Min}$,y+$M_{Min}$) and (x+$M_{Max}$,y+$M_{max}$) (where, $M_{Min}$ and $M_{Mmax}$ are integers) in a horizontal direction.

$$Temp[i + \alpha, j] = \left( \sum_{i'=i+M_{min}}^{i'=i+M_{max}} fracFilter_\alpha[i']I[i', j] + offset_5 \right) >> shift_5 \qquad \text{[Equation 16]}$$

In this regard, fracFilter$_\alpha$ may indicate an interpolation filter for determining a pixel value at a fractional pixel location $\alpha$ in a horizontal direction, and fracFilter$_\alpha$[i'] may indicate a coefficient of an interpolation filter to be applied to a pixel at a (i',j) location. I[i',j] may indicate a pixel value at the (i',j) location.

That is, the first 1D filter may be an interpolation filter for determining a pixel value at a fractional pixel location $\alpha$ in a horizontal direction. offset$_5$ may indicate an offset for preventing a round-off error, and shift$_5$ may indicate the number of de-scaling bits.

Temp[i+$\alpha$,j] may indicate a pixel value at a fractional pixel location (i+$\alpha$,j). Temp[i+$\alpha$,j'] (where, j' is an integer from j+$M_{min}$ to j+$M_{max}$ excluding j) may also be determined according to Equation 16 by replacing j by j'.

Afterward, the video decoding apparatus 100 may perform filtering on a pixel value at a pixel location (i+$\alpha$,j) and a pixel value at a pixel location (i+$\alpha$,j') according to Equation 17, by using a second 1D filter.

$$\frac{\partial I}{\partial y}[i + \alpha, j + \beta] = \left( \sum_{j'=j+M_{min}}^{j'=j+M_{max}} gradFilter_\beta[j']Temp[i + \alpha, \qquad \text{[Equation 17]}$$

47

-continued $$\left. j' \right] + \text{offset}_6 \right) >> \text{shift}_6$$

In this regard, gradFilter$_\beta$ may be a gradient filter for determining a gradient value at a fractional pixel location R in a vertical direction. gradFilterβ[j'] may indicate a coefficient of an interpolation filter to be applied to a pixel at a (i+α,j') location. That is, the second 1D filter may be a gradient filter for determining a gradient value in a vertical direction at a fractional pixel location β. offset$_6$ may indicate an offset for preventing a round-off error, and shift$_6$ may indicate the number of de-scaling bits.

That is, according to Equation 17, the video decoding apparatus 100 may determine a gradient value $$\frac{\partial I}{\partial y}[i+\alpha, j+\beta]$$

in a vertical direction at (i+α,j+β) by performing filtering on a pixel value (Temp[i+α,j]) at a pixel location (i+α,j) and a pixel value (Temp[i+α,j']) located in a vertical direction from the pixel location (i+α,j), by using the gradient filter gradFilter$_\beta$.

According to the aforementioned descriptions, a gradient value in a vertical direction is determined by first applying an interpolation filter and then applying a gradient filter, but the disclosure is not limited thereto and thus, the gradient value in the vertical direction may be determined by first applying the gradient filter and then applying the interpolation filter. Hereinafter, an embodiment in which a gradient value in a vertical direction is determined by applying a gradient filter and then an interpolation filter will now be described.

For example, when a location of a reference pixel is a location of a fractional pixel at (x+α, y+β) (where, x and y are integers and α and β are fractions), filtering may be performed according to Equation 18 by using the first 1D filter, with respect to integer pixels (x,y), (x,y−1), (x, y+1) through (x,y+$M_{Min}$) and (x,y+$M_{max}$) (where, $M_{Min}$ and $M_{Mmax}$ are integers) in a vertical direction.

$$Temp[i, j+\beta] = \left( \sum_{j'=j+M_{min}}^{j'=j+M_{max}} gradFilter_\beta[j']I[i, j'] + \right.$$

[Equation 18]

$$\left. \text{offset}_7 \right) >> \text{shift}_7$$

In this regard, gradFilter$_\beta$ may indicate a gradient filter for determining a gradient value at a fractional pixel location 3 in a vertical direction, and gradFilter$_\beta$[j'] may indicate a coefficient of a gradient filter to be applied to a pixel at a (i,j') position. I[i,j'] may indicate a pixel value at the (i,j') location.

That is, the first 1D filter may be an interpolation filter for determining a gradient value of a pixel in a vertical direction, wherein a vertical component of a pixel location is a fractional location. offset$_7$ may indicate an offset for preventing a round-off error, and shift$_7$ may indicate the number of de-scaling bits.

Temp[i,j+β] may indicate a gradient value at a pixel location (i,j+β) in the vertical direction. Temp[i',j+β] (where, i' is an integer from i+$M_{min}$ to i+$M_{max}$ excluding i) may also be determined according to Equation 18 by replacing i by i'.

Afterward, the video decoding apparatus 100 may perform filtering on a gradient value at a pixel location (i, j+β) in the vertical direction and a gradient value at a pixel location (i',j+β) in the vertical direction by using the second 1D filter, according to Equation 19.

$$\frac{\partial I}{\partial y}[i+\alpha, j+\beta] = \left( \sum_{i'=i+M_{min}}^{i'=i+M_{max}} fracFilter_\alpha[i']Temp[i', \right.$$

[Equation 19]

$$\left. j+\beta] + \text{offset}_5 \right) >> \text{shift}_8$$

In this regard, fracFilter$_\alpha$ may be an interpolation filter for determining a pixel value at a fractional pixel location α in a horizontal direction. fracFilter$_\alpha$[i'] may indicate a coefficient of an interpolation filter to be applied to a pixel at a (i',j+β) location. That is, the second 1D filter may be an interpolation filter for determining a pixel value at a fractional pixel location α in a horizontal direction. offset$_8$ may indicate an offset for preventing a round-off error, and shift$_8$ may indicate the number of de-scaling bits.

That is, according to Equation 19, the video decoding apparatus 100 may determine a gradient value $$\frac{\partial I}{\partial y}[i+\alpha, j+\beta]$$

in a vertical direction at (i+α,j+β) by performing filtering on a gradient value (Temp[i,j+β]) at a pixel location (i, j+β) in a vertical direction and a gradient value (Temp[i', j+3)]) of pixels in a vertical direction located in a horizontal direction from the pixel location (i, j+3), by using the gradient filter fracFilter$_\alpha$.

According to an embodiment, in the video decoding apparatus 100, gradient values in horizontal and vertical directions at (i+α, j+β) may be determined according to combinations of various filters described above. For example, in order to determine a gradient value in a horizontal direction, an interpolation filter for determining a pixel value in a vertical direction may be used as a first 1D filter and a gradient filter for determining a gradient value in a horizontal direction may be used as a second 1D filter. A gradient filter for determining a gradient value in a vertical direction may be used as a first 1D filter, and an interpolation filter for determining a pixel value in a horizontal direction may be used as a second 1D filter.

FIGS. 7A to 7E are Tables showing filter coefficients of filters used to determine a pixel value at a fractional pixel location of a fractional pixel unit, and gradient values in horizontal and vertical directions, according to an embodiment.

FIGS. 7A to 7B are Tables showing filter coefficients of filters for determining a gradient value at a fractional pixel location of a ¼ pel unit, in a horizontal or vertical direction.

As described above, a 1D gradient filter and a 1D interpolation filter may be used to determine a gradient value in a horizontal or vertical direction. Referring to FIG. 7A, filter coefficients of the 1D gradient filter are illustrated. In this regard, a 6-tap filter may be used as the 1D gradient filter. The filter coefficients of the 1D gradient filter may be coefficients scaled by 2^4. Mmin indicates a difference between a location of a center integer pixel and a location of a farthest pixel from among integer pixels in a negative direction applied to a filter based on the center integer pixel, and Mmax indicates a difference between the location of the center integer pixel and a location of a farthest pixel from among integer pixels in a positive direction applied to the filter based on the center integer pixel. For example, gradient filter coefficients for obtaining a gradient value of a pixel in a horizontal direction, in which a fractional pixel location $\alpha$ is $\frac{1}{4}$ in the horizontal direction, may be {4, −17, −36, 60, −15, −4}. Gradient filter coefficients for obtaining a gradient value of a pixel in the horizontal direction, in which a fractional pixel location $\alpha$ is 0, $\frac{1}{2}$, or $\frac{3}{4}$ in the horizontal direction, may also be determined by referring to FIG. 7A.

Referring to FIG. 7B, filter coefficients of a 1D interpolation filter are illustrated. In this regard, a 6-tap filter may be used as the 1D interpolation filter. The filter coefficients of the 1D interpolation filter may be coefficients scaled by 2^6. Mmin indicates a difference between a location of a center integer pixel and a location of a farthest pixel from among integer pixels in a negative direction applied to a filter based on the center integer pixel, and Mmax indicates a difference between the location of the center integer pixel and a location of a farthest pixel from among integer pixels in a positive direction applied to the filter based on the center integer pixel.

FIG. 7C is a table showing filter coefficients of a 1D interpolation filter used to determine a pixel value at a fractional pixel location of a $\frac{1}{4}$ pel unit.

As described above, two same 1D interpolation filters may be used in horizontal and vertical directions so as to determine a pixel value at a fractional pixel location.

Referring to FIG. 7C, filter coefficients of a 1D interpolation filter are illustrated. In this regard, a 6-tap filter may be used as the 1D interpolation filter. The filter coefficients of the 1D interpolation filter may be coefficients scaled by 2^6. Mmin indicates a difference between a location of a center integer pixel and a location of a farthest pixel from among integer pixels in a negative direction applied to a filter based on the center integer pixel, and Mmax indicates a difference between the location of the center integer pixel and a location of a farthest pixel from among integer pixels in a positive direction applied to the filter based on the center integer pixel.

FIG. 7D is a table showing filter coefficients of filters used to determine a gradient value in a horizontal or vertical direction at a fractional pixel location of $\frac{1}{16}$ pel unit.

As described above, a 1D gradient filter and a 1D interpolation filter may be used to determine a gradient value in a horizontal or vertical direction. Referring to FIG. 7D, filter coefficients of the 1D gradient filter are illustrated. In this regard, a 6-tap filter may be used as the 1D gradient filter. The filter coefficients of the 1D gradient filter may be coefficients scaled by 2^4. For example, gradient filter coefficients for obtaining a gradient value of a pixel in a horizontal direction, in which a fractional pixel location $\alpha$ is $\frac{1}{16}$ in the horizontal direction, may be {8, −32, −13, 50, −18, 5}. Gradient filter coefficients for obtaining a gradient value of a pixel in the horizontal direction, in which a fractional pixel position a is 0, $\frac{1}{8}$, $\frac{3}{16}$, $\frac{1}{4}$, $\frac{5}{16}$, $\frac{3}{8}$, $\frac{7}{16}$, or $\frac{1}{2}$ in the horizontal direction, may also be determined by referring to FIG. 7D. Gradient filter coefficients for obtaining a gradient value of a pixel in the horizontal direction, in which a fractional pixel location $\alpha$ is $\frac{9}{16}$, $\frac{5}{8}$, $\frac{11}{16}$, $\frac{3}{4}$, $\frac{13}{16}$, $\frac{7}{8}$, or $\frac{15}{16}$ in the horizontal direction, may be determined by using symmetry of filter coefficients based on $\alpha=\frac{1}{2}$. That is, filter coefficients at right fractional pixel locations based on $\alpha=\frac{1}{2}$ may be determined by using filter coefficients at left fractional pixel locations based on $\alpha=\frac{1}{2}$ shown in FIG. 7D. For example, filter coefficients at $\alpha=\frac{15}{16}$ may be determined by using filter coefficients {8, −32, −13, 50, −18, 5} at $\alpha=\frac{1}{16}$, which is a symmetric location based on $\alpha=\frac{1}{2}$. That is, filter coefficients at $\alpha=\frac{15}{16}$ may be determined to be {5, −18, 50, −13, −32, 8} by arranging {8, −32, −13, 50, −18, 5} in an inverse order.

Referring to FIG. 7E, filter coefficients of a 1D interpolation filter are illustrated. In this regard, a 6-tap filter may be used as the 1D interpolation filter. The filter coefficients of the 1D interpolation filter may be coefficients scaled by 2^6. For example, 1D interpolation filter coefficients for obtaining a pixel value of a pixel in a horizontal direction, in which a fractional pixel location $\alpha$ is $\frac{1}{16}$ in the horizontal direction, may be {1, −3, 64, 4, −2, 0}. Interpolation filter coefficients for obtaining a pixel value of a pixel in the horizontal direction, in which a fractional pixel location $\alpha$ is 0, $\frac{1}{8}$, $\frac{3}{16}$, $\frac{1}{4}$, $\frac{5}{16}$, $\frac{3}{8}$, $\frac{7}{16}$, or $\frac{1}{2}$ in the horizontal direction, may also be determined by referring to FIG. 7E. Meanwhile, interpolation filter coefficients for obtaining a pixel value of a pixel in the horizontal direction, in which a fractional pixel position a is $\frac{9}{16}$, $\frac{5}{8}$, $\frac{11}{16}$, $\frac{3}{4}$, $\frac{13}{16}$, $\frac{7}{8}$, or $\frac{15}{16}$ in the horizontal direction, may be determined by using symmetry of filter coefficients based on $\alpha=\frac{1}{2}$. That is, filter coefficients at right fractional pixel locations based on $\alpha=\frac{1}{2}$ may be determined by using filter coefficients at left fractional pixel locations based on $\alpha=\frac{1}{2}$ shown in FIG. 7E. For example, filter coefficients at $\alpha=\frac{15}{16}$ may be determined by using filter coefficients {1, −3, 64, 4, −2, 0} at $\alpha=\frac{1}{16}$, which is a symmetric location based on $\alpha=\frac{1}{2}$. That is, filter coefficients at $\alpha=\frac{15}{16}$ may be determined to be {0, −2, 4, 64, −3, 1} by arranging {1, −3, 64, 4, −2, 0} in an inverse order.

Figure 8A:
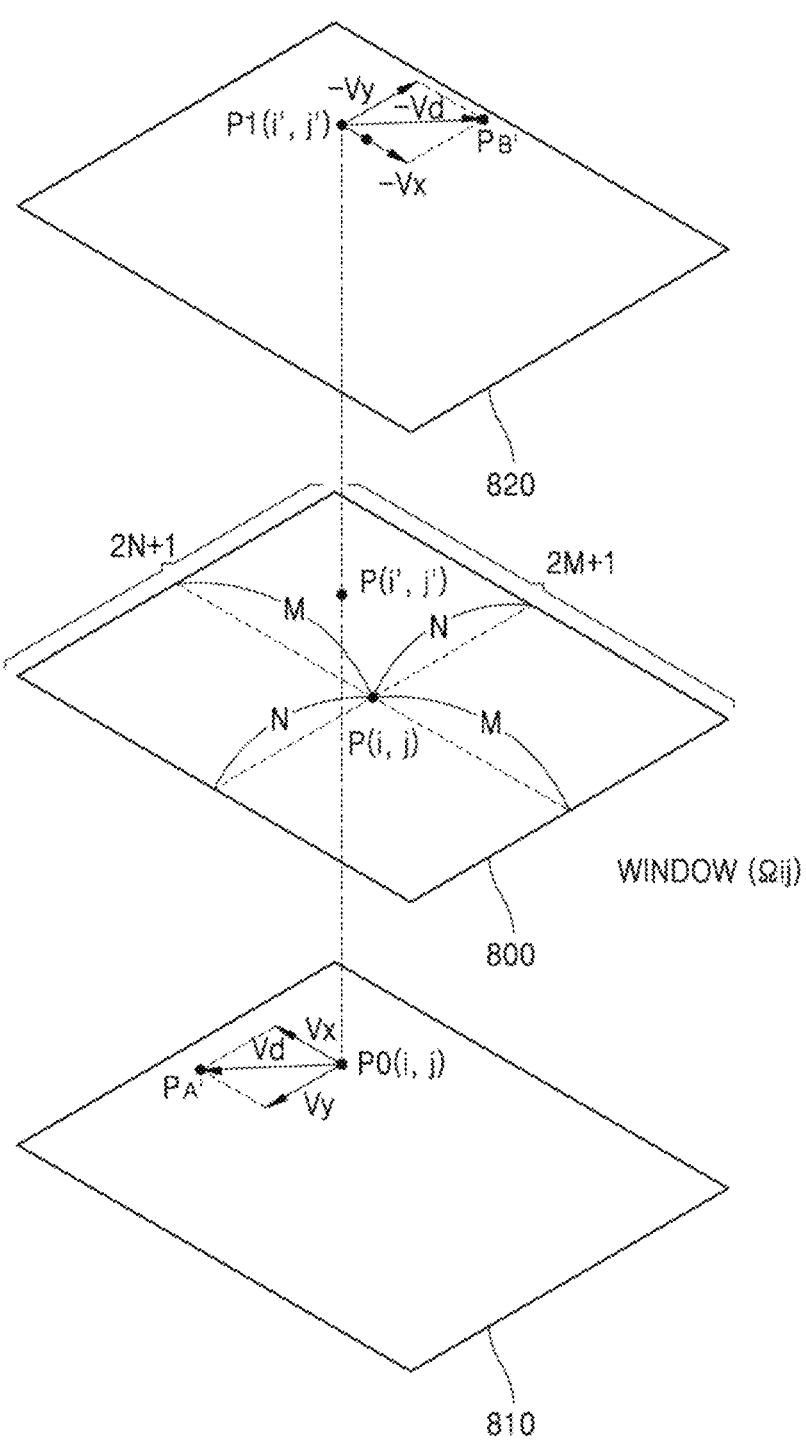
FIG. 8A is a reference diagram for describing processes of determining a horizontal direction displacement vector and a vertical direction displacement vector with respect to a pixel, according to an embodiment.

FIG. 8A is a reference diagram for describing processes of determining a horizontal direction displacement vector and a vertical direction displacement vector with respect to a pixel, according to an embodiment.

Referring to FIG. 8A, a window $\Omega ij$ 800 having a predetermined size has a size of $(2M+1)*(2N+1)$ (where, M and N are integers) with respect to a pixel P(i,j) of a current block, the pixel being bi-directionally predicted.

When P(i',j') indicates a pixel of a current block that is bi-directionally predicted in the window $\Omega ij$ 800, wherein, when i−M≤i'≤i+M and j−N≤j'≤j+N, (i',j')¡ô$\Omega ij$, P0(i',j') indicates a pixel value of a first reference pixel of a first reference picture 810 corresponding to the pixel P(i',j') of the current block bi-directionally predicted, P1(i',j') indicates a pixel value of a second reference pixel of a second reference picture 820 corresponding to the pixel P(i',j') of the current block bi-directionally predicted, $$\frac{\partial P0(i', j')}{\partial x}$$

indicates a gradient value of the first reference pixel in a horizontal direction, $$\frac{\partial P0(i', j')}{\partial y}$$

indicates a gradient value of the first reference pixel in a vertical direction, $$\frac{\partial P1(i', j')}{\partial x}$$

indicates a gradient value of the second reference pixel in the horizontal direction, and $$\frac{\partial P1(i', j')}{\partial y}$$

indicates a gradient value of the second reference pixel in the vertical direction, a first displacement corresponding pixel PA' and a second displacement corresponding pixel PB' may be determined according to Equation 20. In this regard, the first displacement corresponding pixel PA' and the second displacement corresponding pixel PB' may be determined by using a first linear term of a local Taylor expansion.

$$PA' = P0(i', j') - \tau 0 * Vx \frac{\partial P0(i', j')}{\partial x} - \tau 0 * Vy \frac{\partial P0(i', j')}{\partial y}$$ [Equation 20]

$$PB' = P1(i', j') + \tau 1 * Vx \frac{\partial P1(i', j'),}{\partial x} + \tau 1 * Vy \frac{\partial P1(i', j')}{\partial y}$$

In Equation 20, a displacement vector Vx in an x-axis direction and a displacement vector Vy in a y-axis direction may be changed according to a location of the pixel P(i,j), i.e., are dependent on (i,j), and thus, the displacement vectors Vx and Vy may be expressed as Vx(i,j) and Vy(i,j).

A difference value $\Delta i'j'$ between the first displacement corresponding pixel PA' and the second displacement corresponding pixel PB' may be determined according to Equation 21.

$$\Delta i'_{j'} = \left( P0(i', j') - \tau 0 * Vx \frac{\partial P0(i', j')}{\partial x} - \tau 0 * \right.$$ [Equation 21]

$$Vy \frac{\partial P0(i', j')}{\partial y} - \left( P1(i', j') \rightarrow \tau 1 * Vx \frac{\partial P1(i', j')}{\partial x} + \tau 1 * \right.$$

$$Vy \frac{\partial 1(i', j')}{\partial y} = P0(i', j') - P1(i', j') - Vx \left( \tau 0 * \right.$$

$$\frac{\partial P0(i', j')}{\partial x} + \tau 1 * \frac{\partial P1(i', j')}{\partial x} \right) - Vy \left( \tau 0 \frac{\partial P0(i', j')}{\partial x} + \right.$$

$$\left. \tau 1 \frac{\partial P1(i', j')}{\partial y} \right)$$

The displacement vector Vx in the x-axis direction and the displacement vector Vy in the y-axis direction, which minimize the difference value $\Delta i'j'$ between the first displacement corresponding pixel PA' and the second displacement corresponding pixel PB', may be determined by using the sum of squares $\Phi(Vx,Vy)$ of the difference value $\Delta i'j'$ as in Equation 22.

$$\Phi(Vx, Vy) = \sum_{i',j' \in \Omega ij} \Delta^2_{i'j'} = \sum_{i',j' \in \Omega ij} \left( P0(i', j') - P1(i', j') - \right.$$ [Equation 22]

$$Vx(i, j) \left( \tau 0 * \frac{\partial P0(i', j')}{\partial x} + \tau 1 * \frac{\partial P1(i', j')}{\partial x} \right) -$$

-continued $$Vy(i, j) \left( \tau 0 \frac{\partial P0(i', j')}{\partial y} + \tau 1 \frac{\partial P1(i', j')}{\partial y} \right) \right)^2$$

That is, the displacement vectors Vx and Vy may be determined by using a maximum value or a minimum value of $\Phi(Vx,Vy)$. $\Phi(Vx,Vy)$ refers to a function where the displacement vectors Vx and Vy are parameters, and the maximum value or the minimum value may be determined by calculating a value that becomes 0 by partially differentiating $\Phi(Vx,Vy)$ with respect to $\tau Vx$ and $\tau Vy$ according to Equation 23, $\Phi(Vx,Vy)$ being arranged with respect to $\tau Vx$ and $\tau Vy$. Hereinafter, for convenience of calculation, it is assumed that $\tau 0$ and $\tau 1$ are equal as $\tau$.

$$\Phi(Vx, Vy) = (\tau Vx)^2 s1 + 2(\tau Vx)(\tau Vy)s2 + (\tau Vy)^2 s5 -$$ [Equation 23]

$$2(\tau Vx)s3 - 2(\tau Vy)s6 + \sum_{i',j' \in \Omega ij} (P0(i', j') -$$

$$P1(i', j'))^2$$

Two linear equations where Vx(i,j) and Vy(i,j) are variables as in Equation 24 may be obtained by using an equation:

$$\frac{\partial \Phi(Vx, Vy)}{\partial \tau Vx} = 0$$

and an equation:

$$\frac{\partial \Phi(Vx, Vy)}{\partial \tau Vy} = 0.$$

$$\tau Vx * s1 + \tau Vy(i, j) * s2 = s3$$ [Equation 24]

$$\tau Vx * s4 + \tau Vy(i, j) * s5 = s6$$

In Equation 24, s1 to s6 are calculated according to Equation 25.

$$s1 = \sum_{i',j' \in \Omega ij} \left( \frac{\partial P0(i', j')}{\partial x} + \frac{\partial P1(i', j')}{\partial x} \right)^2$$ [Equation 25]

$$s2 = s4 = \sum_{i',j' \in \Omega ij} \left( \frac{\partial P0(i', j')}{\partial x} + \frac{\partial P1(i', j')}{\partial x} \right) \left( \frac{\partial P0(i', j')}{\partial y} + \frac{\partial P1(i', j')}{\partial y} \right)$$

$$s3 = - \sum_{i',j' \in \Omega ij} (P0(i', j') - P1(i', j')) \left( \frac{\partial P0(i', j')}{\partial x} + \frac{\partial P1(i', j')}{\partial x} \right)$$

$$s5 = \sum_{i',j' \in \Omega ij} \left( \frac{\partial P0(i', j')}{\partial y} + \frac{\partial P1(i', j')}{\partial y} \right)^2$$

$$s6 = - \sum_{i',j' \in \Omega ij} (P0(i', j') - P1(i', j')) \left( \frac{\partial P0(i', j')}{\partial y} + \frac{\partial P1(i', j')}{\partial y} \right)$$

By solving simultaneous equations of Equation 24, values of Vx(i,j) and Vy(i,j) may be calculated according to $\tau * Vx$

53

(i,j)=−det1/det and τ*Vy(i,j)=−det2/det based on Kramer's formulas. In this regard, det1=s3*s5−s2*s6, det2=s1*s6−s3*s4, and det=s1*s5−s2*s2.

Simplified solutions of the above equations may be determined by performing minimization first in a horizontal direction and then in a vertical direction. That is, for example, when it is assumed that only a displacement vector in a horizontal direction is changed, Vy may be 0 in the first equation of Equation 24, and thus an equation: τVx=s3/s1 may be determined.

Then, an equation: τVy=(s6−τVx*S2)/s5 may be determined when the second equation of Equation 24 is arranged by using an equation: τVx=s3/s1.

In this regard, gradient values $$\frac{\partial P0(i',\,j')}{\partial_x},\ \frac{\partial P0(i',\,j')}{\partial_y},\ \frac{\partial P1(i',\,j')}{\partial_x},$$

$$\text{and}\ \frac{\partial P1(i',\,j')}{\partial_y}$$

and may be scaled without changing resultant values Vx(i,j) and Vy(i,j). However, it is premised that an overflow does not occur and a round-off error does not occur.

Adjustment parameters r and m may be introduced to prevent a division operation from being performed by 0 or a very small value when Vx(i,j) and Vy(i,j) are calculated.

For convenience, it is assumed that Vx(i,j) and Vy(i,j) are opposite to directions illustrated in FIG. 3A. For example, Vx(i,j) and Vy(i,j) derived by Equation 24 based on directions of Vx(i,j) and Vy(i,j) illustrated in FIG. 3A may have a same value as Vx(i,j) and Vy(i,j) determined to be opposite to the directions of FIG. 3A, except for a sign.

The first displacement corresponding pixel PA' and the second displacement corresponding pixel PB' may be determined according to Equation 26. In this regard, the first displacement corresponding pixel PA' and the second displacement corresponding pixel PB' may be determined by using a first linear term of a local Taylor expansion.

[Equation 26]

$$PA' = P0(i',\,j') + \tau 0 * Vx\frac{\partial P0(i',\,j')}{\partial x} + \tau 0 * Vy\frac{\partial P0(i',\,j')}{\partial y}$$

$$PB' = P1(i',\,j') - \tau 1 * Vx\frac{\partial P1(i',\,j')}{\partial x} - \tau 1 * Vy\frac{\partial P1(i',\,j')}{\partial y}$$

A difference value Δi'j' between the first displacement corresponding pixel PA' and the second displacement corresponding pixel PB' may be determined according to Equation 27.

[Equation 27]

$$\Delta i'j' = \left( P0(i',\,j') + \tau 0 * Vx\frac{\partial P0(i',\,j')}{\partial x} + \tau 0 * Vy\frac{\partial P0(i',\,j')}{\partial y} - \right.$$

$$P1(i',\,j') - \tau 1 * Vx\frac{\partial P1(i',\,j')}{\partial x} - \tau 1 * Vy\frac{\partial P1(i',\,j')}{\partial y} \right)$$

$$\Delta i'j' = \left( P0(i',\,j') - P1(i',\,j') + Vx\left(\tau 0 * \frac{\partial P0(i',\,j')}{\partial x} + \tau 1 * \frac{\partial P1(i',\,j')}{\partial x}\right) + \right.$$

$$\left. Vy\left(\tau 0\frac{\partial P0(i',\,j')}{\partial y} + \tau 1\frac{\partial P1(i',\,j')}{\partial y}\right) \right)$$

54

The displacement vector Vx in the x-axis direction and the displacement vector Vy in the y-axis direction, which minimize the difference value Δi'j' between the first displacement corresponding pixel PA' and the second displacement corresponding pixel PB', may be determined by using the sum of squares Φ(Vx,Vy) of a difference value Δ as in Equation 28. That is, the displacement vectors Vx and Vy when Φ(Vx,Vy) is minimum as in Equation 29 may be determined, and may be determined by using a maximum value or a minimum value of Φ(Vx,Vy).

[Equation 28]

$$\Phi(Vx,\,Vy) = \sum_{i'j'\in\Omega ij}\Delta_{i'j'}^2\sum_{i'j'\in\Omega ij}\left(P0(i',\,j') - \right.$$

$$P1(i',\,j') + Vx(i,\,j)\left(\tau 0 * \frac{\partial P0(i',\,j')}{\partial x} + \tau 1 * \frac{\partial P1(i',\,j')}{\partial x}\right) +$$

$$Vy(i,\,j)\left(\tau 0\frac{\partial P0(i',\,j')}{\partial y} + \tau 1\frac{\partial P1(i',\,j')}{\partial y}\right)\Bigg)^2$$

[Equation 29]

$$(Vx,\,Vy) = \mathrm{argmin}_{Vx,Vy}\Phi(Vx,\,Vy)$$

Φ(Vx,Vy) is a function where the displacement vectors Vx and Vy are parameters, and the maximum value or the minimum value may be determined by calculating a value that becomes 0 by partially differentiating Φ(Vx,Vy) with respect to the displacement vectors Vx and Vy as in Equation 30.

[Equation 30]

$$\frac{\partial\Phi(Vx,\,Vy)}{\partial(Vx)} = 0;\ \frac{\partial\Phi(Vx,\,Vy)}{\partial(Vy)} = 0$$

That is, the displacement vectors Vx and Vy that minimize a value of ((Vx,Vy) may be determined. To solve the optimization issues, minimization may be first performed in a vertical direction and then may be first performed in a horizontal direction. According to the minimization, the displacement vector Vx may be determined according to Equation 31.

[Equation 31]

$$Vx = (s1 + r) > m?\ clip3\left(-thBIO,\ thBIO,\ -\frac{s3}{s1+r}\right):0$$

In this regard, a function clip3(x, y, z) is a function that outputs x when z<x, outputs y when z>y, and outputs z when x<z<y. According to Equation 31, when s1+r>m, the displacement vector Vx may be clip3(−thBIO,thBIO,−s3/(s1+r)), and when not s1+r>m, the displacement vector Vx may be 0.

According to the minimization, the displacement vector Vy may be determined according to Equation 32.

[Equation 32]

$$Vy = (s5 + r) > m?\ clip3\left(-thBIO,\ thBIO,\ -\frac{s6 - Vx*s2/2}{s5+r}\right):0$$

In this regard, a function clip3(x, y, z) is a function that outputs x when z<x, outputs y when z>y, and outputs z when x<z<y. According to Equation 32, when s5+r>m, the displacement vector Vy may be clip3(−thBIO,thBIO,−(s6−Vx*s2)/2/(s5+r)), and when not s5+r>m, the displacement vector Vy may be 0.

In this regard, s1, s2, s3, and s5 may be determined according to Equation 33. s4 may have a same value as that of s2.

$$s1 = \sum_{i',j' \in \Omega ij} \left( \frac{\partial P0(i',j')}{\partial x} + \tau 1 \frac{\partial P1(i',j')}{\partial x} \right)^2 \qquad \text{[Equation 33]}$$

$$s2 = s4 =$$

$$\sum_{i',j' \in \Omega ij} \left( \tau 0 \frac{\partial P0(i',j')}{\partial x} + \tau 1 \frac{\partial P1(i',j')}{\partial x} \right) \left( \tau 0 \frac{\partial P0(i',j')}{\partial y} + \tau 1 \frac{\partial P1(i',j')}{\partial y} \right)$$

$$s3 = - \sum_{i',j' \in \Omega ij} (P1(i',j') - P0(i',j')) \left( \tau 0 \frac{\partial P0(i',j')}{\partial x} + \tau 1 \frac{\partial P1(i',j')}{\partial x} \right)$$

$$s5 = \sum_{i',j' \in \Omega ij} \left( \frac{\partial P0(i',j')}{\partial y} + \tau 1 \frac{\partial P1(i',j')}{\partial y} \right)^2$$

$$s6 = - \sum_{i',j' \in \Omega ij} (P1(i',j') - P0(i',j')) \left( \tau 0 \frac{\partial P0(i',j')}{\partial y} + \tau 1 \frac{\partial P1(i',j')}{\partial y} \right)$$

As described above, r and m may be adjustment parameters introduced to avoid a resultant value of a division operation being 0 or less than 0, and may be determined according to Equation 34 based on an internal bit depth d of an input video. That is, the adjustment parameter m may be a minimum allowed denominator, and the adjustment parameter r may be an adjustment parameter introduced to prevent that division is performed by using 0 as a denominator when a gradient value is 0.

$$r = 500 * 4^{d-8} \qquad \text{[Equation 34]}$$

$$m = 700 * 4^{d-8}$$

The displacement vectors Vx and Vy may have an upper limit and a lower limit of ±thBIO. The displacement vectors Vx and Vy may be clipped by a particular threshold value thBIO because there may be a case in which pixel group unit motion compensation is not dependable due to noise or irregular motion. The adjustment parameter thBIO may be determined based on whether directions of all reference pictures are equal. For example, when the directions of all reference pictures are equal, the adjustment parameter thBIO may be determined to be 12^(d−8−1) or 12*2^(14−d). When the directions of all reference pictures are different, the adjustment parameter thBIO may be determined to be 12^(d−8−1)/2 or 12*2^(13−d).

However, the disclosure is not limited thereto, and values of the adjustment parameters r,m, and thBIO may be determined based on information about adjustment parameters, the information being obtained from a bitstream. In this regard, the information about adjustment parameters may be included in a slice header, a picture parameter set, a sequence parameter set, or various high level syntax carriers.

Also, the adjustment parameter may be determined according to whether temporally-different bi-directional prediction is usable. For example, adjustment parameter thBIO_diff of a case where the temporally-different bi-directional prediction is usable is larger than adjustment parameter thBIO_same of a case where temporally-same bi-directional prediction is usable, and a value of the adjustment parameter thBIO_diff may be twice as large as that of the adjustment parameter thBIO_same.

Figure 8B:
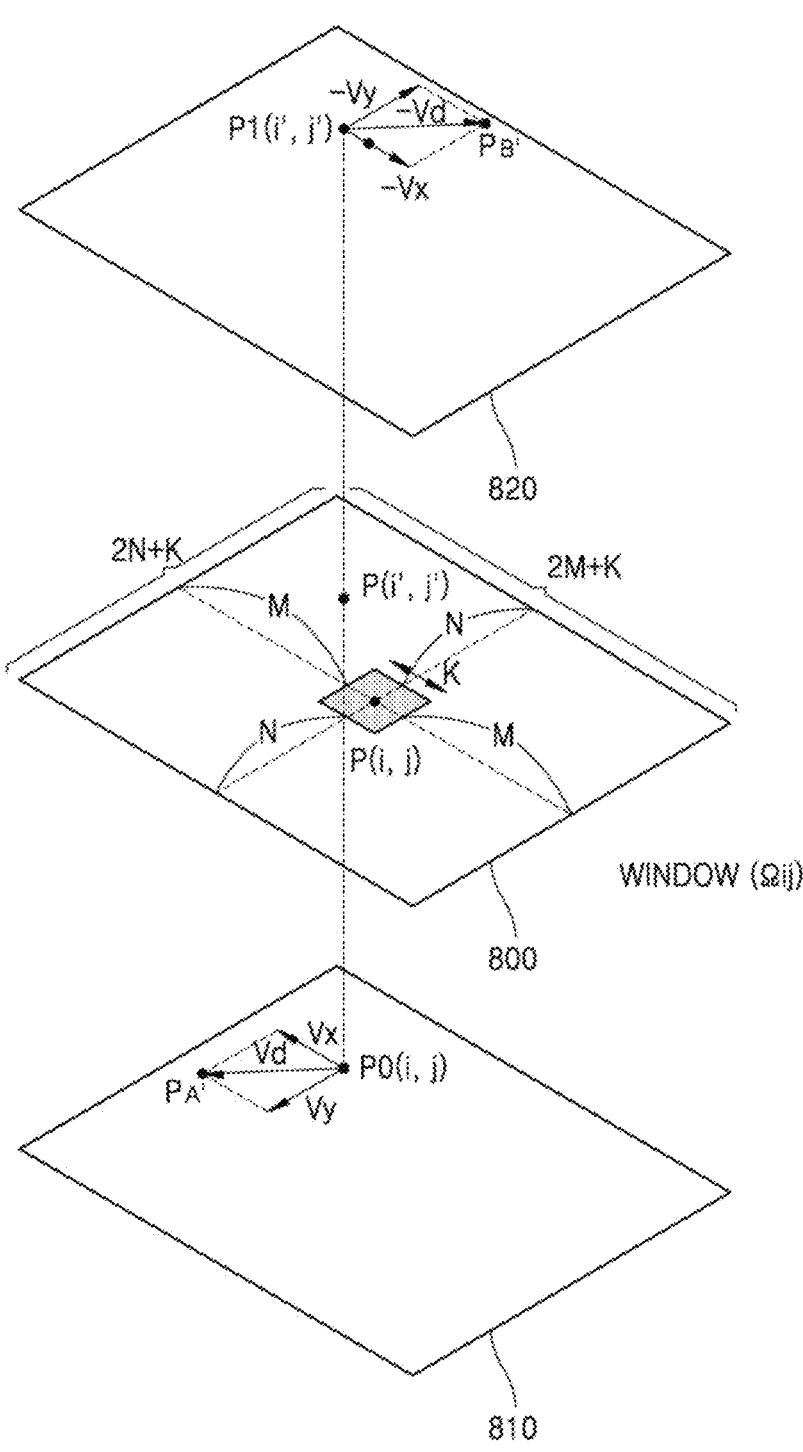
FIG. 8B is a reference diagram for describing processes of determining a horizontal direction displacement vector and a vertical direction displacement vector with respect to a pixel group, according to an embodiment.

FIG. 8B is a reference diagram for describing processes of determining a horizontal direction displacement vector and a vertical direction displacement vector with respect to a pixel group, according to an embodiment.

Referring to FIG. 8B, a window $\Omega ij$ 810 having a predetermined size has a size of (2M+K+1)*(2N+K+1) (where, M and N are integers) with respect to a pixel group 820 having a K×K size and including a plurality of pixels in a current block, not with respect to a pixel that is bi-directionally predicted.

In this regard, what is different from FIG. 8A is that a size of a window is increased, and except the difference, the horizontal direction displacement vector and the vertical direction displacement vector with respect to the pixel group may be determined in a same manner thereto.

Figure 8C:
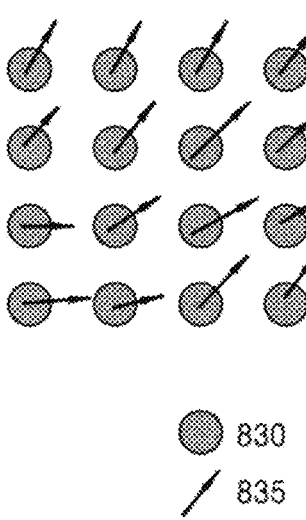
FIG. 8C is a reference diagram for describing processes of determining a horizontal direction displacement vector and a vertical direction displacement vector with respect to a pixel, according to an embodiment.

FIG. 8C is a reference diagram for describing processes of determining a horizontal direction displacement vector and a vertical direction displacement vector with respect to a pixel, according to an embodiment.

Referring to FIG. 8C, the video decoding apparatus 100 may determine a horizontal direction displacement vector and a vertical direction displacement vector with respect to each of pixels 830. Therefore, a displacement vector per unit time 835 with respect to each of the pixels 830 may be determined. In this regard, a horizontal direction displacement vector Vx[i,j] and a vertical direction displacement vector Vy[i,j] of the displacement vector per unit time 835 with respect to each of the pixels 830 may be determined according to Equation 35. In this regard, i and j may indicate an x-component and a y-component of coordinates of a pixel. In addition, σ1[i,j], σ2[i,j] σ3[i,j], σ5 [i,j], and σ6 [i,j] may be respectively s1, s2, s3, s5, and s6 of Equation 33.

$$Vx[i,j] = \frac{\sigma_3[i,j]}{\sigma_1[i,j]} \qquad \text{[Equation 35]}$$

$$Vy[i,j] = \frac{\sigma_6[i,j] - \sigma_2[i,j] * Vx[i,j]}{o_5[i,j]}$$

Figure 8D:
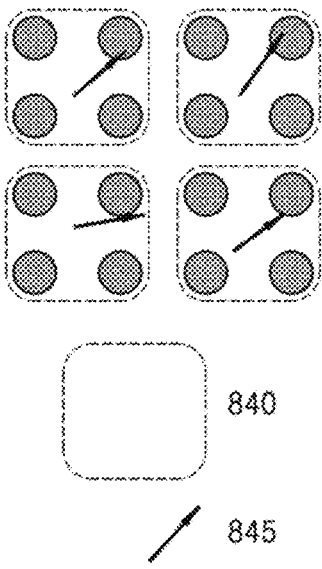
FIG. 8D is a reference diagram for describing processes of determining a horizontal direction displacement vector and a vertical direction displacement vector with respect to a pixel group, according to an embodiment.

FIG. 8D is a reference diagram for describing processes of determining a horizontal direction displacement vector and a vertical direction displacement vector with respect to a pixel group, according to an embodiment.

Referring to FIG. 8D, the video decoding apparatus 100 may determine σ1[i,j], σ2[i,j] σ3[i,j], σ5 [i,j], and σ6 [i,j] with respect to each of pixels included in each of pixel groups 840, according to Equation 35 described above.

The video decoding apparatus 100 may determine a horizontal direction displacement vector Vx[i,j] with respect to each of the pixel groups 840 by using σ1[i,j] and σ3[i,j] of pixels, according to Equation 36. In this regard, i and j may indicate an x-component and a y-component of upper-left coordinates of a pixel group.

$$\text{[Equation 36]}$$

$$Vx[i,j] = \frac{\sigma_3[i,j] + \sigma_3[i+1,j] + \sigma_3[i,j+1] + \sigma_3[i+1,j+1]}{\sigma_1[i,j] + \sigma_1[i+1,j] + \sigma_1[i,j+1] + \sigma_1[i+1,j+1]}$$

57

The video decoding apparatus 100 may calculate a vertical direction displacement vector of the pixel group by using a similar method of calculating a horizontal direction displacement vector. That is, the vertical direction displacement vector of the pixel group may be calculated by adding variables to a denominator, the variables being used by the denominator with respect to each of pixels so as to calculate the vertical direction displacement vector of the pixel group, and by adding variables to a numerator, the variables being used by the numerator with respect to each of the pixels so as to calculate the vertical direction displacement vector of the pixel group.

The video decoding apparatus 100 may determine a vertical direction displacement vector Vy[i,j] with respect to each of the pixel groups 840 by using σ2[i,j], σ5 [i,j], σ6 [i,j], and Vx[i,j] of the pixels, according to Equation 37. In this regard, the horizontal direction displacement vector Vx[i,j] may have been determined according to Equation 36.

[Equation 37]

$$Vy[i, j] = \frac{[\sigma_6[i, j] + \sigma_6[i+1, j] + \sigma_6[i, j+1] + \sigma_6[i+1, j+1] - \frac{[\sigma_2[i, j] + \sigma_2[i+1, j] + \sigma_2[i, j+1] + \sigma_2[i+1, j+1] * Vx[i, j]}{\sigma_5[i, j]}}{\sigma_5[i, j]}$$

As illustrated in FIG. 8C, when the horizontal direction displacement vector and the vertical direction displacement vector are determined with respect to each pixel, a division operation has to be performed twice on each pixel. However, as illustrated in FIG. 8D, in a case where the horizontal direction displacement vector and the vertical direction displacement vector are determined with respect to each group, when a size of a pixel group is L×L (where, L is an integer), 2/(L^2) division operations have to be performed on each pixel. Therefore, when the horizontal direction displacement vector and the vertical direction displacement vector are determined with respect to each group, a number of required division operations is decreased such that hardware complexity may be decreased and calculation time may be decreased.

Hereinabove, it is described in detail with reference to FIG. 8D that a pixel group has a 2×2 size, but the disclosure is not limited thereto, and thus the pixel group may have an L×L size (where, L is an integer).

In this regard, a size L of the pixel group may be determined according to Equation 38. W and H may respectively refer to a width and a height of a current block.

$$L = Max\left(\frac{Min(W, H)}{8}, 2\right)$$

[Equation 38]

When the video decoding apparatus 100 performs pixel group unit motion compensation along with block enlargement by a window size, and performs only the pixel group unit motion compensation, the video decoding apparatus 100 may perform memory access operations and multiplication operations as much as the number of memory accesses the number of multiplication operations of each case according to Table 1 below. In this regard, it is assumed that a length T of a signal filter is 8, a length T of a gradient filter is 6, a size of a pixel group is L×L, a size of a block is N×N, and a window size of each pixel 2M+1 is 5.

58

TABLE 1

|  | pixel group unit motion compensation along with block enlargement | pixel group unit motion compensation |
|---|---|---|
| number of memory accesses | 2 × (N + 4 + 7) × (N + 4 + 7) | 2 × (N + 4 + 7) × (N + 4 + 7) |
| number of multiplication operations | 2*8*{(N + 4 + 7) × (N + 4) + (N + 4) × (N + 4)} 2*6*{(N + 4 + 5) × (N + 4) + (N + 4) × (N + 4)} 2*6*{(N + 4 + 5) × (N + 4) + (N + 4) × (N + 4)} | 2*8*{(N + 4 + 7) × (N + 4) + (N + 4) × (N + 4)} 2*2*{(N + 4) × (N + 4)} 2*2*{(N + 4) × (N + 4)} |
| division operation number | 2N*N | 2*N*N/L^2 |

That is, when the video decoding apparatus 100 performs pixel group unit motion compensation, the video decoding apparatus 100 may perform division operations by decreasing the number of division operations by a value obtained by dividing a value by L^2, the value corresponding to a size of a pixel group.

Figure 9A:
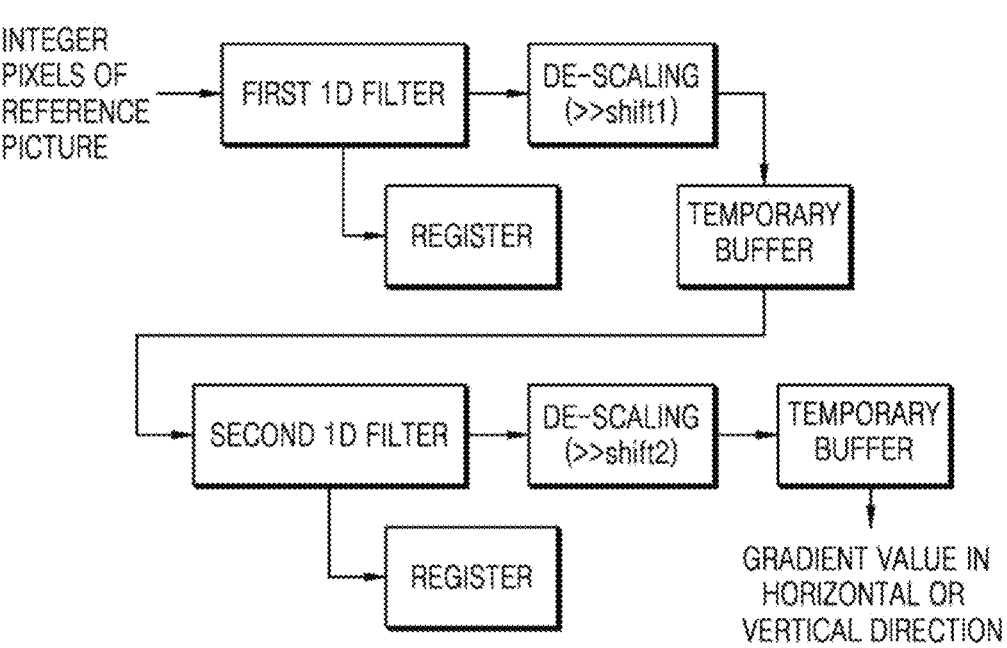
FIG. 9A is a diagram for describing processes of adding an offset value after filtering is performed, and determining a gradient value in a horizontal or vertical direction by performing de-scaling, according to an embodiment.

FIG. 9A is a diagram for describing processes of adding an offset value after filtering is performed, and determining a gradient value in a horizontal or vertical direction by performing de-scaling, according to an embodiment.

Referring to FIG. 9A, the video decoding apparatus 100 may determine a gradient value in a horizontal or vertical direction by performing filtering on a pixel, in which a predetermined direction component is at an integer location, by using a first 1D filter and a second 1D filter. However, a value obtained by performing the filtering on the pixel, in which the predetermined direction component is at the integer location, by using the first 1D filter or the second 1D filter may exceed a predetermined range. This phenomenon is referred to as an overflow phenomenon. Coefficients of a 1D filter may be determined to be integers for performing an integer operation, instead of an inaccurate and complicated fractional operation. The coefficients of the 1D filter may be scaled to be determined as the integers. When filtering is performed by using the scaled coefficients of the 1D filter, it is possible to perform an integer operation, but compared to a case where filtering is performed by using not-scaled coefficients of the 1D filter, a value on which the filtering has been performed may be increased such that the overflow phenomenon may occur. Accordingly, to prevent the overflow phenomenon, de-scaling may be performed after filtering is performed by using the 1D filter. In this regard, the de-scaling may include bit-shifting to the right by the number of de-scaling bits. The number of de-scaling bits may be determined based on a maximum bit number of a register for a filtering operation and a maximum bit number of a temporal buffer that stores a result of the filtering operation, while maximizing accuracy of calculation. In particular, the number of de-scaling bits may be determined based on an internal bit depth, a scaled bit number for an interpolation filter, and a scaled bit number for a gradient filter.

Hereinafter, performing of de-scaling during processes of generating an interpolation filtered value in a vertical direction by first performing filtering on a pixel at an integer location by using an interpolation filter in the vertical direction so as to determine a gradient value in a horizontal direction and then performing filtering on the interpolation filtered value in the vertical direction by using the gradient filter in the horizontal direction will be described.

According to Equation 12 described above, the video decoding apparatus 100 may first perform filtering on a pixel at an integer location by using an interpolation filter in a vertical direction so as to determine a gradient value in a horizontal direction. In this regard, $shift_1$ may be determined to be b−8. In this regard, b may indicate an internal bit depth of an input image. Hereinafter, with reference to Table 2, a bit depth (Reg Bitdepth) of a register and a bit depth (Temp Bitdepth) of a temporary buffer when de-scaling is actually performed based on $shift_1$ will now be described.

TABLE 2

| B | Min(I) | Max(I) | RegMax | RegMin | Reg Bitdepth | TempMax | TempMin | Temp Bitdepth |
|---|---|---|---|---|---|---|---|---|
| 8 | 0 | 255 | 22440 | −6120 | 16 | 22440 | −6121 | 16 |
| 9 | 0 | 511 | 44968 | −12264 | 17 | 22484 | −6133 | 16 |
| 10 | 0 | 1023 | 90024 | −24552 | 18 | 22506 | −6139 | 16 |
| 11 | 0 | 2047 | 180136 | −49128 | 19 | 22517 | −6142 | 16 |
| 12 | 0 | 4095 | 360360 | −98280 | 20 | 22523 | −6143 | 16 |
| 16 | 0 | 65535 | 5767080 | −1572840 | 24 | 22528 | −6145 | 16 |

In this regard, values of variables in Table 2 may be determined according to Equation 39.

$$RegMin = \text{Min}(I) * FilterSumPos + \text{Max}(I) * FilterSumNeg \quad \text{[Equation 39]}$$

$$RegMax = \text{Max}(I) * FilterSumPos + \text{Min}(I) * FilterSumNeg$$

$$Reg\ BitDepth = \text{ceiling}(\log_2(RegMax - RegMin) + 1)$$

$$TempMin = (RegMin + \text{offset1}) \gg \text{shift1}$$

$$TempMax = (RegMax + \text{offset1}) \gg \text{shift1}$$

$$Temp\ BitDepth = \text{ceiling}(\log_2(TempMax - TempMin) + 1)$$

In this regard, Min(I) may indicate a minimum value of a pixel value I determined by an internal bit depth, and Max(I) may indicate a maximum value of the pixel value I determined by the internal bit depth. FilterSumPos indicates a maximum value of the sum of positive filter coefficients, and FilterSumNeg indicates a minimum value of the sum of negative filter coefficients.

For example, when it is assumed that a gradient filter FracFilter in a ¼ pel unit in FIG. 7C is used, FilterSumPos may be 88 and FilterSumNeg may be −24.

A function Ceiling(x) may be a function that outputs a smallest integer from among integers equal to or greater than x, with respect to a real number x. $offset_1$ is an offset value added to a value on which filtering has been performed so as to prevent a round-off error that may occur while de-scaling is performed by using $shift_1$, and $offset_1$ may be determined to be $2^{\wedge}(shift_1 - 1)$.

internal bit depth b is 9, the bit depth of the register may be 17, and when the internal bit depth b is 10, 11, 12, and 16, the bit depth of the register may be 18, 19, 20, and 24. When a register used to perform filtering is a 32-bit register, because bit depths of all registers in Table 2 do not exceed 32, an overflow phenomenon does not occur.

Equally, when the internal bit depths b are 8, 9, 10, 11, 12, and 16, the bit depths (Temp BitDepth) of the temporary buffers are all 16. When a temporary buffer used to store a value on which filtering is performed and then de-scaling is performed is a 16-bit buffer, because bit depths of all temporary buffers in Table 2 are 16 and thus do not exceed 16, an overflow phenomenon does not occur.

According to Equation 12, the video decoding apparatus 100 may generate an interpolation filtered value in a vertical direction by first performing filtering on a pixel at an integer location by using a vertical direction interpolation filter so as to determine a gradient value in a horizontal direction, and then may perform filtering on the interpolation filtered value in the vertical direction by using a gradient filter in the horizontal direction, according to Equation 13. In this regard, $shift_2$ may be determined to be p+q−$shift_1$. In this regard, p may indicate bit number scaled with respect to an interpolation filter including the filter coefficients illustrated in FIG. 7C, and q may indicate a bit number scaled with respect to a gradient filter including filter coefficients illustrated in FIG. 7A. For example, p may be 6 and q may be 4, and therefore, $shift_2$=18−b.

The reason why $shift_2$ is determined as described above is because $shift_1$+$shift_2$, i.e., the total sum of the number of de-scaled bits, should be equal to the sum (p+q) of the number of bits up-scaled with respect to a filter such that, even when a filter coefficient is up-scaled and when the filter coefficient is not up-scaled, final filtering result values are the same.

Hereinafter, with reference to Table 3, a bit depth (Reg Bitdepth) of a register and a bit depth (Temp Bitdepth) of a temporary buffer when de-scaling is actually performed based on $shift_2$ will now be described.

TABLE 3

| B | TempMin | TempMax | RegMax | RegMin | Reg Bitdepth | OutMax | OutMin | Temp Bitdepth |
|---|---|---|---|---|---|---|---|---|
| 8 | −6121 | 22440 | 1942148 | −1942148 | 23 | 1897 | −1898 | 13 |
| 9 | −6133 | 22484 | 1945956 | −1945956 | 23 | 3801 | −3802 | 14 |
| 10 | −6139 | 22506 | 1947860 | −1947860 | 23 | 7609 | −7610 | 15 |
| 11 | −6142 | 22517 | 1948812 | −1948812 | 23 | 15225 | −15226 | 16 |
| 12 | −6143 | 22523 | 1949288 | −1949288 | 23 | 30458 | −30459 | 17 |
| 16 | −6145 | 22528 | 1949764 | −1949764 | 23 | 487441 | −487442 | 21 |

Referring to Table 2, when the internal bit depth b is 8, the bit depth (Reg Bitdepth) of the register may be 16, when the In this regard, values of variables in Table 3 may be determined according to Equation 36.

$$RegMin =$$ [Equation 40]

$$TempMin * FilterSumPos + TempMax * FilterSumNeg$$

$$RegMax = TempMax * FilterSumPos + TempMin * FilterSumNeg$$

$$Reg\ BitDepth = \text{ceiling}(\log_2(RegMax - RegMin) + 1)$$

$$TempMin = (RegMin + \text{offset2}) \gg \text{shift2}$$

$$TempMax = (RegMax + \text{offset2}) \gg \text{shift2}$$

$$Temp\ BitDepth = \text{ceiling}(\log_2(TempMax - TempMin) + 1)$$

In this regard, TempMax may indicate TempMax of Table 3 and TempMin may indicate TempMin of Table 3. FilterSumPos indicates a maximum value of the sum of positive filter coefficients and FilterSumNeg indicates a minimum value of the sum of negative filter coefficients. For example, when it is assumed that a gradient filter gradFilter in a $\frac{1}{4}$ pel unit illustrated in FIG. 7C is used, FilterSumPos may be 68 and FilterSumNeg may be −68.

$\text{offset}_2$ is an offset value added to a value on which filtering has been performed so as to prevent a round-off error that may occur while de-scaling is performed by using $\text{shift}_2$, and $\text{offset}_2$ may be determined to be $2^{\wedge}(\text{shift}_2-1)$.

$\text{shift}_1$ and $\text{shift}_2$ may be determined as described above, but the disclosure is not limited thereto, and thus, $\text{shift}_1$ and $\text{shift}_2$ may be variously determined in such a manner that the sum of $\text{shift}_1$ and $\text{shift}_2$ may be equal to the sum of scaled bit numbers with respect to a filter. In this regard, values of $\text{shift}_1$ and $\text{shift}_2$ may be determined based on the premise that an overflow phenomenon does not occur. $\text{shift}_1$ and $\text{shift}_2$ may be determined based on an internal bit depth of an input image and a scaled bit number with respect to a filter.

However, $\text{shift}_1$ and $\text{shift}_2$ may not be necessarily determined to allow the sum of $\text{shift}_1$ and $\text{shift}_2$ to be equal to the sum of scaled bit numbers with respect to a filter. For example, $\text{shift}_1$ may be determined to be d−8, but $\text{shift}_2$ may be determined to be a fixed number.

When $\text{shift}_1$ is the same as previous and $\text{shift}_2$ is a fixed number of 7, OutMax, OutMin, and Temp Bitdepth described with reference to Table 3 may be changed. Hereinafter, a bit depth (Temp Bitdepth) of a temporary buffer will now be described with reference to Table 4.

TABLE 4

| b | OutMax | OutMin | Temp Bitdepth |
|---|--------|--------|---------------|
| 8 | 15173 | −15174 | 16 |
| 9 | 15203 | −15204 | 16 |
| 10 | 15218 | −15219 | 16 |
| 11 | 15225 | −15226 | 16 |
| 12 | 15229 | −15230 | 16 |
| 16 | 15233 | −15234 | 16 |

Unlike Table 3, in Table 4, the bit depths (Temp Bitdepth) of the temporary buffers are equal as 16 in all b, and when it is assumed that resultant data is stored by using a 16-bit temporary buffer, the bit depth (Temp Bitdepth) of the temporary buffer is smaller than 16 such that an overflow phenomenon does not occur with respect to internal bit depths of all input images. On the other hand, referring to Table 3, in a case where internal bit depths of input images are 12 and 16, when it is assumed that resultant data is stored by using a 16-bit temporary buffer, the bit depth (Temp Bitdepth) of the temporary buffer is greater than 16 such that an overflow phenomenon may occur.

When $\text{shift}_2$ is a fixed number, a resultant value obtained by performing filtering without using a scaled filter coefficient may be different from a resultant value obtained by performing filtering by using the scaled filter coefficient and then performing de-scaling. In this case, it would be obvious to one of ordinary skill in the art that it is required to additionally perform de-scaling.

Hereinabove, performing of de-scaling during processes of generating an interpolation filtered value in a vertical direction by first performing filtering on a pixel at an integer location by using the vertical direction interpolation filter so as to determine a gradient value in a horizontal direction, and then performing filtering on the interpolation filtered value in the vertical direction by using a gradient filter in the horizontal direction has been described, but it would be obvious to one of ordinary skill in the art that de-scaling may be performed in a similar manner when filtering is performed on a pixel, in which a predetermined direction component is an integer, so as to determine gradient values in horizontal and vertical directions via a combination of various 1D filters.

Figure 9B:
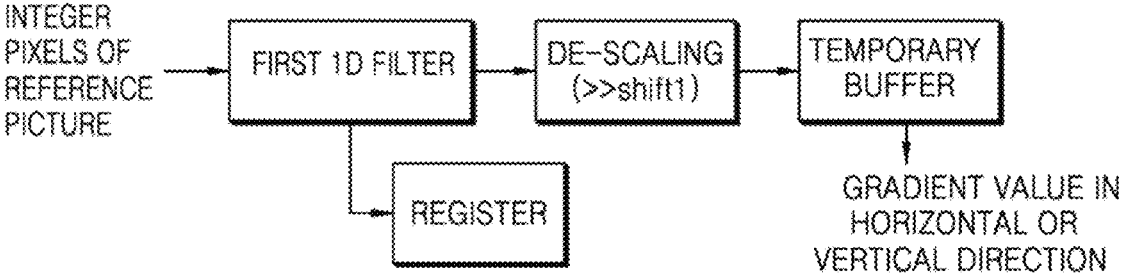
FIG. 9B is a diagram for describing processes of adding an offset value after filtering is performed, and determining a gradient value in a horizontal or vertical direction by performing de-scaling, according to another embodiment.

FIG. 9B is a diagram for describing processes of adding an offset value after filtering is performed, and determining a gradient value in a horizontal or vertical direction by performing de-scaling, according to another embodiment.

Referring to FIG. 9B, the video decoding apparatus 100 may perform filtering based on an input of fractional pixels and integer pixels of a reference pixel. In this regard, it is assumed that the fractional pixels of the reference picture have been determined by applying a 1D filter in horizontal and vertical directions on the integer pixels of the reference pixel.

The video decoding apparatus 100 may determine a gradient value in a horizontal direction or a vertical direction by performing filtering on a pixel, in which a predetermined directional location component is a fraction, and the integer pixels, by using the 1D filter in the horizontal direction or the vertical direction. However, a value obtained by performing filtering, by using a first 1D filter, on the pixel, in which the predetermined directional location component is a fraction, and the integer pixel, may exceed a predetermined range. This phenomenon is referred to as an overflow phenomenon. Coefficients of the 1D filter may be determined to be integers for performing an integer operation, instead of an inaccurate and complicated fractional operation. The coefficients of the 1D filter may be scaled to be determined as the integers. When filtering is performed by using the scaled coefficients of the 1D filter, it is possible to perform an integer operation, but compared to a case where filtering is performed by using not-scaled coefficients of the 1D filter, a value on which the filtering has been performed may be increased such that the overflow phenomenon may occur. Accordingly, to prevent the overflow phenomenon, de-scaling may be performed after the filtering is performed by using the 1D filter. In this regard, the de-scaling may include bit-shifting to the right by the number of de-scaling bits (shift1). The number of de-scaling bits may be determined based on a maximum bit number of a register for a filtering operation and a maximum bit number of a temporal buffer that stores a result of the filtering operation, while maximizing accuracy of calculation. In particular, the number of de-scaling bits may be determined based on an internal bit depth and a scaled bit number for a gradient filter.

Figure 9C:
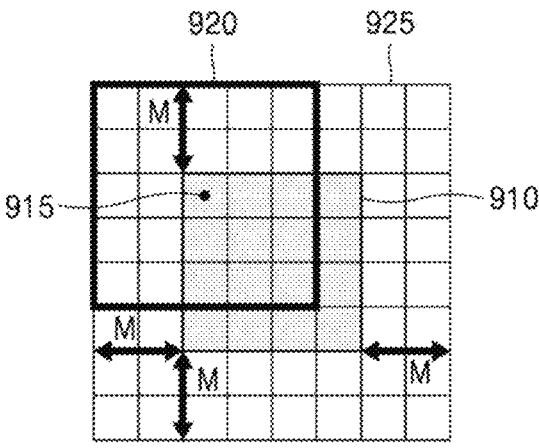
FIG. 9C is a diagram for describing a necessary input range for determining a horizontal direction displacement vector and a vertical direction displacement vector during processes of performing pixel-unit motion compensation on a current block.

FIG. 9C is a diagram for describing a necessary range for determining a horizontal direction displacement vector and a vertical direction displacement vector during processes of performing pixel-unit motion compensation on a current block.

Referring to FIG. 9C, during processes of performing pixel-unit motion compensation on a reference block 910 corresponding to the current block, the video decoding apparatus 100 may determine a displacement vector per unit time in a horizontal direction and a displacement vector per unit time in a vertical direction in a pixel 915 by using a window 920 around the pixel 915 located in the upper-left in the reference block 910. In this regard, the displacement vector per unit time in the horizontal direction or the vertical direction may be determined by using a pixel value and a gradient value of a pixel located in a range exceeding the reference block 910. Equally, during processes of determining a horizontal direction displacement vector and a vertical direction displacement vector with respect to a pixel located at a boundary of the reference block 910, the video decoding apparatus 100 may determine a pixel value and a gradient value of a pixel located in a range exceeding the reference block 910. Therefore, the video decoding apparatus 100 may determine a horizontal direction displacement vector and a vertical direction displacement vector by using a block 925 of which range is larger than the reference block 910. For example, when a size of the current block is A×B, and a size of a window for each pixel is (2M+1)×(2N+1), the size of a range for determining a horizontal direction displacement vector and a vertical direction displacement vector may be (A+2M)×(B+2N).

Figure 9D:
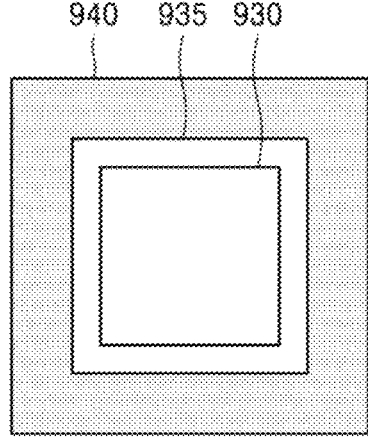
FIGS. 9D to 9E are diagrams for determining an input range of a region used in processes of performing pixel-unit motion compensation, according to various embodiments.
Figure 9E:
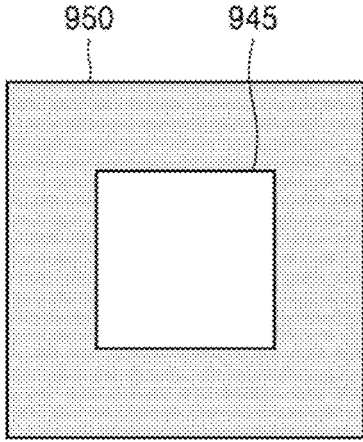

FIGS. 9D to 9E are diagrams for determining a range of a region used in processes of performing pixel-unit motion compensation, according to various embodiments.

Referring to FIG. 9D, during processes of performing pixel-unit motion compensation, the video decoding apparatus 100 may determine a horizontal direction displacement vector and a vertical direction displacement vector with respect to each of pixels included in a reference block 930, based on a block 935 having a range that is enlarged by a size of a window of a pixel located at a boundary of the reference block 930. However, when a horizontal direction displacement vector and a vertical direction displacement vector are determined, the video decoding apparatus 100 requires a pixel value and a gradient value of a pixel located in the block 935, and to obtain the pixel value and the gradient value, the video decoding apparatus 100 may use an interpolation filter or a gradient filter. During a process of using the interpolation filter or the gradient filter for the boundary pixel of the block 935, a pixel value of a neighboring pixel may be used, and thus, a pixel located outside a block boundary may be used. Therefore, pixel-unit motion compensation may be performed by using a block 940 of which range is additionally enlarged based on a value obtained by subtracting 1 from the number of taps of the interpolation filter or the gradient filter. Therefore, in a case where a size of a block is N×N, a size of a window for each pixel is (2M+1)×(2M+1), and a length of the interpolation filter or the gradient filter is T, (N+2M+T−1)×(N+2M+T−1) may be possible.

Referring to FIG. 9E, during processes of performing pixel-unit motion compensation, the video decoding apparatus 100 may determine a horizontal direction displacement vector and a vertical direction displacement vector with respect to each of pixels by using a pixel value and a gradient value of a pixel located in a reference block 945, without enlarging the reference block 945 based on a size of a window of a pixel located at a boundary of the reference block 945. Particular processes, performed by the video decoding apparatus 100, of determining a displacement vector per unit time in a horizontal direction and a displacement vector per unit time in a vertical direction without enlarging a reference block will be described with reference to FIG. 9E. In this regard, an interpolation filter or a gradient filter may be used with respect to the reference block 945 so as to obtain the pixel value and the gradient value of the pixel, and pixel-unit motion compensation may be performed by using an enlarged block 950. Therefore, in a case where a size of a block is N×N, a size of a window for each pixel is (2M+1)×(2M+1), and a length of the interpolation filter or the gradient filter is T, (N+T−1)×(N+T−1) may be possible.

Figure 9F:
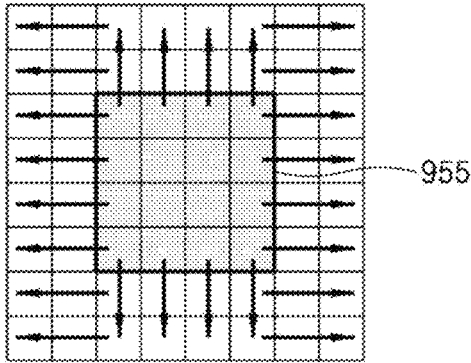
FIG. 9F is a diagram for describing processes of determining a horizontal direction displacement vector and a vertical direction displacement vector, without enlarging a reference block.

FIG. 9F is a diagram for describing processes of determining a horizontal direction displacement vector and a vertical direction displacement vector, without enlarging a reference block.

Referring to FIG. 9F, for a pixel located outside a boundary of a reference block 955, the video decoding apparatus 100 may adjust a location of the pixel to a location of an available pixel that is closest to the pixel and is from among pixels located within the boundary of the reference block 955, and may determine a pixel value and a gradient value of the pixel located outside the boundary to be a pixel value and a gradient value of the available pixel at the closest location. In this regard, the video decoding apparatus 100 may adjust the location of the pixel located outside the boundary of the reference block 955 to the location of the available pixel at the closest location according to an equation: $i'=i'<0?0:i';i'>H−1?H−1:i'$ and an equation: $j'=j'<0?0:j';$ $j'>W−1?W−1:j'$.

In this regard, i' may indicate an x-coordinate value of a pixel, j' may indicate a y-coordinate value of the pixel, and H and W may indicate a height and a width of a reference block. In this regard, an upper-left location in the reference block is assumed to be (0, 0). When the upper-left location in the reference block is (xP, yP), a location of a final pixel may be (i'+xP, j'+yP).

Referring back to FIG. 9D, locations of pixels that are in the block 935 enlarged by a size of a window of each pixel and are located outside the boundary of the reference block 930 may be adjusted to locations of pixels adjacent to the inside of the boundary of the reference block 930, and thus, as illustrated in FIG. 9E, the video decoding apparatus 100 may determine a horizontal direction displacement vector and a vertical direction displacement vector with respect to each of pixels in the reference block 945 by using a pixel value and a gradient value of the reference block 945.

Therefore, the video decoding apparatus 100 performs pixel-unit motion compensation without enlarging the reference block 945 by a size of a window of each pixel, such that the number of memory accesses for referring to a pixel value may be decreased, the number of multiplication operations may be decreased, and thus complexity in operations may be decreased.

When the video decoding apparatus 100 performs block-unit motion compensation (as in an operation according to the High Efficiency Video Coding (HEVC) standard), performs pixel-unit motion compensation with block enlargement by a window size, and performs the pixel-unit motion compensation without the block enlargement, the video decoding apparatus 100 may perform memory access operations and multiplication operations as much as the number of memory accesses the number of multiplication operations of each case according to Table 5 below. In this regard, it is assumed that a length of a signal (interpolation) filter is 8, a length of a gradient filter is 6, a size of a block is N×N, and a window size of each pixel 2M+1 is 5.

TABLE 5

| | block-unit motion compensation according to HEVC standard | pixel-unit motion compensation with block enlargement | pixel-unit motion compensation without block enlargement |
|---|---|---|---|
| number of memory accesses | 2*(N + 7) × (N + 7) | 2 × (N + 4 + 7) × (N + 4 + 7) | 2 × (N + 7) × (N + 7) |
| number of multiplication operations | 2*8*{(N + 7) × N + N × N} | 2*8*{(N + 4 + 7) × (N + 4) + (N + 4) × (N + 4)} 2*6*{(N + 4 + 5) × (N + 4) + (N + 4) × (N + 4)} 2*6*{(N + 4 + 5) × (N + 4) + (N + 4) × (N + 4)} | 2*8*{(N + 7) × N + N × N + 4} 2*6*{(N + 5) × N + N × N} 2*6*{(N + 5) × N + N × N} |

In the block-unit motion compensation according to the HEVC standard, an 8-tap interpolation filter is used for one sample, and therefore, 8 neighboring samples are required. Accordingly, when a size of a reference block is N×N, (N+7)×(N+7) reference samples are required for 8-tap interpolation, and because bi-directional motion prediction compensation is to be performed, two reference blocks are to be used, and therefore, in the block-unit motion compensation according to the HEVC standard, 2*(N+7)×(N+7) times of memory accesses are required as in Table 4. In a case where the pixel-unit motion compensation is performed with block enlargement, in M=2, when the pixel-unit motion compensation is performed on a block having an enlarged size of (N+4)×(N+4) by using an 8-tap interpolation filter or a gradient filter, (N+4+7)×(N+4+7) reference samples are required, and because bi-directional motion prediction compensation is to be performed, two reference blocks are to be used, and therefore, in the pixel-unit motion compensation performed with block enlargement, 2*(N+4+7)×(N+4+7) times of memory accesses are required as in Table 5.

In a case where the pixel-unit motion compensation is performed without block enlargement, because there is no enlargement with respect to a block, (N+7)×(N+7) reference samples are required as in the block-unit motion compensation according to the HEVC standard, and because bi-directional motion prediction compensation is to be performed, two reference blocks are to be used, and therefore, in the pixel-unit motion compensation performed without block enlargement, 2*(N+7)×(N+7) times of memory accesses are required as in Table 5.

In the block-unit motion compensation according to the HEVC standard, the 8-tap interpolation filter is used for one sample, and therefore, a sample required to perform first interpolation in a horizontal direction is (N+7)×N sample. A sample required to perform second interpolation in a vertical direction is N×N sample. The number of multiplication operations required for each 8-tap interpolation filter is 8, and because bi-directional motion prediction compensation is to be performed, two reference blocks are to be used, and therefore, in the block-unit motion compensation according to the HEVC standard, 2*8*{(N+7)*N+N*N) times of multiplication operations are required as in Table 5.

In a case where the pixel-unit motion compensation is performed with block enlargement, a size of a block is enlarged to perform the pixel-unit motion compensation, and therefore, to determine a pixel value at a fractional pixel location by using the 8-tap interpolation filter with respect to the block having the enlarged size of (N+4)×(N+4), the total sum of 2*8*{(N+4+7)×(N+4)+(N+4)×(N+4)} times of multiplication operations are required as in Table 5.

In a case where the pixel unit-motion compensation is performed with block enlargement, a 6-tap gradient filter and a 6-tap interpolation filter are used to determine a gradient value in a horizontal direction or a vertical direction. Because the size of the block has been enlarged, the total sum of 2*6*{(N+4+5)×(N+4)+(N+4)×(N+4)}*2 times of multiplication operations are required as in Table 5 so as to determine the gradient value by using the 6-tap gradient filter and the 6-tap interpolation filter with respect to the block having the enlarged size of (N+4)×(N+4).

In a case where the pixel-unit motion compensation is performed without block enlargement, because there is no block enlargement, (N+7)×(N+7) reference samples are required as in the block-unit motion compensation according to the HEVC standard, and because bi-directional motion prediction compensation is to be performed, two reference blocks are to be used, and therefore, in the pixel-unit motion compensation performed without block enlargement, the total sum of 2*8*{(N+7)×N+N×N} times of multiplication operations are required to determine the pixel value at the fractional pixel location by using the 8-tap interpolation filter with respect to a block with a N×N size.

When the pixel-unit motion compensation is performed without block enlargement, a 6-tap gradient filter and a 6-tap interpolation filter are used to determine a gradient value in a horizontal direction or a vertical direction. To determine a gradient value by using the 6-tap gradient filter and the 6-tap interpolation filter with respect to the block with a N×N size, the total sum of 2*6*{(N+5)×N+N×N}*2 times of multiplication operations are required as in Table 5.

Figure 9G:
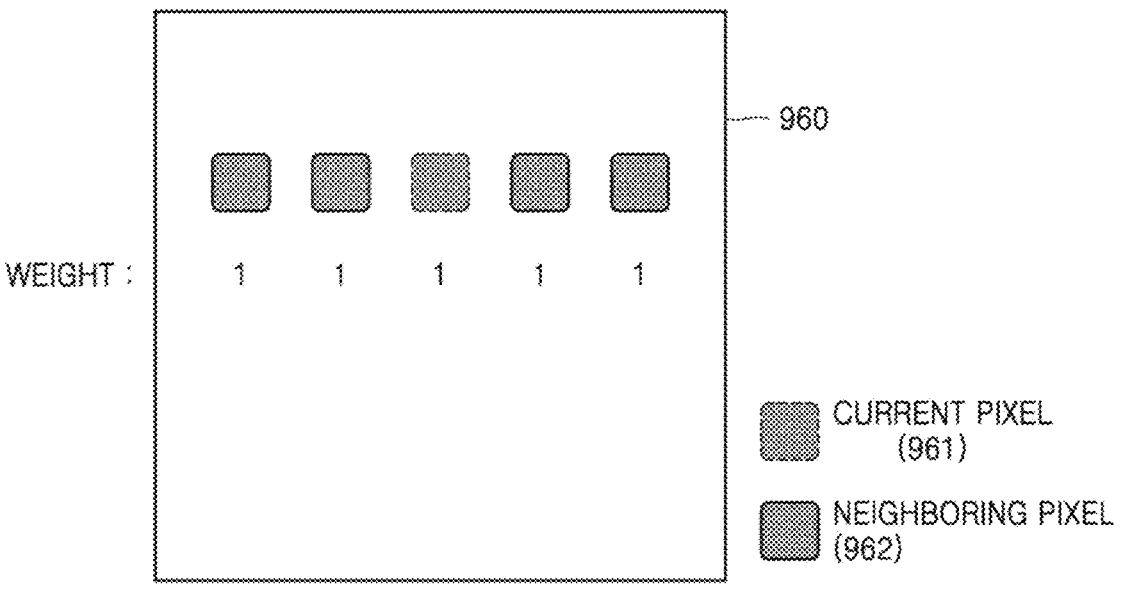
FIGS. 9G to 9I are diagrams for describing processes of determining a horizontal direction displacement vector and a vertical direction displacement vector without enlarging a reference block, according to other embodiments.
Figure 9H:
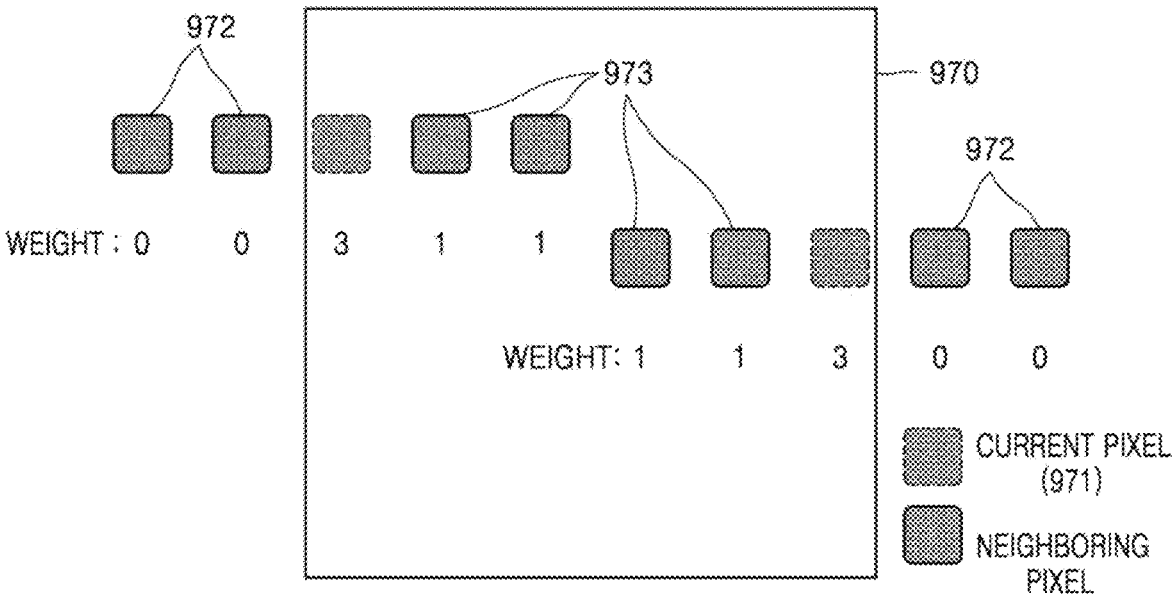
Figure 9I:
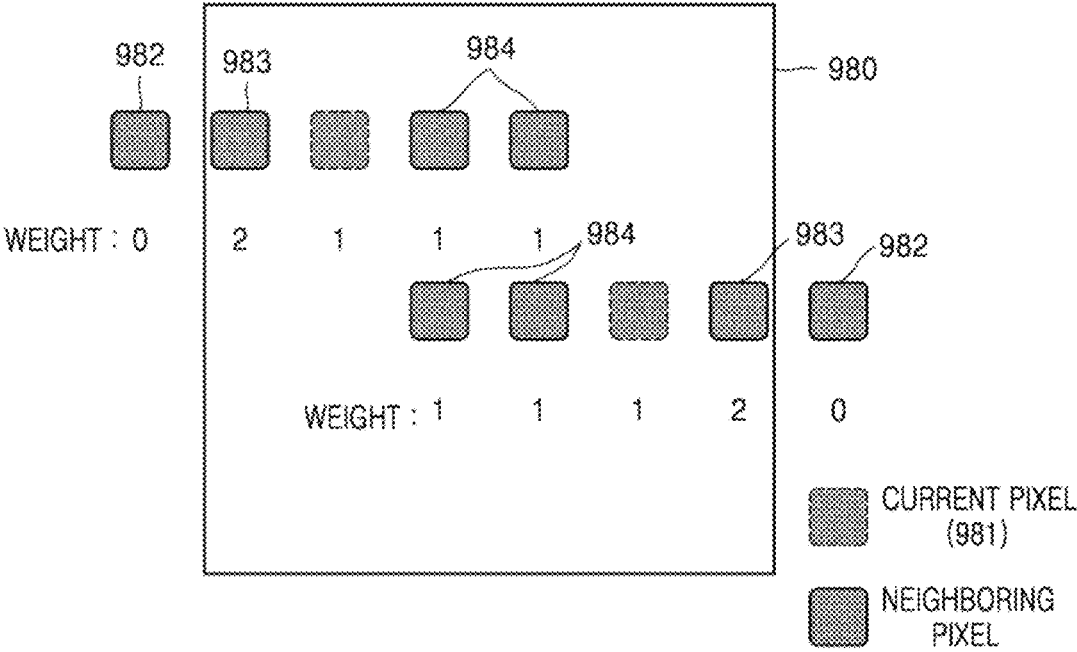

FIGS. 9G to 9I are diagrams for describing processes of determining a horizontal direction displacement vector and a vertical direction displacement vector without enlarging a reference block, according to other embodiments.

As described above with reference to FIG. 9D, during processes of performing pixel-unit motion compensation, the video decoding apparatus 100 may determine a horizontal direction displacement vector and a vertical direction displacement vector for each of pixels included in a reference block 930, based on a block 935 of which range is enlarged by a size of a window of a pixel located at a boundary of the reference block 930. For example, in a case where the size of the window is (2M+1)×(2M+1), when a window is applied to the pixel located at the boundary of the reference block 930, the video decoding apparatus 100 may determine a horizontal direction displacement vector and a vertical direction displacement vector for each of the pixels by referring to a pixel value and a gradient value of a pixel exceeding the reference block 930 by M.

Hereinafter, a method according to another embodiment, performed by the video decoding apparatus 100, of determining values (s1 to s6 of Equation 33) for determining a horizontal direction displacement vector and a vertical direction displacement vector with respect to each pixel by using only a pixel value and a gradient value of a reference block corresponding to a current block, without referring to a pixel value and a gradient value of a pixel outside the reference block, will now be described. Here, it is assumed that a size of a window is 5×5. For convenience, only pixels located in a horizontal direction with respect to a current pixel will now be described. It would be obvious to one of ordinary skill in the art that a weight may be equally determined with respect to pixels located in a vertical direction with respect to the current pixel.

The video decoding apparatus 100 performs a calculation on a function about pixel values (P0(I',j') and P1(I',j')), a gradient value in a horizontal or vertical direction $$\left( \frac{\partial P0(i', j')}{\partial x}, \frac{\partial P0(i', j')}{\partial y}, \frac{\partial P1(i', j')}{\partial x}, \text{and } \frac{\partial P1(i', j')}{\partial y} \right),$$

and a difference ($\tau 0$, $\tau 1$) between POCs of a reference picture and a current picture with respect to each of pixels included in a window with respect to a current pixel for which a horizontal direction displacement vector or a vertical direction displacement vector is to be determined, and determines the values (s1 to s6 of Equation 33) for determining a horizontal direction displacement vector and a vertical direction displacement vector with respect to each pixel by adding resultant values of the calculation performed on each pixel.

In this regard, the video decoding apparatus 100 may determine the values (s1 to s6 of Equation 33) for determining a horizontal direction displacement vector and a vertical direction displacement vector with respect to each pixel by allocating a same weight to each pixel, multiplying the weight by each of the resultant values of the calculation performed on each pixel, and then by summing values thereof.

Referring to FIG. 9G, during a process of determining a horizontal direction displacement vector and a vertical direction displacement vector with respect to a current pixel 961 in a current block 960, the video decoding apparatus 100 may determine pixels in a window to have a same weight of 1. The video decoding apparatus 100 may determine values (s1 to s6 of Equation 33) for determining a horizontal direction displacement vector and a vertical direction displacement vector with respect to a current pixel by multiplying weights determined for respective pixels by the resultant values of respective calculations for respective pixels and then by summing resultant values thereof.

Referring to FIG. 9H, when a current pixel 971 is immediately adjacent to a boundary of a current block 970 in the current block 970, the video decoding apparatus 100 may determine a weight for pixel to be 3, the pixel being located inside the current block 970 while being adjacent to the boundary of the current block 970. The video decoding apparatus 100 may determine a weight for other pixels 973 to be 1.

Referring to FIG. 9H, when a current pixel 981 is near a boundary of a current block 980 in the current block 980 (when the current pixel 981 is distant from the boundary by one pixel), the video decoding apparatus 100 may determine a weight for pixels 982 to be 0, the pixels being located outside the boundary of the current block 980, and may determine a weight for pixels 983 to be 2, the pixels being immediately adjacent to the boundary of the current block 980. The video decoding apparatus 100 may determine a weight for other pixels 984 to be 1.

As described with reference to FIGS. 9G to 9I, the video decoding apparatus 100 may determine values (s1 to s6 of Equation 33) for determining a horizontal direction displacement vector and a vertical direction displacement vector with respect to each pixel by using a pixel value and a gradient value of pixel located in a reference block, without using a pixel value and a gradient value of a pixel outside the reference block corresponding to a current block, by allocating different weights to pixels in a window, according to locations of a current pixel.

Figure 9J:
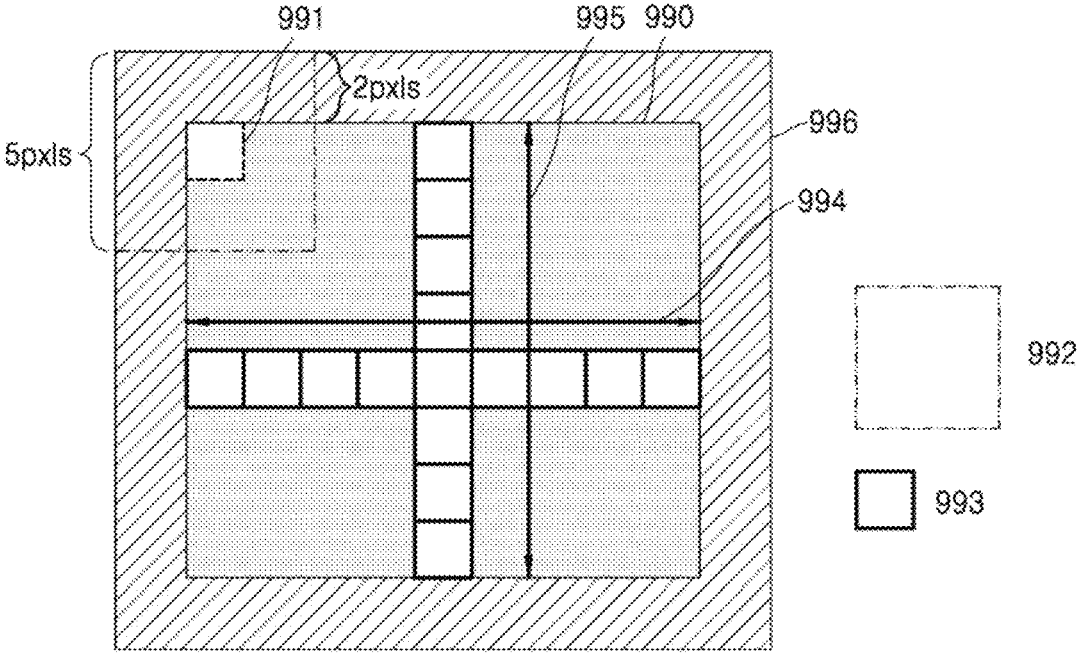
FIG. 9J is a diagram for describing processes of determining a horizontal direction displacement vector and a vertical direction displacement vector with respect to each pixel by applying an exponential smoothing technique in vertical and horizontal directions by referring to a pixel value and a gradient value of a reference block, without enlargement of a block, according to an embodiment.

FIG. 9J is a diagram for describing processes of determining a horizontal direction displacement vector and a vertical direction displacement vector with respect to each pixel by applying an exponential smoothing technique in vertical and horizontal directions by referring to a pixel value and a gradient value of a reference block, without enlargement of a block, according to an embodiment.

Referring to FIG. 9J, the video decoding apparatus 100 may perform a calculation on a function about pixel values (P0(I',j') and P1(I',j')) of a corresponding reference pixel included in a corresponding reference block, a gradient value in a horizontal or vertical direction $$\left( \frac{\partial P0(i', j')}{\partial x}, \frac{\partial P0(i', j')}{\partial y}, \frac{\partial P1(i', j')}{\partial x}, \text{and } \frac{\partial P1(i', j')}{\partial y} \right)$$

the corresponding reference pixel included in a pixel of the corresponding reference block, and a difference ($\tau 0$, $\tau 1$) between POCs of a reference picture and a current picture with respect to each pixel included in a current block 990.

The video decoding apparatus 100 may determine values (s1 to s6; $\sigma_{k(k=1,2,3,4,5,6)}$) for determining a horizontal direction displacement vector and a vertical direction displacement vector with respect to a current pixel by summing a resultant value of a function calculation for the current pixel and a resultant value of a function calculation for a neighboring pixel. That is, the values (s1 to s6) for determining the horizontal direction displacement vector and the vertical direction displacement vector with respect to the current pixel may be expressed as a weighted average of values by calculations with respect to the current pixel and the neighboring pixel according to Equation 41 below. In this regard, coordinates of locations of pixels included in a window $\Omega$ are (i',j'). Also, W[i',j'] may indicate a weight for the pixels included in the window $\Omega$. In this regard, a size of the window $\Omega$ may be (2M+1)×(2M+1) (where, M is an integer). Also, a value of function $A_k[i',j']$ may be a value of a function about pixel values (P0(I',j') and P1(I',j');I[I', j'](0,1)) of a corresponding reference pixel with respect to pixels at a (I',j") location included in the window $\Omega$, a gradient value in a horizontal or vertical direction $$\left( \frac{\partial P0(i', j')}{\partial x}, \frac{\partial P0(i', j')}{\partial y}, \frac{\partial P1(i', j')}{\partial x}, \text{and } \frac{\partial P1(i', j')}{\partial y}; Ix, y[i', j'](0, 1) \right)$$

of the corresponding reference pixel included in a pixel of the corresponding reference block, and the difference ($\tau 0$, $\tau 1$) between POCs of the reference picture and the current picture.

$$\sigma_k = \sum_{i', j' \in \Omega} W[i', j'] A_k[i', j'] = \qquad \text{[Equation 41]}$$

$$\sum_{i-M \le i' \le i+M} \sum_{j-M \le j' \le j+M} W[i', j'] A_k[i', j']$$

For example, the video decoding apparatus 100 may determine values (s1 to s6) for determining a horizontal direction displacement vector and a vertical direction displacement vector with respect to the current pixel by changelessly summing a resultant value of a function calculation for the current pixel and resultant values of function calculations for pixels in a window with respect to the current pixel. When it is assumed that a size of the window is 5×5, it is required to refer to resultant values of calculations about pixels in a window 992 with respect to a pixel 991 so as to determine values required to determine a horizontal direction displacement vector and a vertical direction displacement vector of the pixel 991 located at a boundary of a current block 990, and thus, it is required to refer to resultant values of function calculations with respect to pixels of a block 996 that is enlarged by 2 pixels in horizontal and vertical directions, compared to the current block 990. The value of function $A_k[i',j']$ may be determined as Table 6 below.

TABLE 6

| $\sigma_k[i', j']$ | $A_k[i', j']$ |
|---|---|
| $\sigma_1$ | $(\tau_1 I_x^{(1)}[i', j'] + \tau_0 I_x^{(0)}[i', j'])^2$ |
| $\sigma_2$ | $(\tau_1 I_x^{(1)}[i', j'] + \tau_0 I_x^{(0)}[i', j']) (I^{(1)}[i', j'] - I^{(0)}[i', j'])$ |
| $\sigma_3$ | $(\tau_1 I_x^{(1)}[i', j'] + \tau_0 I_x^{(0)}[i', j']) (\tau_1 I_y^{(1)}[i', j'] + \tau_0 I_y^{(0)}[i', j'])$ |
| $\sigma_5$ | $(\tau_1 I_y^{(1)}[i', j'] + \tau_0 I_y^{(0)}[i', j'])^2$ |
| $\sigma_6$ | $(\tau_1 I_y^{(1)}[i', j'] + \tau_0 I_y^{(0)}[i', j']) (I^{(1)}[i', j'] - I^{(0)}[i', j'])$ |

In this regard, $Ix^{(0)}$ [i',j'] and $Ix^{(1)}$ [i',j'] may be respectively and $$\frac{\partial P0(i', j')}{\partial x} \text{ and } \frac{\partial P1(i', j')}{\partial x},$$

$Iy^{(0)}$ [i',j'] and $Iy^{(1)}$ [i',j'] may be respectively $$\frac{\partial P0(i', j')}{\partial y} \text{ and } \frac{\partial P1(i', j')}{\partial y},$$

and $I^{(0)}$ [i',j'] and $I^{(1)}$ [i',j'] may be respectively P0(I',j') and P1(I',j').

The video decoding apparatus 100 may perform averaging by applying an exponential smoothing technique to $A_k[i',j']$ in vertical and horizontal directions so as to determine a weighted average with respect to $A_k$ [i',j'].

Referring to FIG. 9J, the video decoding apparatus 100 may apply the exponential smoothing technique to $A_k[i',j']$ in the horizontal direction. Hereinafter, processes, performed by the video decoding apparatus 100, of determining a weighted average value with respect to $A_k$ [i',j'] by applying the exponential smoothing technique to $A_k[i',j']$ in the horizontal direction will now be described in detail.

First, contents in which the video decoding apparatus 100 performs averaging in a right direction by applying the exponential smoothing technique will now be described. The video decoding apparatus 100 may perform averaging on $A_k[i',j']$ in the right direction by using Pseudocode 1 as below. In this regard, H may indicate a height of a current block, W may indicate a width of the current block, and Stride may indicate a distance between a line and a next line in a 1D array. That is, two-dimensional (2D) array A[i,j] may be expressed as A[i+j*Stride] of 1D array.

```
for (j = 0; j < H; j++){          [Pseudocode 1]
    A[0] = A[0] * 2;
    for (i = 1; i < W; i++){
        A[i] = A[i-1]/2 + A[i];}
    A += Stride;}
```

For example, when a size of the current block is 4×4, and A[0], A[1], A[2], and A[3] are a, b, c, and d, resultant values A'[0] of a process using Pseudocode 1 may be that 2a, A'[1] may be A[0]/2+b=a+b, A'[2] may be A[1]/2+c=a/2+b/2+c, and A'[3] may be A[2]/2+d=a/4+b/4+c/2+d.

Hereinafter, contents in which the video decoding apparatus 100 performs averaging in a left direction by applying the exponential smoothing technique will now be described. The video decoding apparatus 100 may perform averaging on $A_k[i',j']$ in the left direction by using Pseudocode 2 as below. In this regard, H may indicate a height of a current block, W may indicate a width of the current block, and Stride may indicate a distance between a line and a next line in a 1D array. That is, 2D array A[i,j] may be expressed as A[i+j*Stride] of 1D array.

```
for (j = 0; j < H; j++){          [Pseudocode 2]
    A[W-1] = A[W-1] * 2;
    for (i = W-2; i ≥ 0; i--){
        A[i] = A[i+1]/2 + A[i];}
    A += Stride;}
```

For example, when a size of the current block is 4×4, and A'[0], A'[1], A'[2], and A'[3] that have been averaged in the right direction 2a, a+b, a/2+b/2+c, and a/4+b/4+c/2+d, resultant values of a process using Pseudocode 2 may be that A[3] may be 2*A'[3]=a/2+b/2+c+2d, A[2] may be A'[2]+A[3]/2=a/2+b/2+c+a/4+b/4+c/2+d=3a/4+3b/4+3c/2+d, A[1] may be A'[1]+A[2]/2 . . . , and A[0] may be A'[0]+A[1]/2.

Hereinafter, contents in which the video decoding apparatus 100 performs averaging in a down direction by applying the exponential smoothing technique will now be described. The video decoding apparatus 100 may perform averaging on $A_k[i',j']$ in the down direction by using Pseudocode 3 as below. In this regard, H may indicate a height of a current block, W may indicate a width of the current block, and Stride may indicate a distance between a line and a next line in a 1D array. That is, 2D array A[i,j] may be expressed as A[i+j*Stride] of 1D array.

```
for (i = 0; i < W; i++){          [Pseudocode 3]
    A[0] = A[0] * 2;
    for (j = 1; j < H; j++){
        A[i + j*Stride] = A[i+j*Stride-Stride]/2 + A[i + j*Stride];}
}
```

Hereinafter, contents in which the video decoding apparatus 100 performs averaging in an up direction by applying the exponential smoothing technique will now be described. The video decoding apparatus 100 may perform averaging on $A_k[i',j']$ in the up direction by using Pseudocode 4 as below. In this regard, H may indicate a height of a current block, W may indicate a width of the current block, and Stride may indicate a distance between a line and a next line in a 1D array. That is, 2D array A[i,j] may be expressed as A[i+j*Stride] of 1D array.

$$\text{for } (i = 0; i < W; i++) \{ \qquad\qquad \text{[Pseudocode 4]}$$

$$A[i + (H - 1) * \text{Stride}] = A[i + (H - 1) * \text{Stride}] * 2;$$

$$\text{for } (j = H - 2; j \ge 0; j--) \{$$

$$A[i + j * \text{Stride}] = \frac{A[i + j * \text{Stride} + \text{Stride}]}{2} + A[i + j * \text{Stride}]; \}$$

That is, the video decoding apparatus 100 may perform averaging on $A_k[i',j']$ in the vertical and horizontal directions by using the exponential smoothing technique, and a resultant value of each pixel which is determined by performing the averaging may become $\sigma_k[i,j]$ that is a value required to determine a horizontal direction displacement vector or a vertical direction displacement vector with respect to each pixel. In this regard, when the averaging is performed by using the exponential smoothing technique, a current pixel has a largest weight with respect to a location of the current pixel, and as a pixel becomes distant from the current pixel, a weight with respect to the pixel is exponentially decreased.

Therefore, the video decoding apparatus 100 may determine $\sigma_k[i,j]$ that is a weighted average required to determine a horizontal direction displacement vector or a vertical direction displacement vector with respect to each pixel, by performing the averaging on the current block 990 in the vertical and horizontal directions by using the exponential smoothing technique. That is, the video decoding apparatus 100 may determine a horizontal direction displacement vector or a vertical direction displacement vector with respect to each pixel by referring to only a pixel value and a gradient value of a reference block corresponding to the current block 990, without referring to a pixel value and a gradient value of a reference block corresponding to a block 996 enlarged from the current block 990.

Figure 9K:
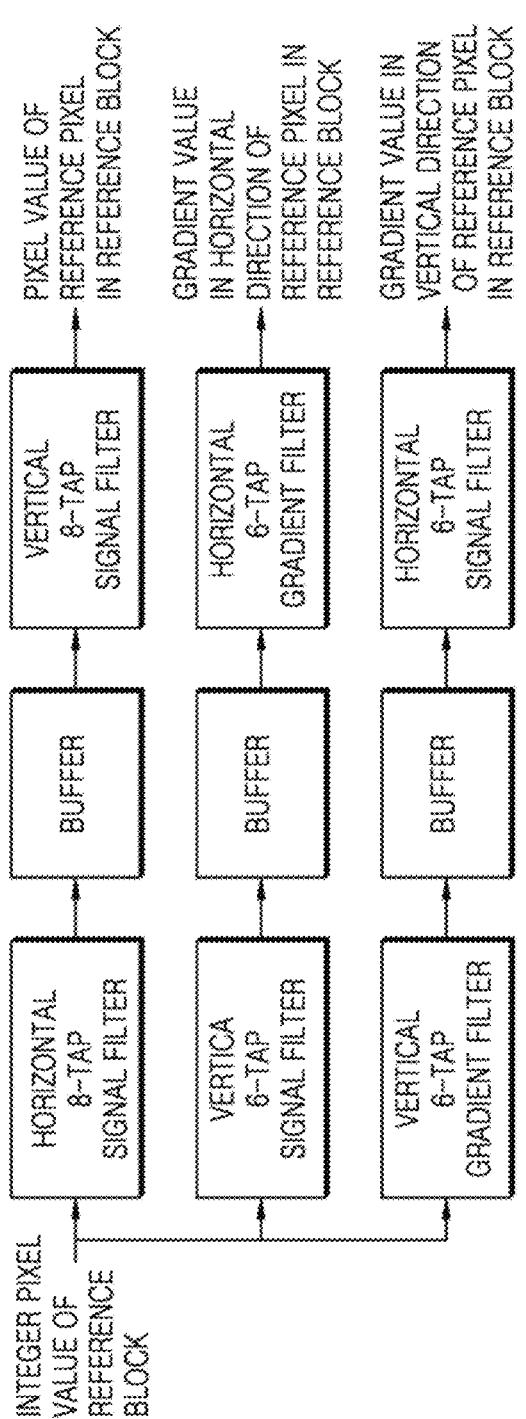
FIG. 9K is a diagram for describing processes of determining a pixel value and gradient values in horizontal and vertical directions of a reference pixel in a reference block by using a filter so as to perform motion compensation on a current block, according to an embodiment.
Figure 9L:
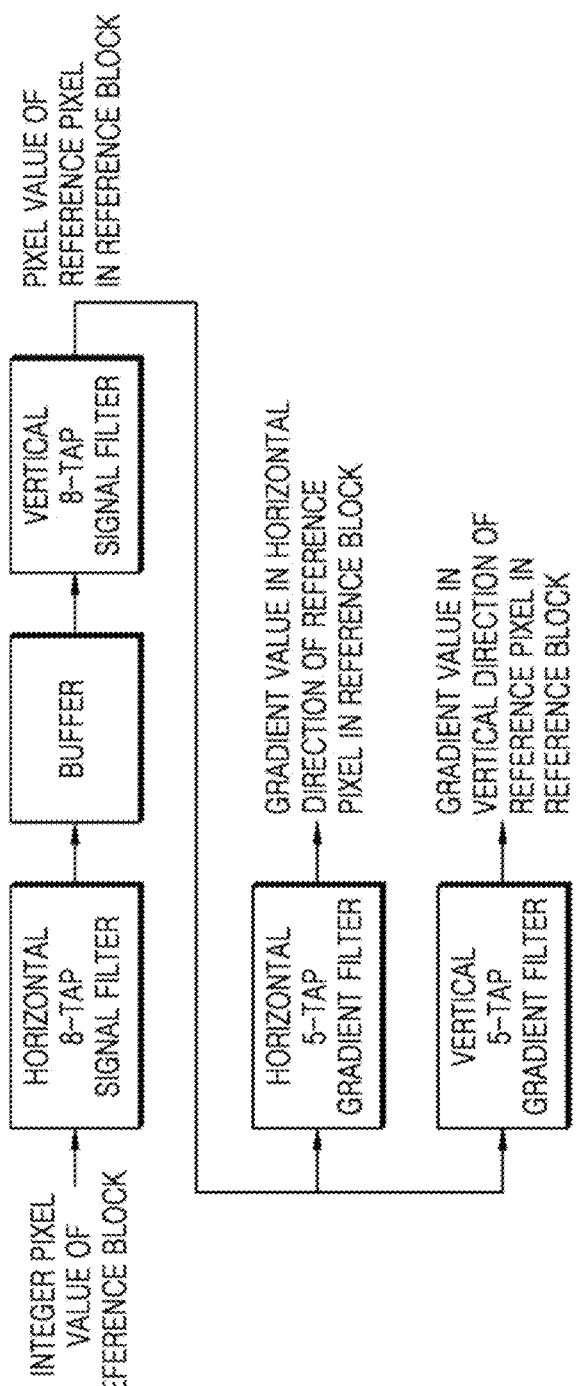
FIG. 9L is a diagram for describing processes of determining a pixel value and gradient values in horizontal and vertical directions of a reference pixel in a reference block by using a filter so as to perform motion compensation on a current block, according to another embodiment.

FIG. 9K is a diagram for describing processes of determining a pixel value and gradient values in horizontal and vertical directions of a reference pixel in a reference block by using a filter so as to perform motion compensation on a current block, according to an embodiment.

Referring to FIG. 9K, the video decoding apparatus 100 may perform pixel-unit and block-unit motion compensations on the current block by using a pixel value and gradient values of a reference pixel in a reference block corresponding to the current block. Therefore, to perform the pixel-unit and block-unit motion compensations on the current block, the pixel value and the gradient values of the reference pixel in the reference block corresponding to the current block have to be determined. In this regard, a unit of the pixel value and the gradient values of the reference pixel in the reference block may be a fractional pixel unit. For example, the unit of the pixel value and the gradient values of the reference pixel in the reference block may be a $\frac{1}{16}$ pel unit.

The video decoding apparatus 100 may perform filtering on a pixel value of an integer pixel in the reference block so as to determine the pixel value and the gradient values in fractional pixel units of the reference pixel in the reference block.

First, the video decoding apparatus 100 may determine the pixel value of the reference pixel in the reference block by applying a horizontal 8-tap signal filter (also referred to as an interpolation filter) and a vertical 8-tap signal filter to the pixel value of the integer pixel in the reference block.

The video decoding apparatus 100 may determine a pixel value of the reference pixel, which has a location component in a fractional pixel unit in a horizontal direction, by performing filtering by applying the horizontal direction 8-tap signal filter to a pixel value of the integer pixel in the reference block, and may store the determined pixel value in a buffer. The video decoding apparatus 100 may determine a pixel value of the reference pixel, which has a location component in a fractional pixel unit in a vertical direction, by applying the vertical direction 8-tap signal filter to a pixel value of the reference pixel which has a location component in an integer unit in the vertical direction.

The video decoding apparatus 100 may determine a gradient value in the horizontal direction of the reference pixel in the reference block by performing filtering by first applying a vertical direction 6-tap signal filter to the pixel value of the integer pixel in the reference block and then applying a horizontal direction 6-tap gradient filter thereto.

That is, the video decoding apparatus 100 may determine the pixel value of the reference pixel, which has the location component in the fractional pixel unit in the vertical direction, by performing filtering by applying the vertical direction 6-tap signal filter to the pixel value of the integer pixel in the reference block, and may store the determined pixel value in the buffer.

The video decoding apparatus 100 may determine the gradient value in the horizontal direction of the reference pixel, which has the location component in the fractional pixel unit in the horizontal direction, by applying the horizontal direction 6-tap gradient filter to a pixel value of the reference pixel which has a location component in an integer unit in the horizontal direction.

The video decoding apparatus 100 may determine a gradient value in the horizontal direction of the reference pixel in the reference block by performing filtering by first applying a vertical direction 6-tap signal filter to the pixel value of the integer pixel in the reference block and then applying a horizontal direction 6-tap gradient filter thereto.

That is, the video decoding apparatus 100 may determine the gradient value of the reference pixel, which has the location component in the fractional pixel unit in the vertical direction, by performing filtering by applying the vertical direction 6-tap signal filter to the pixel value of the integer pixel in the reference block, and may store the determined gradient value in the buffer.

The video decoding apparatus 100 may determine the gradient value in the vertical direction of the reference pixel, which has the location component in the fractional pixel unit in the horizontal direction, by applying the horizontal direction 6-tap gradient filter to a gradient value in the vertical direction of the reference pixel which has the location component in the integer unit in the horizontal direction.

That is, the video decoding apparatus 100 may apply two 1D filters to respectively determine the pixel value of the reference pixel in the reference block, the gradient value in the horizontal direction of the reference pixel in the reference block, and the gradient value in the vertical direction of the reference pixel in the reference block, and in this regard, a multiplication operation may be performed on a coefficient of each filter and a value about a corresponding pixel. For example, to determine the gradient value in the horizontal direction of the reference pixel in the reference block, the 6-tap signal filter and the 6-tap gradient filter may be used, and 12 multiplication operations may be performed on each pixel. Also, to determine the gradient value in the vertical direction of the reference pixel in the reference block, the 6-tap signal filter and the 6-tap gradient filter may be used, and 12 multiplication operations may be performed on each pixel.

FIG. 9I is a diagram for describing processes of determining a pixel value and gradient values in horizontal and vertical directions of a reference pixel in a reference block by using a filter so as to perform motion compensation on a current block, according to another embodiment.

Referring to FIG. 9I, the video decoding apparatus 100 may perform pixel-unit and block-unit motion compensations on the current block by using a pixel value and gradient values of a reference pixel in a reference block corresponding to the current block. Therefore, to perform the pixel-unit and block-unit motion compensations on the current block, the pixel value and the gradient values of the reference pixel in the reference block corresponding to the current block have to be determined. In this regard, a unit of the pixel value and the gradient values of the reference pixel in the reference block may be a fractional pixel unit. For example, the unit of the pixel value and the gradient values of the reference pixel in the reference block may be a $\frac{1}{16}$ pel unit.

The video decoding apparatus 100 may perform filtering on a pixel value of an integer pixel in the reference block so as to determine the pixel value and the gradient values in fractional pixel units of the reference pixel in the reference block.

Unlike to the descriptions about FIG. 9K, the video decoding apparatus 100 may determine a gradient value in the horizontal direction of the reference pixel in the reference block by first applying a horizontal 8-tap signal filter and a vertical 8-tap signal filter to the pixel value of the integer pixel in the reference block and then applying a horizontal 5-tap gradient filter to the pixel value of the reference pixel in the reference block. Also, the video decoding apparatus 100 may determine a gradient value in the vertical direction of the reference pixel in the reference block by applying a vertical 5-tap gradient filter to the pixel value of the reference pixel in the reference block.

The video decoding apparatus 100 may determine the gradient value in the horizontal direction or the vertical direction of the reference pixel in the reference block by determining a pixel value of the reference pixel, which has a location of a fractional pixel unit, by applying two 1D signal (interpolation) filters, and then by parallel applying two 1D gradient filters to the pixel value of the reference pixel at the location of the fractional pixel unit.

The video decoding apparatus may determine a gradient value Ix(k) in the horizontal direction of the reference pixel in the reference block by applying the horizontal direction 5-tap gradient filter (filter coefficients are {9, −48, 0, 48, 9}; but the filter coefficients are not limited thereto) to the pixel value of the reference pixel according to Equation 42 below. In this regard, k may have a value of one of 0 and 1 that respectively indicate reference pictures 0 and 1. I(k)[i,j] may be a pixel value at a (i,j) location of the reference pixel in the reference block. i may indicate a location component in the horizontal direction of a pixel and j may indicate a location component in the vertical direction of the pixel, in which a unit thereof is a fractional pixel unit.

$$Ix^{(k)}[i,j] = -9*\left(I^{(k)}[i+2,j] - I^{(k)}[i-2,j]\right) + \qquad \text{[Equation 42]}$$
$$48*\left(I^{(k)}[i+1,j] - I^{(k)}[i-1,j]\right)$$

Therefore, the video decoding apparatus 100 may determine the gradient value Ix(k) in the horizontal direction of the reference pixel in the reference block by performing only two multiplication operations on each sample.

Also, the video decoding apparatus 100 may determine the gradient value Iy(k) in the vertical direction of the reference pixel in the reference block by applying a vertical direction 5-tap gradient filter (where filter coefficients are {9, −48, 0, 48, 9}; but are not limited thereto) to the pixel value of the reference pixel. In this regard, k may have a value of one of 0 and 1 that respectively indicate reference pictures 0 and 1. I(k)[i,j] may be a pixel value at a (i,j) location of the reference pixel in the reference block. i may indicate a location component in the horizontal direction of a pixel and j may indicate a location component in the vertical direction of the pixel, in which a unit thereof is a fractional pixel unit.

$$Iy^{(k)}[i,j] = -9*\left(I^{(k)}[i,j+2] - I^{(k)}[i,j-2]\right) + \qquad \text{[Equation 43]}$$
$$48*\left(I^{(k)}[i,j+1] - I^{(k)}[i,j-1]\right)$$

Therefore, the video decoding apparatus 100 may determine the gradient value Iy(k) in the vertical direction of the reference pixel in the reference block by performing only two multiplication operations on each sample.

When the video decoding apparatus 100 performs pixel-unit motion compensation with block enlargement by a window size, and performs the pixel-unit motion compensation by decreasing a length of a gradient filter, the video decoding apparatus 100 may perform memory access operations and multiplication operations as much as the number of memory accesses the number of multiplication operations of each case according to Table 7 below. In this regard, it is assumed that a length T of a signal filter is 8, a length T of the gradient filter is 6, a length T of a decreased gradient filter is 5, a size of a block is N×N, and a window size of each pixel 2M+1 is 5.

TABLE 7

| | pixel-unit motion compensation along with block enlargement | decrease in length of gradient filter |
|---|---|---|
| number of memory accesses | 2 × (N + 4 + 7) × (N + 4 + 7) | 2 × (N + 4 + 7) × (N + 4 + 7) |
| number of multiplication operations | 2*8*{(N + 4 + 7) × (N + 4) + (N + 4) × (N + 4)} 2*6*{(N + 4 + 5) × (N + 4) + (N + 4) × (N + 4)} 2*6*{(N + 4 + 5) × (N + 4) + (N + 4) × (N + 4)} | 2*8*{(N + 4 + 7) × (N + 4) + (N + 4) × (N + 4)} 2*2*{(N + 4) × (N + 4)} 2*2*{(N + 4) × (N + 4)} |

That is, because the video decoding apparatus 100 performs two multiplication operations with respect to each 1D gradient filter according to Equations 41 and 42, the gradient filter is applied to two reference blocks, and the gradient filter is applied to a reference block of (N+4)×(N+4) size that is enlarged based on a window size, a total of 2*2*{(N+4)×

(N+4)}*2 times of multiplication operations may be performed so as to determine gradient values of the reference pixel in the horizontal and vertical directions.

When the video decoding apparatus 100 performs pixel-unit motion compensation with block enlargement by a window size, and performs pixel group unit motion compensation by decreasing a length of a gradient filter, without the block enlargement, the video decoding apparatus 100 may perform memory access operations and multiplication operations as much as the number of memory accesses the number of multiplication operations of each case according to Table 8 below. In this regard, it is assumed that a length T of a signal filter is 8, a length T of the gradient filter is 6, a length T of a decreased gradient filter is 5, a size of a pixel group is L×L, a size of a block is N×N, and a window size of each pixel 2M+1 is 5.

TABLE 8

| | pixel-unit motion compensation along with block enlargement | pixel group unit motion compensation along with block enlargement with decrease in length of gradient filter |
|---|---|---|
| number of memory accesses | 2 × (N + 4 + 7) × (N + 4 + 7) | 2 × (N + 7) × (N + 7) |
| number of multiplication operations | 2*8*{(N + 4 + 7) × (N + 4) + (N + 4) × (N + 4)} <br> 2*6*{(N + 4 + 5) × (N + 4) + (N + 4) × (N + 4)} <br> 2*6*{(N + 4 + 5) × (N + 4) + (N + 4) × (N + 4)} | 2*8*{(N + 7) × N + N × N} <br> 2*2*{N × N} <br> 2*2*{N × N} |
| number of division operations | 2N*N | 2*N*N/L^2 |

Therefore, the number of memory accesses, the number of multiplication operations, and the number of division operations of a case where the video decoding apparatus 100 performs the pixel group unit motion compensation by decreasing a length of the gradient filter, without the block enlargement, may be significantly decreased compared to the number of memory accesses, the number of multiplication operations, and the number of division operations of a case where the pixel-unit motion compensation is performed with the block enlargement.

Hereinafter, a method of determining a data unit that may be used while the video decoding apparatus 100 according to an embodiment decodes an image will be described with reference to FIGS. 10 through 23. Operations of the video encoding apparatus 150 may be similar to or the reverse of various embodiments of operations of the video decoding apparatus 100 described below.

Figure 10:
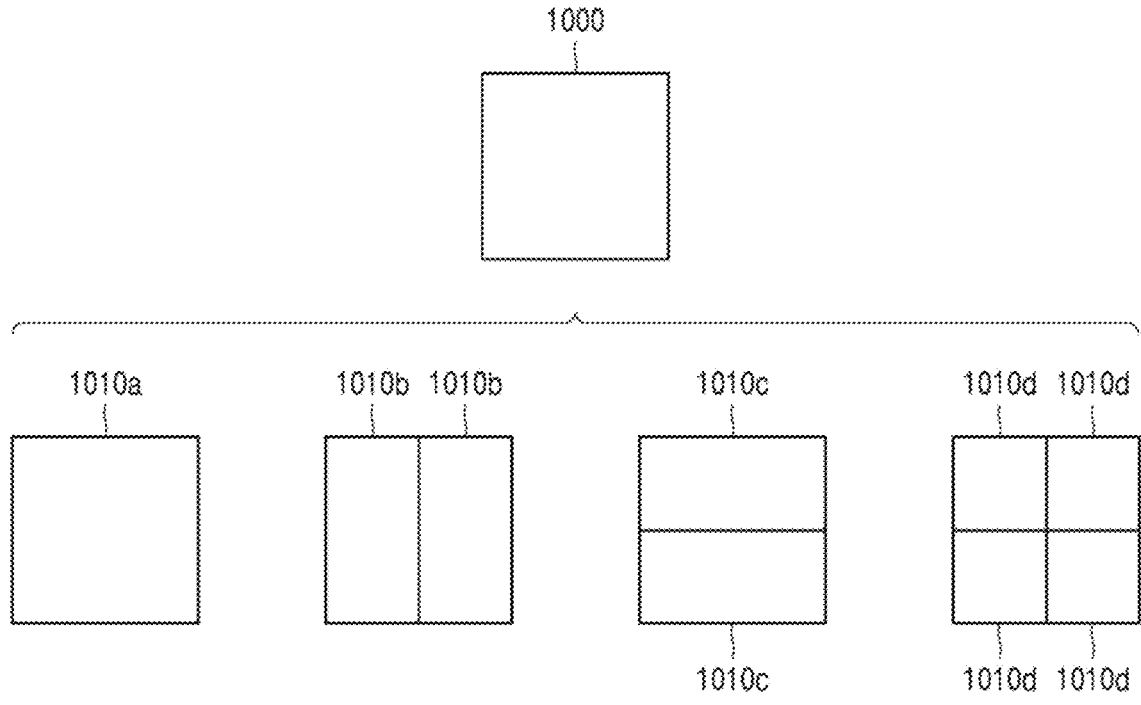
FIG. 10 illustrates a process of determining at least one coding unit by splitting a current coding unit, according to an embodiment.

FIG. 10 illustrates a process, performed by the video decoding apparatus 100, of determining at least one coding unit by splitting a current coding unit, according to an embodiment.

According to an embodiment, the video decoding apparatus 100 may determine a shape of a coding unit by using block shape information, and may determine a splitting method of the coding unit by using split shape information. That is, a coding unit splitting method indicated by the split shape information may be determined based on a block shape indicated by the block shape information used by the video decoding apparatus 100.

According to an embodiment, the video decoding apparatus 100 may use the block shape information indicating that the current coding unit has a square shape. For example, the video decoding apparatus 100 may determine whether not to split a square coding unit, whether to vertically split the square coding unit, whether to horizontally split the square coding unit, or whether to split the square coding unit into four coding units, based on the split shape information. Referring to FIG. 10, when the block shape information of a current coding unit 1000 indicates a square shape, a video decoder 100 may determine that a coding unit 1010a having the same size as the current coding unit 1000 is not split, based on the split shape information indicating not to perform splitting, or may determine coding units 1010b, 1010c, or 1010d split based on the split shape information indicating a predetermined splitting method.

Referring to FIG. 10, according to an embodiment, the video decoding apparatus 100 may determine two coding units 1010b obtained by splitting the current coding unit 1000 in a vertical direction, based on the split shape information indicating to perform splitting in a vertical direction. The video decoding apparatus 100 may determine two coding units 1010c obtained by splitting the current coding unit 1000 in a horizontal direction, based on the split shape information indicating to perform splitting in a horizontal direction. The video decoding apparatus 100 may determine four coding units 1010d obtained by splitting the current coding unit 1000 in vertical and horizontal directions, based on the split shape information indicating to perform splitting in vertical and horizontal directions. However, splitting methods of the square coding unit are not limited to the above-described methods, and the split shape information may indicate various methods. Predetermined splitting methods of splitting the square coding unit will be described in detail below in relation to various embodiments.

Figure 11:
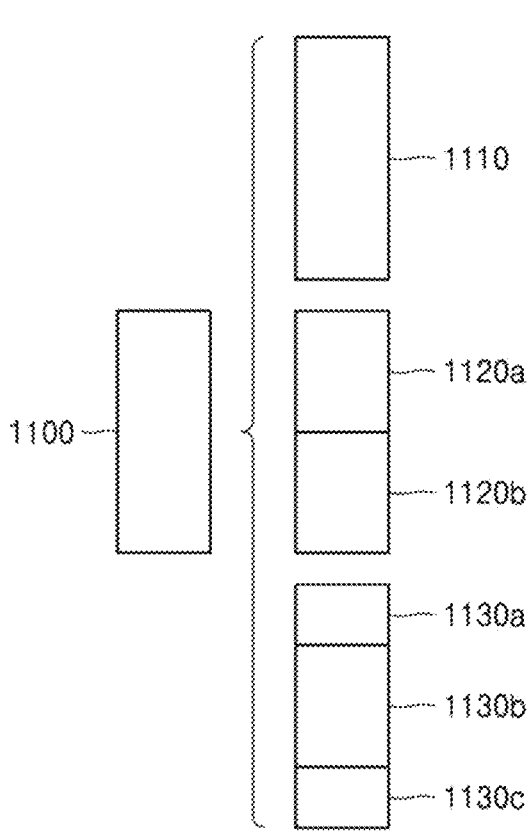
FIG. 11 illustrates a process of determining at least one coding unit by splitting a non-square coding unit, according to an embodiment.
Figure 11:
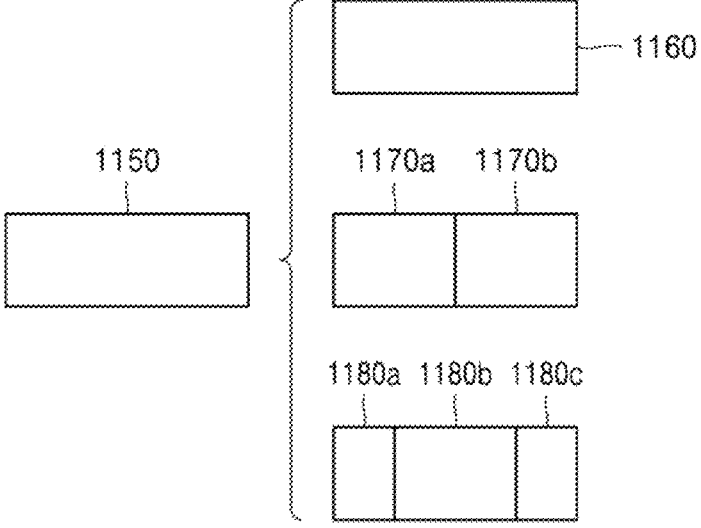

FIG. 11 illustrates a process, performed by the video decoding apparatus 100, of determining at least one coding unit by splitting a non-square coding unit, according to an embodiment.

According to an embodiment, the video decoding apparatus 100 may use block shape information indicating that a current coding unit has a non-square shape. The video decoding apparatus 100 may determine whether not to split the non-square current coding unit or whether to split the non-square current coding unit by using a predetermined splitting method, based on split shape information. Referring to FIG. 11, when the block shape information of a current coding unit 1100 or 1150 indicates a non-square shape, the video decoding apparatus 100 may determine that a coding unit 1110 or 1160 having the same size as the current coding unit 1100 or 1150 is not split, based on the split shape information indicating not to perform splitting, or determine coding units 1120a and 1120b, 1130a to 1130c, 1170a and 1170b, or 1180a to 1180c split based on the split shape information indicating a predetermined splitting method. Predetermined splitting methods of splitting a non-square coding unit will be described in detail below in relation to various embodiments.

According to an embodiment, the video decoding apparatus 100 may determine a splitting method of a coding unit by using the split shape information and, in this case, the split shape information may indicate the number of one or more coding units generated by splitting a coding unit. Referring to FIG. 11, when the split shape information indicates to split the current coding unit 1100 or 1150 into two coding units, the video decoding apparatus 100 may determine two coding units 1120a and 1120b, or 1170a and 1170b included in the current coding unit 1100 or 1150, by splitting the current coding unit 1100 or 1150 based on the split shape information.

According to an embodiment, when the video decoding apparatus 100 splits the non-square current coding unit 1100 or 1150 based on the split shape information, the location of a long side of the non-square current coding unit 1100 or 1150 may be considered. For example, the video decoding apparatus 100 may determine a plurality of coding units by dividing a long side of the current coding unit 1100 or 1150, in consideration of the shape of the current coding unit 1100 or 1150.

According to an embodiment, when the split shape information indicates to split a coding unit into an odd number of blocks, the video decoding apparatus 100 may determine an odd number of coding units included in the current coding unit 1100 or 1150. For example, when the split shape information indicates to split the current coding unit 1100 or 1150 into three coding units, the video decoding apparatus 100 may split the current coding unit 1100 or 1150 into three coding units 1130a, 1130b, and 1130c, or 1180a, 1180b, and 1180c. According to an embodiment, the video decoding apparatus 100 may determine an odd number of coding units included in the current coding unit 1100 or 1150, and not all the determined coding units may have the same size. For example, a predetermined coding unit 1130b or 1180b from among the determined odd number of coding units 1130a, 1130b, and 1130c, or 1180a, 1180b, and 1180c may have a size different from the size of the other coding units 1130a and 1130c, or 1180a and 1180c. That is, coding units which may be determined by splitting the current coding unit 1100 or 1150 may have multiple sizes and, in some cases, all of the odd number of coding units 1130a, 1130b, and 1130c, or 1180a, 1180b, and 1180c may have different sizes.

According to an embodiment, when the split shape information indicates to split a coding unit into an odd number of blocks, the video decoding apparatus 100 may determine an odd number of coding units included in the current coding unit 1100 or 1150, and may put a predetermined restriction on at least one coding unit from among the odd number of coding units generated by splitting the current coding unit 1100 or 1150. Referring to FIG. 11, the video decoding apparatus 100 may allow a decoding method of the coding unit 1130b or 1180b to be different from that of the other coding units 1130a and 1130c, or 1180a and 1180c, wherein the coding unit 1130b or 1180b is at a center location from among the three coding units 1130a, 1130b, and 1130c, or 1180a, 1180b, and 1180c generated by splitting the current coding unit 1100 or 1150. For example, the video decoding apparatus 100 may restrict the coding unit 1130b or 1180b at the center location to be no longer split or to be split only a predetermined number of times, unlike the other coding units 1130a and 1130c, or 1180a and 1180c.

Figure 12:
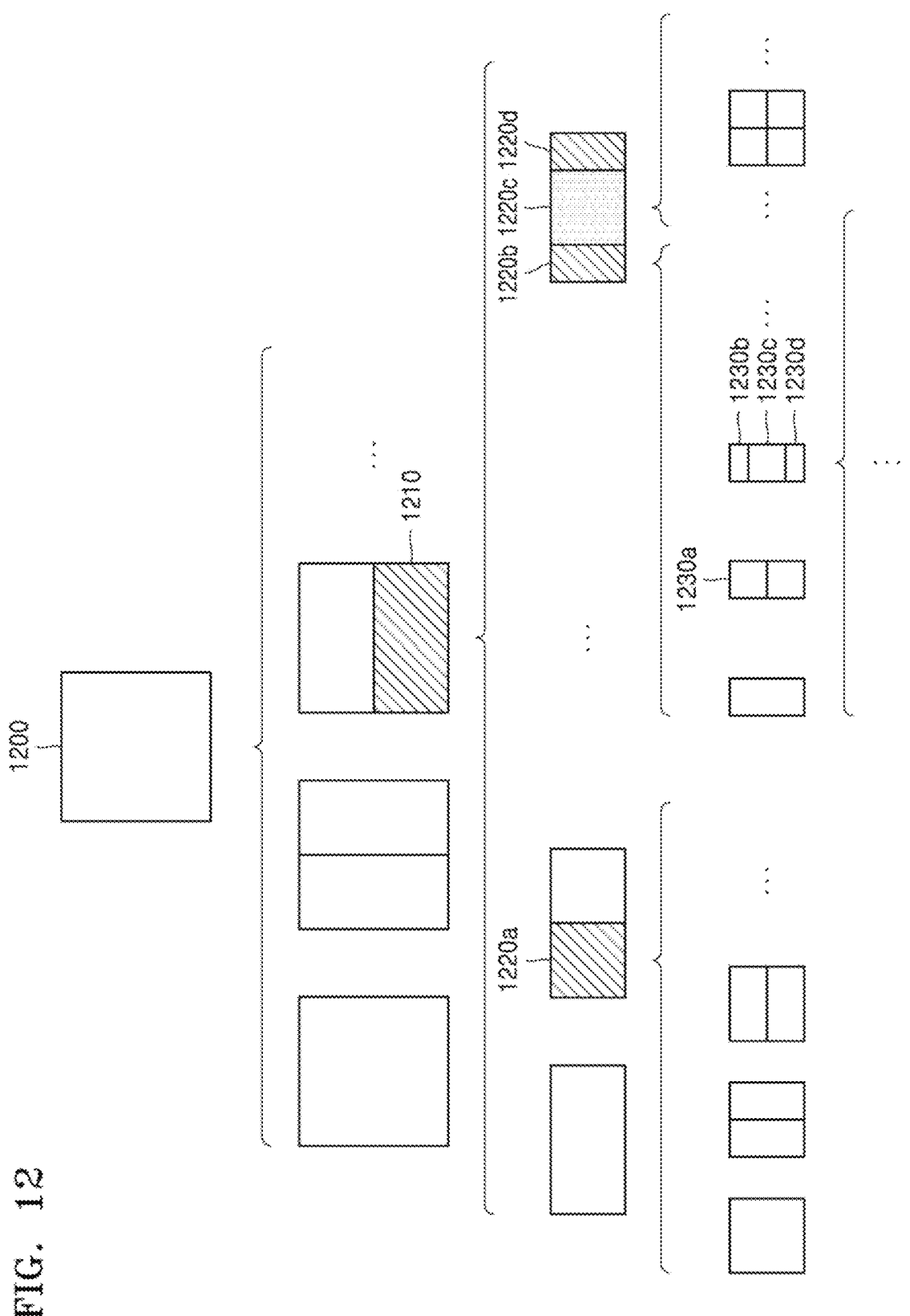
FIG. 12 illustrates a process of splitting a coding unit based on at least one of block shape information and split shape information, according to an embodiment.

FIG. 12 illustrates a process, performed by the video decoding apparatus 100, of splitting a coding unit based on at least one of block shape information and split shape information, according to an embodiment.

According to an embodiment, the video decoding apparatus 100 may determine to split or not to split a square first coding unit 1200 into coding units, based on at least one of the block shape information and the split shape information. According to an embodiment, when the split shape information indicates to split the first coding unit 1200 in a horizontal direction, the video decoding apparatus 100 may determine a second coding unit 1210 by splitting the first coding unit 1200 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that the structure of the first coding unit, the second coding unit, and the third coding unit follows the above descriptions.

According to an embodiment, the video decoding apparatus 100 may determine to split or not to split the determined second coding unit 1210 into coding units, based on at least one of the block shape information and the split shape information. Referring to FIG. 12, the video decoding apparatus 100 may or may not split the non-square second coding unit 1210, which is determined by splitting the first coding unit 1200, into one or more third coding units 1220a, or 1220b, 1220c, and 1220d based on at least one of the block shape information and the split shape information. The video decoding apparatus 100 may obtain at least one of the block shape information and the split shape information, and determine a plurality of various-shaped second coding units (e.g., 1210) by splitting the first coding unit 1200, based on the obtained at least one of the block shape information and the split shape information, and the second coding unit 1210 may be split by using the splitting method of the first coding unit 1200, based on at least one of the block shape information and the split shape information. According to an embodiment, when the first coding unit 1200 is split into the second coding units 1210 based on at least one of the block shape information and the split shape information of the first coding unit 1200, the second coding unit 1210 may also be split into the third coding units 1220a, or 1220b, 1220c, and 1220d based on at least one of the block shape information and the split shape information of the second coding unit 1210. That is, a coding unit may be recursively split based on at least one of the block shape information and the split shape information of each coding unit. Therefore, a square coding unit may be determined by splitting a non-square coding unit, and a non-square coding unit may be determined by recursively splitting the square coding unit. Referring to FIG. 12, a predetermined coding unit from among an odd number of third coding units 1220b, 1220c, and 1220d determined by splitting the non-square second coding unit 1210 (e.g., a coding unit at a center location or a square coding unit) may be recursively split. According to an embodiment, the square third coding unit 1220c from among the odd number of third coding units 1220b, 1220c, and 1220d may be split in a horizontal direction into a plurality of fourth coding units. A non-square fourth coding unit 1240 from among the plurality of fourth coding units may be split into a plurality of coding units. For example, the non-square fourth coding unit 1240 may be split into an odd number of coding units 1250a, 1250b, and 1250c.

A method that may be used to recursively split a coding unit will be described below in relation to various embodiments.

According to an embodiment, the video decoding apparatus 100 may determine to split each of the third coding units 1220a, or 1220b, 1220c, and 1220d into coding units or not to split the second coding unit 1210, based on at least one of the block shape information and the split shape information. According to an embodiment, the video decoding apparatus 100 may split the non-square second coding unit 1210 into the odd number of third coding units 1220b, 1220c, and 1220d. The video decoding apparatus 100 may put a predetermined restriction on a predetermined third coding unit from among the odd number of third coding units 1220b, 1220c, and 1220d. For example, the video decoding apparatus 100 may restrict the third coding unit 1220c at a center location from among the odd number of third coding units 1220b, 1220c, and 1220d to be no longer split or to be split a settable number of times. Referring to FIG. 12, the video decoding apparatus 100 may restrict the third coding unit 1220*c*, which is at the center location from among the odd number of third coding units 1220*b*, 1220*c*, and 1220*d* included in the non-square second coding unit 1210, to be no longer split, to be split by using a predetermined splitting method (e.g., split into only four coding units or split by using a splitting method of the second coding unit 1210), or to be split only a predetermined number of times (e.g., split only n times (where n>0)). However, the restrictions on the third coding unit 1220*c* at the center location are not limited to the above-described examples, and may include various restrictions for decoding the third coding unit 1220*c* at the center location differently from the other third coding units 1220*b* and 1220*d*.

According to an embodiment, the video decoding apparatus 100 may obtain at least one of the block shape information and the split shape information, which is used to split a current coding unit, from a predetermined location in the current coding unit.

Figure 13:
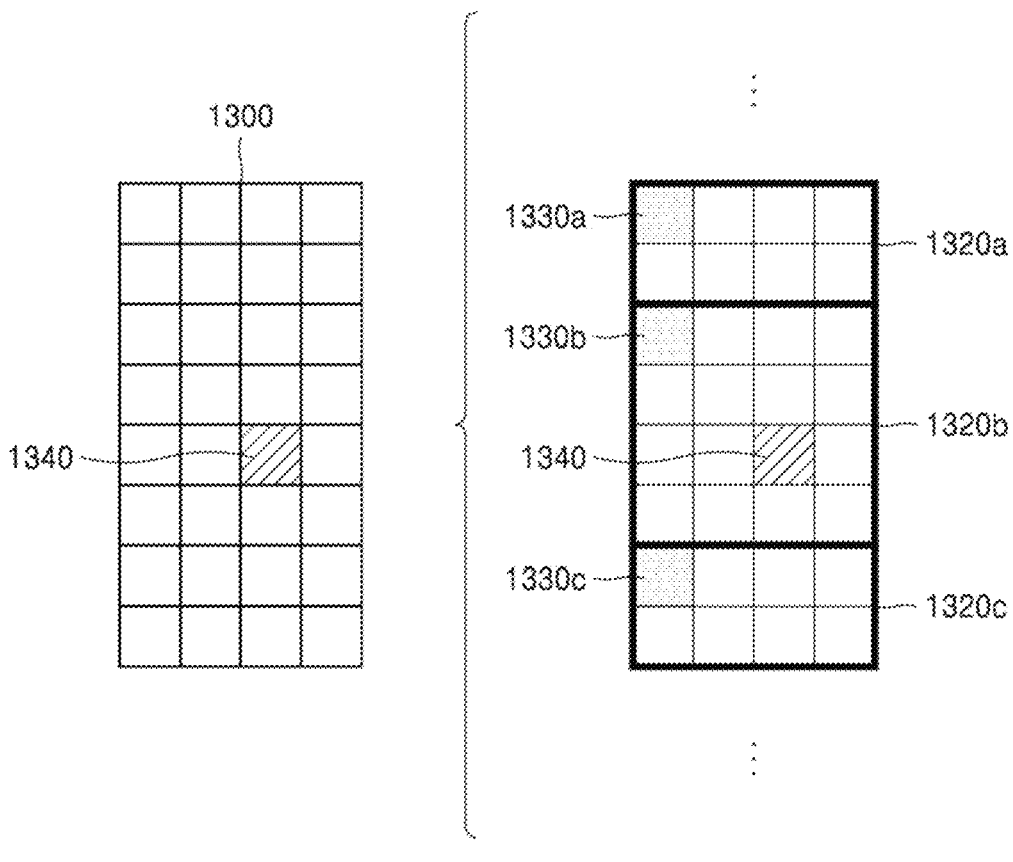
FIG. 13 illustrates a method of determining a predetermined coding unit from among an odd number of coding units, according to an embodiment.

FIG. 13 illustrates a method, performed by the video decoding apparatus 100, of determining a predetermined coding unit from among an odd number of coding units, according to an embodiment. Referring to FIG. 13, at least one of block shape information and split shape information of a current coding unit 1300 may be obtained from a sample of a predetermined location from among a plurality of samples included in the current coding unit 1300 (e.g., a sample 1340 of a center location). However, the predetermined location in the current coding unit 1300, from which at least one of the block shape information and the split shape information may be obtained, is not limited to the center location in FIG. 13, and may include various locations included in the current coding unit 1300 (e.g., top, bottom, left, right, top left, bottom left, top right, and bottom right locations). The video decoding apparatus 100 may obtain at least one of the block shape information and the split shape information from the predetermined location and determine to split or not to split the current coding unit into various-shaped and various-sized coding units.

According to an embodiment, when the current coding unit is split into a predetermined number of coding units, the video decoding apparatus 100 may select one of the coding units. Various methods may be used to select one of a plurality of coding units, as will be described below in relation to various embodiments.

According to an embodiment, the video decoding apparatus 100 may split the current coding unit into a plurality of coding units, and may determine a coding unit at a predetermined location.

FIG. 13 illustrates a method, performed by the video decoding apparatus 100, of determining a coding unit of a predetermined location from among an odd number of coding units, according to an embodiment.

According to an embodiment, the video decoding apparatus 100 may use information indicating locations of the odd number of coding units, to determine a coding unit at a center location from among the odd number of coding units. Referring to FIG. 13, the video decoding apparatus 100 may determine an odd number of coding units 1320*a*, 1320*b*, and 1320*c* by splitting the current coding unit 1300. The video decoding apparatus 100 may determine a coding unit 1320*b* at a center location by using information about locations of the odd number of coding units 1320*a* to 1320*c*. For example, the video decoding apparatus 100 may determine the coding unit 1320*b* of the center location by determining the locations of the coding units 1320*a*, 1320*b*, and 1320*c* based on information indicating locations of predetermined samples included in the coding units 1320*a*, 1320*b*, and 1320*c*. In detail, the video decoding apparatus 100 may determine the coding unit 1320*b* at the center location by determining the locations of the coding units 1320*a*, 1320*b*, and 1320*c* based on information indicating locations of top left samples 1330*a*, 1330*b*, and 1330*c* of the coding units 1320*a*, 1320*b*, and 1320*c*.

According to an embodiment, the information indicating the locations of the top left samples 1330*a*, 1330*b*, and 1330*c*, which are included in the coding units 1320*a*, 1320*b*, and 1320*c*, respectively, may include information about locations or coordinates of the coding units 1320*a*, 1320*b*, and 1320*c* in a picture. According to an embodiment, the information indicating the locations of the top left samples 1330*a*, 1330*b*, and 1330*c*, which are included in the coding units 1320*a*, 1320*b*, and 1320*c*, respectively, may include information indicating widths or heights of the coding units 1320*a*, 1320*b*, and 1320*c* included in the current coding unit 1300, and the widths or heights may correspond to information indicating differences between the coordinates of the coding units 1320*a*, 1320*b*, and 1320*c* in the picture. That is, the video decoding apparatus 100 may determine the coding unit 1320*b* at the center location by directly using the information about the locations or coordinates of the coding units 1320*a*, 1320*b*, and 1320*c* in the picture, or by using the information about the widths or heights of the coding units, which correspond to the difference values between the coordinates.

According to an embodiment, information indicating the location of the top left sample 1330*a* of the upper coding unit 1320*a* may include coordinates (xa, ya), information indicating the location of the top left sample 1330*b* of the middle coding unit 1320*b* may include coordinates (xb, yb), and information indicating the location of the top left sample 1330*c* of the lower coding unit 1320*c* may include coordinates (xc, yc). The video decoding apparatus 100 may determine the middle coding unit 1320*b* by using the coordinates of the top left samples 1330*a*, 1330*b*, and 1330*c* which are included in the coding units 1320*a*, 1320*b*, and 1320*c*, respectively. For example, when the coordinates of the top left samples 1330*a*, 1330*b*, and 1330*c* are sorted in an ascending or descending order, the coding unit 1320*b* including the coordinates (xb, yb) of the sample 1330*b* at a center location may be determined as a coding unit at a center location from among the coding units 1320*a*, 1320*b*, and 1320*c* determined by splitting the current coding unit 1300. However, the coordinates indicating the locations of the top left samples 1330*a*, 1330*b*, and 1330*c* may include coordinates indicating absolute locations in the picture, or may use coordinates (dxb, dyb) indicating a relative location of the top left sample 1330*b* of the middle coding unit 1320*b* and coordinates (dxc, dyc) indicating a relative location of the top left sample 1330*c* of the lower coding unit 1320*c* with reference to the location of the top left sample 1330*a* of the upper coding unit 1320*a*. A method of determining a coding unit at a predetermined location by using coordinates of a sample included in the coding unit, as information indicating a location of the sample, is not limited to the above-described method, and may include various arithmetic methods capable of using the coordinates of the sample.

According to an embodiment, the video decoding apparatus 100 may split the current coding unit 1300 into a plurality of coding units 1320*a*, 1320*b*, and 1320*c*, and may select one of the coding units 1320*a*, 1320*b*, and 1320*c* based on a predetermined criterion. For example, the video decoding apparatus 100 may select the coding unit 1320*b*, which has a size different from that of the others, from among the coding units 1320a, 1320b, and 1320c.

According to an embodiment, the video decoding apparatus 100 may determine the widths or heights of the coding units 1320a, 1320b, and 1320c by using the coordinates (xa, ya) indicating the location of the top left sample 1330a of the upper coding unit 1320a, the coordinates (xb, yb) indicating the location of the top left sample 1330b of the middle coding unit 1320b, and the coordinates (xc, yc) indicating the location of the top left sample 1330c of the lower coding unit 1320c. The video decoding apparatus 100 may determine the respective sizes of the coding units 1320a, 1320b, and 1320c by using the coordinates (xa, ya), (xb, yb), and (xc, yc) indicating the locations of the coding units 1320a, 1320b, and 1320c.

According to an embodiment, the video decoding apparatus 100 may determine the width of the upper coding unit 1320a to be xb-xa and determine the height thereof to be yb-ya. According to an embodiment, the video decoding apparatus 100 may determine the width of the middle coding unit 1320b to be xc-xb and determine the height thereof to be yc-yb. According to an embodiment, the video decoding apparatus 100 may determine the width or height of the lower coding unit 1320c by using the width or height of the current coding unit 1300 or the widths or heights of the upper and middle coding units 1320a and 1320b. The video decoding apparatus 100 may determine a coding unit, which has a size different from that of the others, based on the determined widths and heights of the coding units 1320a to 1320c. Referring to FIG. 13, the video decoding apparatus 100 may determine the middle coding unit 1320b, which has a size different from the size of the upper and lower coding units 1320a and 1320c, as the coding unit of the predetermined location. However, the above-described method, performed by the video decoding apparatus 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

However, locations of samples considered to determine locations of coding units are not limited to the above-described top left locations, and information about arbitrary locations of samples included in the coding units may be used.

According to an embodiment, the video decoding apparatus 100 may select a coding unit at a predetermined location from among an odd number of coding units determined by splitting the current coding unit, considering the shape of the current coding unit. For example, when the current coding unit has a non-square shape, a width of which is longer than a height, the video decoding apparatus 100 may determine the coding unit at the predetermined location in a horizontal direction. That is, the video decoding apparatus 100 may determine one of coding units at different locations in a horizontal direction and put a restriction on the coding unit. When the current coding unit has a non-square shape, a height of which is longer than a width, the video decoding apparatus 100 may determine the coding unit at the predetermined location in a vertical direction. That is, the video decoding apparatus 100 may determine one of coding units at different locations in a vertical direction and may put a restriction on the coding unit.

According to an embodiment, the video decoding apparatus 100 may use information indicating respective locations of an even number of coding units, to determine the coding unit at the predetermined location from among the even number of coding units. The video decoding apparatus 100 may determine an even number of coding units by splitting the current coding unit, and may determine the coding unit at the predetermined location by using the information about the locations of the even number of coding units. An operation related thereto may correspond to the operation of determining a coding unit at a predetermined location (e.g., a center location) from among an odd number of coding units, which has been described in detail above in relation to FIG. 13, and thus detailed descriptions thereof are not provided here.

According to an embodiment, when a non-square current coding unit is split into a plurality of coding units, predetermined information about a coding unit at a predetermined location may be used in a splitting operation to determine the coding unit at the predetermined location from among the plurality of coding units. For example, the video decoding apparatus 100 may use at least one of block shape information and split shape information, which is stored in a sample included in a coding unit at a center location, in a splitting operation to determine the coding unit at the center location from among the plurality of coding units determined by splitting the current coding unit.

Referring to FIG. 13, the video decoding apparatus 100 may split the current coding unit 1300 into a plurality of coding units 1320a, 1320b, and 1320c based on at least one of the block shape information and the split shape information, and may determine a coding unit 1320b at a center location from among the plurality of the coding units 1320a, 1320b, and 1320c. Furthermore, the video decoding apparatus 100 may determine the coding unit 1320b at the center location, in consideration of a location from which at least one of the block shape information and the split shape information is obtained. That is, at least one of the block shape information and the split shape information of the current coding unit 1300 may be obtained from the sample 1340 at a center location of the current coding unit 1300 and, when the current coding unit 1300 is split into the plurality of coding units 1320a, 1320b, and 1320c based on at least one of the block shape information and the split shape information, the coding unit 1320b including the sample 1340 may be determined as the coding unit at the center location. However, information used to determine the coding unit at the center location is not limited to at least one of the block shape information and the split shape information, and various types of information may be used to determine the coding unit at the center location.

According to an embodiment, predetermined information for identifying the coding unit at the predetermined location may be obtained from a predetermined sample included in a coding unit to be determined. Referring to FIG. 13, the video decoding apparatus 100 may use at least one of the block shape information and the split shape information, which is obtained from a sample at a predetermined location in the current coding unit 1300 (e.g., a sample at a center location of the current coding unit 1300) to determine a coding unit at a predetermined location from among the plurality of the coding units 1320a, 1320b, and 1320c determined by splitting the current coding unit 1300 (e.g., a coding unit at a center location from among a plurality of split coding units). That is, the video decoding apparatus 100 may determine the sample at the predetermined location by considering a block shape of the current coding unit 1300, determine the coding unit 1320*b* including a sample, from which predetermined information (e.g., at least one of the block shape information and the split shape information) may be obtained, from among the plurality of coding units 1320*a*, 1320*b*, and 1320*c* determined by splitting the current coding unit 1300, and may put a predetermined restriction on the coding unit 1320*b*. Referring to FIG. 13, according to an embodiment, the video decoding apparatus 100 may determine the sample 1340 at the center location of the current coding unit 1300 as the sample from which the predetermined information may be obtained, and may put a predetermined restriction on the coding unit 1320*b* including the sample 1340, in a decoding operation. However, the location of the sample from which the predetermined information may be obtained is not limited to the above-described location, and may include arbitrary locations of samples included in the coding unit 1320*b* to be determined for a restriction.

According to an embodiment, the location of the sample from which the predetermined information may be obtained may be determined based on the shape of the current coding unit 1300. According to an embodiment, the block shape information may indicate whether the current coding unit has a square or non-square shape, and the location of the sample from which the predetermined information may be obtained may be determined based on the shape. For example, the video decoding apparatus 100 may determine a sample located on a boundary for dividing at least one of a width and height of the current coding unit in half, as the sample from which the predetermined information may be obtained, by using at least one of information about the width of the current coding unit and information about the height of the current coding unit. As another example, when the block shape information of the current coding unit indicates a non-square shape, the video decoding apparatus 100 may determine one of samples adjacent to a boundary for dividing a long side of the current coding unit in half, as the sample from which the predetermined information may be obtained.

According to an embodiment, when the current coding unit is split into a plurality of coding units, the video decoding apparatus 100 may use at least one of the block shape information and the split shape information to determine a coding unit at a predetermined location from among the plurality of coding units. According to an embodiment, the video decoding apparatus 100 may obtain at least one of the block shape information and the split shape information from a sample at a predetermined location in a coding unit, and split the plurality of coding units, which are generated by splitting the current coding unit, by using at least one of the split shape information and the block shape information, which is obtained from the sample of the predetermined location in each of the plurality of coding units. That is, a coding unit may be recursively split based on at least one of the block shape information and the split shape information, which is obtained from the sample at the predetermined location in each coding unit. An operation of recursively splitting a coding unit has been described above in relation to FIG. 12, and thus detailed descriptions thereof will not be provided here.

According to an embodiment, the video decoding apparatus 100 may determine one or more coding units by splitting the current coding unit, and may determine an order of decoding the one or more coding units, based on a predetermined block (e.g., the current coding unit).

Figure 14:
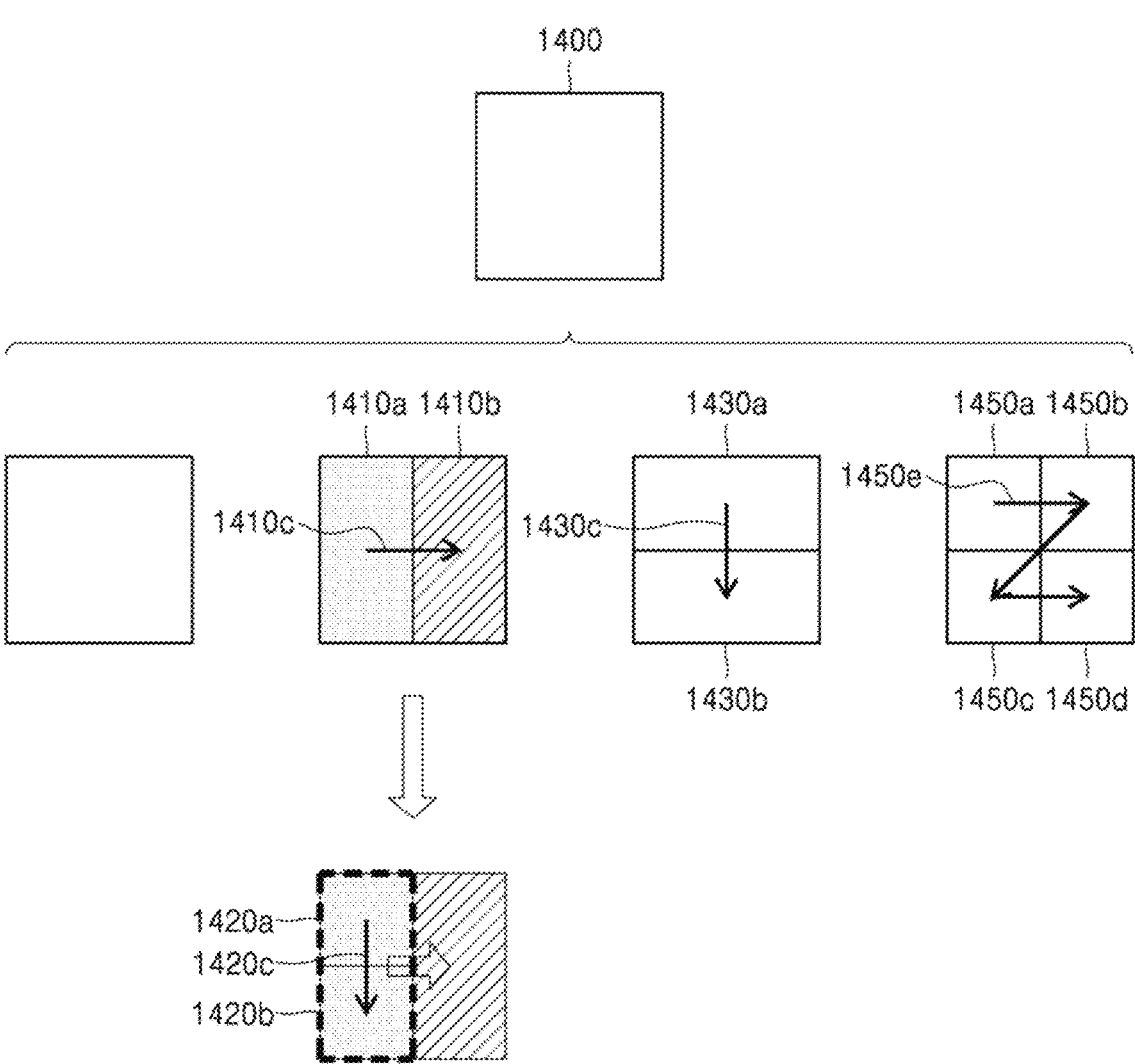
FIG. 14 illustrates an order of processing a plurality of coding units when the plurality of coding units are determined by splitting a current coding unit, according to an embodiment.

FIG. 14 illustrates an order of processing a plurality of coding units when the video decoding apparatus 100 determines the plurality of coding units by splitting a current coding unit, according to an embodiment.

According to an embodiment, the video decoding apparatus 100 may determine second coding units 1410*a* and 1410*b* by splitting a first coding unit 1400 in a vertical direction, determine second coding units 1430*a* and 1430*b* by splitting the first coding unit 1400 in a horizontal direction, or determine second coding units 1450*a* to 1450*d* by splitting the first coding unit 1400 in vertical and horizontal directions, based on block shape information and split shape information.

Referring to FIG. 14, the video decoding apparatus 100 may determine to process the second coding units 1410*a* and 1410*b*, which are determined by splitting the first coding unit 1400 in a vertical direction, in a horizontal direction order 1410*c*. The video decoding apparatus 100 may determine to process the second coding units 1430*a* and 1430*b*, which are determined by splitting the first coding unit 1400 in a horizontal direction, in a vertical direction order 1430*c*. The video decoding apparatus 100 may determine to process the second coding units 1450*a* to 1450*d*, which are determined by splitting the first coding unit 1400 in vertical and horizontal directions, in a predetermined order for processing coding units in a row and then processing coding units in a next row (e.g., in a raster scan order or Z-scan order 1450*e*).

According to an embodiment, the video decoding apparatus 100 may recursively split coding units. Referring to FIG. 14, the video decoding apparatus 100 may determine a plurality of coding units 1410*a*, 1410*b*, 1430*a*, 1430*b*, 1450*a*, 1450*b*, 1450*c*, and 1450*d* by splitting the first coding unit 1400, and may recursively split each of the determined plurality of coding units 1410*a*, 1410*b*, 1430*a*, 1430*b*, 1450*a*, 1450*b*, 1450*c*, and 1450*d*. A splitting method of the plurality of coding units 1410*a*, 1410*b*, 1430*a*, 1430*b*, 1450*a*, 1450*b*, 1450*c*, and 1450*d* may correspond to a splitting method of the first coding unit 1400. As such, each of the plurality of coding units 1410*a*, 1410*b*, 1430*a*, 1430*b*, 1450*a*, 1450*b*, 1450*c*, and 1450*d* may be independently split into a plurality of coding units. Referring to FIG. 14, the video decoding apparatus 100 may determine the second coding units 1410*a* and 1410*b* by splitting the first coding unit 1400 in a vertical direction, and may determine to independently split or not to split each of the second coding units 1410*a* and 1410*b*.

According to an embodiment, the video decoding apparatus 100 may determine third coding units 1420*a* and 1420*b* by splitting the left second coding unit 1410*a* in a horizontal direction, and may not split the right second coding unit 1410*b*.

According to an embodiment, a processing order of coding units may be determined based on an operation of splitting a coding unit. In other words, a processing order of split coding units may be determined based on a processing order of coding units immediately before being split. The video decoding apparatus 100 may determine a processing order of the third coding units 1420*a* and 1420*b* determined by splitting the left second coding unit 1410*a*, independently of the right second coding unit 1410*b*. Because the third coding units 1420*a* and 1420*b* are determined by splitting the left second coding unit 1410*a* in a horizontal direction, the third coding units 1420*a* and 1420*b* may be processed in a vertical direction order 1420*c*. Because the left and right second coding units 1410*a* and 1410*b* are processed in the horizontal direction order 1410*c*, the right second coding unit 1410*b* may be processed after the third coding units 1420*a* and 1420*b* included in the left second coding unit 1410*a* are processed in the vertical direction order 1420*c*. An operation of determining a processing order of coding units based on a coding unit before being split is not limited to the above-described example, and various methods may be used to independently process coding units, which are split and determined to various shapes, in a predetermined order.

Figure 15:
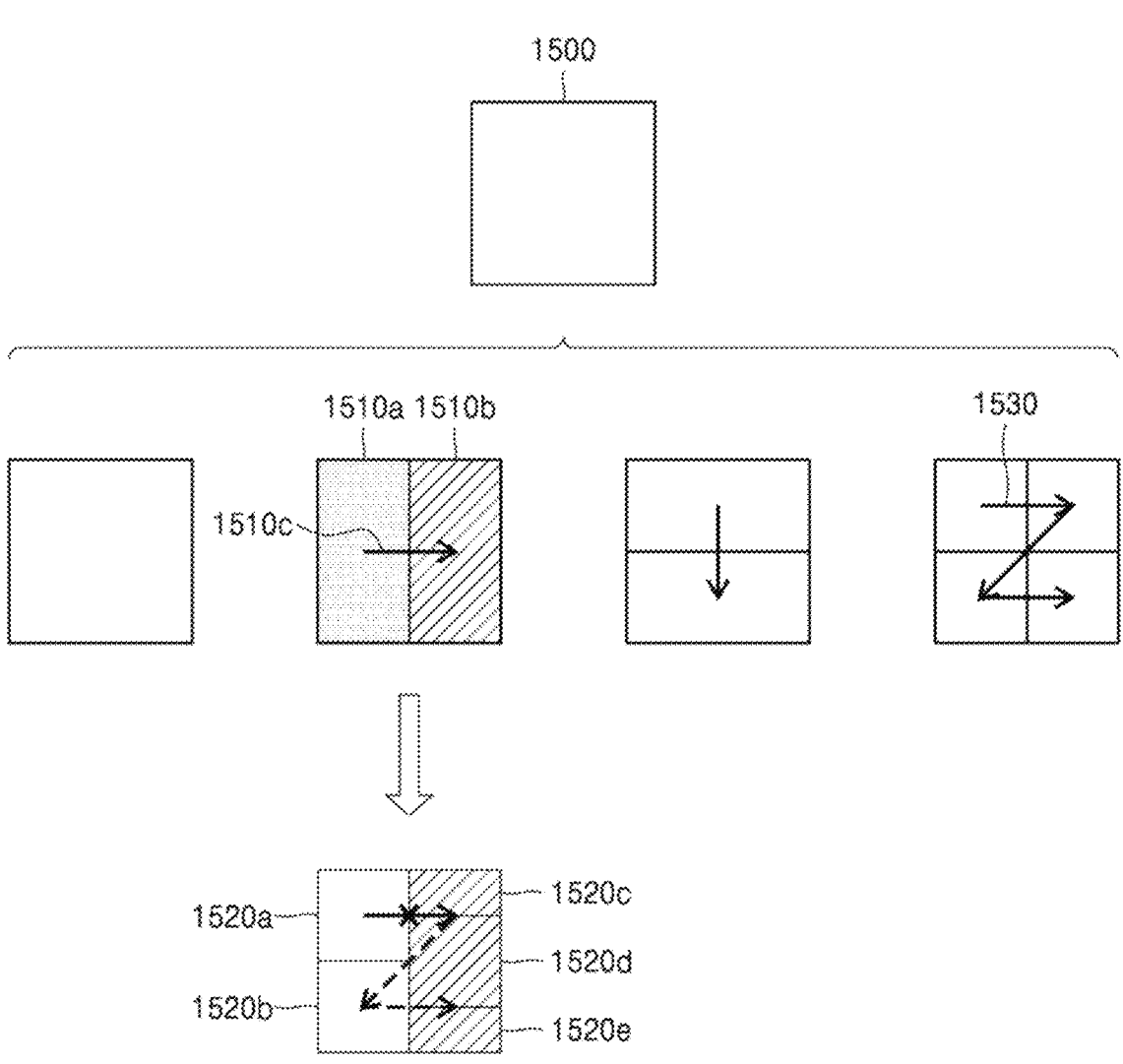
FIG. 15 illustrates a process of determining that a current coding unit is to be split into an odd number of coding units, when the coding units are not processable in a predetermined order, according to an embodiment.

FIG. 15 illustrates a process, performed by the video decoding apparatus 100, of determining that a current coding unit is to be split into an odd number of coding units, when the coding units are not processable in a predetermined order, according to an embodiment.

According to an embodiment, the video decoding apparatus 100 may determine whether the current coding unit is split into an odd number of coding units, based on obtained block shape information and split shape information. Referring to FIG. 15, a square first coding unit 1500 may be split into non-square second coding units 1510*a* and 1510*b*, and the second coding units 1510*a* and 1510*b* may be independently split into third coding units 1520*a* and 1520*b*, and 1520*c* to 1520*e*. According to an embodiment, the video decoding apparatus 100 may determine a plurality of third coding units 1520*a* and 1520*b* by splitting the left second coding unit 1510*a* in a horizontal direction, and may split the right second coding unit 1510*b* into an odd number of third coding units 1520*c* to 1520*e*.

According to an embodiment, the video decoding apparatus 100 may determine whether any coding unit is split into an odd number of coding units, by determining whether the third coding units 1520*a* and 1520*b*, and 1520*c* to 1520*e* are processable in a predetermined order. Referring to FIG. 15, the video decoding apparatus 100 may determine the third coding units 1520*a* and 1520*b*, and 1520*c* to 1520*e* by recursively splitting the first coding unit 1500. The video decoding apparatus 100 may determine whether any of the first coding unit 1500, the second coding units 1510*a* and 1510*b*, and the third coding units 1520*a* and 1520*b*, and 1520*c*, 1520*d*, and 1520*e* are split into an odd number of coding units, based on at least one of the block shape information and the split shape information. For example, the right second coding unit 1510*b* may be split into an odd number of third coding units 1520*c*, 1520*d*, and 1520*e*. A processing order of a plurality of coding units included in the first coding unit 1500 may be a predetermined order (e.g., a Z-scan order 1530), and the video decoding apparatus 100 may decide whether the third coding units 1520*c*, 1520*d*, and 1520*e*, which are determined by splitting the right second coding unit 1510*b* into an odd number of coding units, satisfy a condition for processing in the predetermined order.

According to an embodiment, the video decoding apparatus 100 may determine whether the third coding units 1520*a* and 1520*b*, and 1520*c*, 1520*d*, and 1520*e* included in the first coding unit 1500 satisfy the condition for processing in the predetermined order, and the condition relates to whether at least one of a width and height of the second coding units 1510*a* and 1510*b* is divided in half along a boundary of the third coding units 1520*a* and 1520*b*, and 1520*c*, 1520*d*, and 1520*e*. For example, the third coding units 1520*a* and 1520*b* determined by dividing the height of the non-square left second coding unit 1510*a* in half satisfy the condition. However, because boundaries of the third coding units 1520*c*, 1520*d*, and 1520*e* determined by splitting the right second coding unit 1510*b* into three coding units do not divide the width or height of the right second coding unit 1510*b* in half, it may be determined that the third coding units 1520*c*, 1520*d*, and 1520*e* do not satisfy the condition. When the condition is not satisfied as described above, the video decoding apparatus 100 may decide disconnection of a scan order, and determine that the right second coding unit 1510*b* is split into an odd number of coding units, based on a result of the decision. According to an embodiment, when a coding unit is split into an odd number of coding units, the video decoding apparatus 100 may put a predetermined restriction on a coding unit at a predetermined location among the split coding units. The restriction or the predetermined location has been described above in relation to various embodiments, and thus detailed descriptions thereof will not be provided here.

Figure 16:
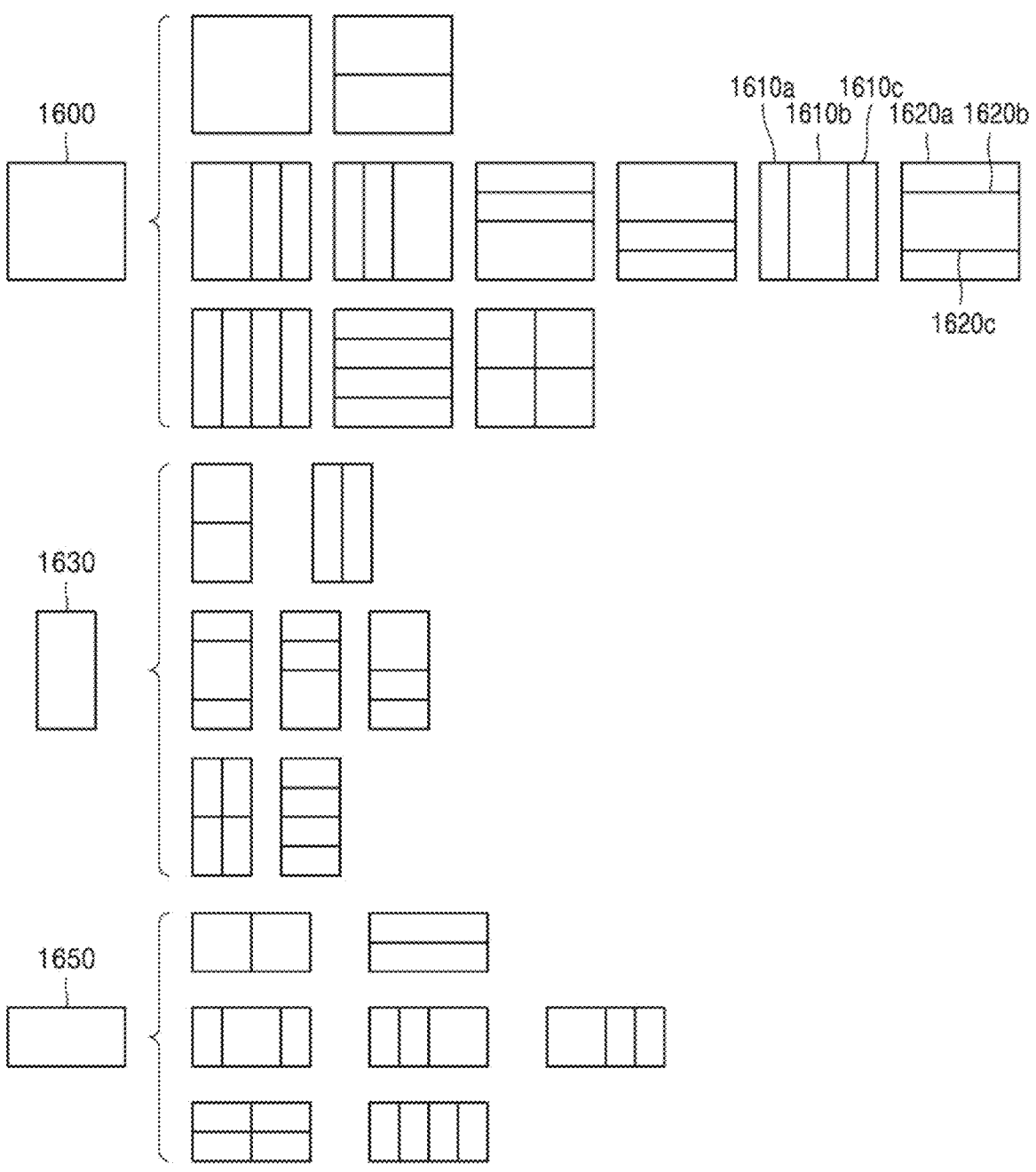
FIG. 16 illustrates a process of determining at least one coding unit by splitting a first coding unit, according to an embodiment.

FIG. 16 illustrates a process, performed by the video decoding apparatus 100, of determining at least one coding unit by splitting a first coding unit 1600, according to an embodiment. According to an embodiment, the video decoding apparatus 100 may split the first coding unit 1600, based on at least one of block shape information and split shape information, which is obtained by the obtainer 110. The square first coding unit 1600 may be split into four square coding units, or may be split into a plurality of non-square coding units. For example, referring to FIG. 16, when the block shape information indicates that the first coding unit 1600 has a square shape and the split shape information indicates to split the first coding unit 1600 into non-square coding units, the video decoding apparatus 100 may split the first coding unit 1600 into a plurality of non-square coding units. In detail, when the split shape information indicates to determine an odd number of coding units by splitting the first coding unit 1600 in a horizontal direction or a vertical direction, the video decoding apparatus 100 may split the square first coding unit 1600 into an odd number of coding units, e.g., second coding units 1610*a*, 1610*b*, and 1610*c* determined by splitting the square first coding unit 1600 in a vertical direction or second coding units 1620*a*, 1620*b*, and 1620*c* determined by splitting the square first coding unit 1600 in a horizontal direction.

According to an embodiment, the video decoding apparatus 100 may determine whether the second coding units 1610*a*, 1610*b*, 1610*c*, 1620*a*, 1620*b*, and 1620*c* included in the first coding unit 1600 satisfy a condition for processing in a predetermined order, and the condition relates to whether at least one of a width and height of the first coding unit 1600 is divided in half along a boundary of the second coding units 1610*a*, 1610*b*, 1610*c*, 1620*a*, 1620*b*, and 1620*c*. Referring to FIG. 16, because boundaries of the second coding units 1610*a*, 1610*b*, and 1610*c* determined by splitting the square first coding unit 1600 in a vertical direction do not divide the width of the first coding unit 1600 in half, it may be determined that the first coding unit 1600 does not satisfy the condition for processing in the predetermined order. In addition, because boundaries of the second coding units 1620*a*, 1620*b*, and 1620*c* determined by splitting the square first coding unit 1600 in a horizontal direction do not divide the width of the first coding unit 1600 in half, it may be determined that the first coding unit 1600 does not satisfy the condition for processing in the predetermined order. When the condition is not satisfied as described above, the video decoding apparatus 100 may decide disconnection of a scan order, and may determine that the first coding unit 1600 is split into an odd number of coding units, based on a result of the decision. According to an embodiment, when a coding unit is split into an odd number of coding units, the video decoding apparatus 100 may put a predetermined restriction on a coding unit at a predetermined location from among the split coding units. The restriction or the predetermined location has been described above in relation to various embodiments, and thus detailed descriptions thereof will not be provided herein.

According to an embodiment, the video decoding apparatus 100 may determine various-shaped coding units by splitting a first coding unit.

Referring to FIG. 16, the video decoding apparatus 100 may split the square first coding unit 1600 or a non-square first coding unit 1630 or 1650 into various-shaped coding units.

Figure 17:
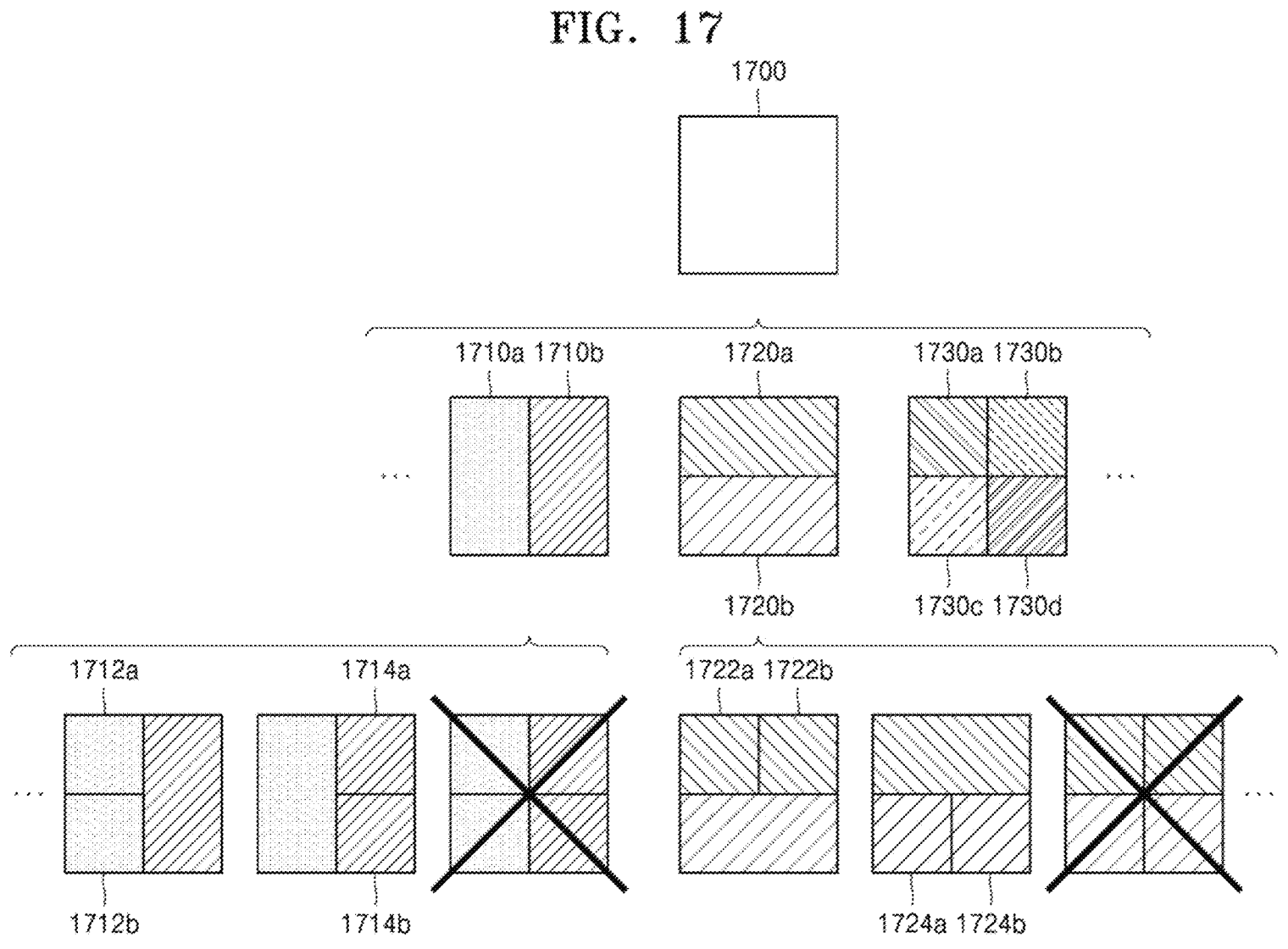

FIG. 17 illustrates that a shape into which a second coding unit is splittable by the video decoding apparatus 100 is restricted when the second coding unit having a non-square shape, which is determined by splitting a first coding unit 1700, satisfies a predetermined condition, according to an embodiment.

According to an embodiment, the video decoding apparatus 100 may determine to split the square first coding unit 1700 into non-square second coding units 1710a, 1710b, 1720a, and 1720b, based on at least one of block shape information and split shape information, which is obtained by the obtainer 105. The second coding units 1710a, 1710b, 1720a, and 1720b may be independently split. As such, the video decoding apparatus 100 may determine to split or not to split the first coding unit 1700 into a plurality of coding units, based on at least one of the block shape information and the split shape information of each of the second coding units 1710a, 1710b, 1720a, and 1720b. According to an embodiment, the video decoding apparatus 100 may determine third coding units 1712a and 1712b by splitting the non-square left second coding unit 1710a, which is determined by splitting the first coding unit 1700 in a vertical direction, in a horizontal direction. However, when the left second coding unit 1710a is split in a horizontal direction, the video decoding apparatus 100 may restrict the right second coding unit 1710b to not be split in a horizontal direction in which the left second coding unit 1710a is split. When third coding units 1714a and 1714b are determined by splitting the right second coding unit 1710b in a same direction, because the left and right second coding units 1710a and 1710b are independently split in a horizontal direction, the third coding units 1712a, 1712b, 1714a, and 1714b may be determined. However, this case serves equally as a case in which the video decoding apparatus 100 splits the first coding unit 1700 into four square second coding units 1730a, 1730b, 1730c, and 1730d, based on at least one of the block shape information and the split shape information, and may be inefficient in terms of image decoding.

According to an embodiment, the video decoding apparatus 100 may determine third coding units 1722a, 1722b, 1724a, and 1724b by splitting the non-square second coding unit 1720a or 1720b, which is determined by splitting a first coding unit 11300 in a horizontal direction, in a vertical direction. However, when a second coding unit (e.g., the upper second coding unit 1720a) is split in a vertical direction, for the above-described reason, the video decoding apparatus 100 may restrict the other second coding unit (e.g., the lower second coding unit 1720b) to not be split in a vertical direction in which the upper second coding unit 1720a is split.

Figure 18:
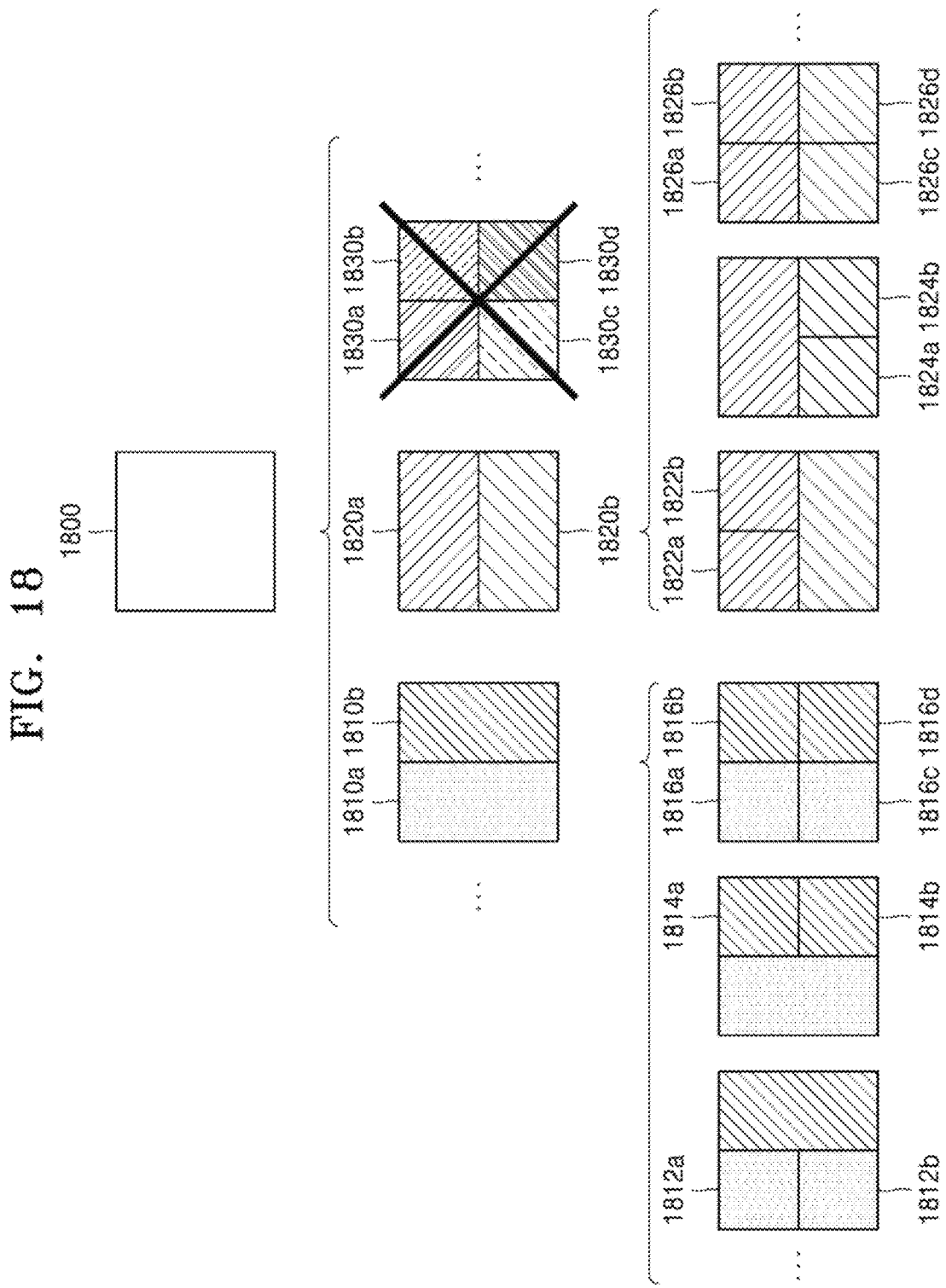
FIG. 18 illustrates a process of splitting a square coding unit when split shape information indicates that the square coding unit is not to be split into four square coding units, according to an embodiment.

FIG. 18 illustrates a process, performed by the video decoding apparatus 100, of splitting a square coding unit when split shape information indicates that the square coding unit is not to be split into four square coding units, according to an embodiment.

According to an embodiment, the video decoding apparatus 100 may determine second coding units 1810a, 1810b,

1820a, 1820b, etc. by splitting a first coding unit 1800, based on at least one of block shape information and split shape information. The split shape information may include information about various methods of splitting a coding unit but, the information about various splitting methods may not include information for splitting a coding unit into four square coding units. According to such split shape information, the video decoding apparatus 100 may not split the first square coding unit 1800 into four square second coding units 1830a, 1830b, 1830c, and 1830d. The video decoding apparatus 100 may determine the non-square second coding units 1810a, 1810b, 1820a, 1820b, etc., based on the split shape information.

According to an embodiment, the video decoding apparatus 100 may independently split the non-square second coding units 1810a, 1810b, 1820a, 1820b, etc. Each of the second coding units 1810a, 1810b, 1820a, 1820b, etc. may be recursively split in a predetermined order, and this splitting method may correspond to a method of splitting the first coding unit 1800, based on at least one of the block shape information and the split shape information.

For example, the video decoding apparatus 100 may determine square third coding units 1812a and 1812b by splitting the left second coding unit 1810a in a horizontal direction, and may determine square third coding units 1814a and 1814b by splitting the right second coding unit 1810b in a horizontal direction. Furthermore, the video decoding apparatus 100 may determine square third coding units 1816a, 1816b, 1816c, and 1816d by splitting both of the left and right second coding units 1810a and 1810b in a horizontal direction. In this case, coding units having the same shape as the four square second coding units 1830a, 1830b, 1830c, and 1830d split from the first coding unit 1800 may be determined.

As another example, the video decoding apparatus 100 may determine square third coding units 1822a and 1822b by splitting the upper second coding unit 1820a in a vertical direction, and may determine square third coding units 1824a and 1824b by splitting the lower second coding unit 1820b in a vertical direction. Furthermore, the video decoding apparatus 100 may determine square third coding units 1822a, 1822b, 1824a, and 1824b by splitting both of the upper and lower second coding units 1820a and 1820b in a vertical direction. In this case, coding units having the same shape as the four square second coding units 1830a, 1830b, 1830c, and 1830d split from the first coding unit 1800 may be determined.

Figure 19:
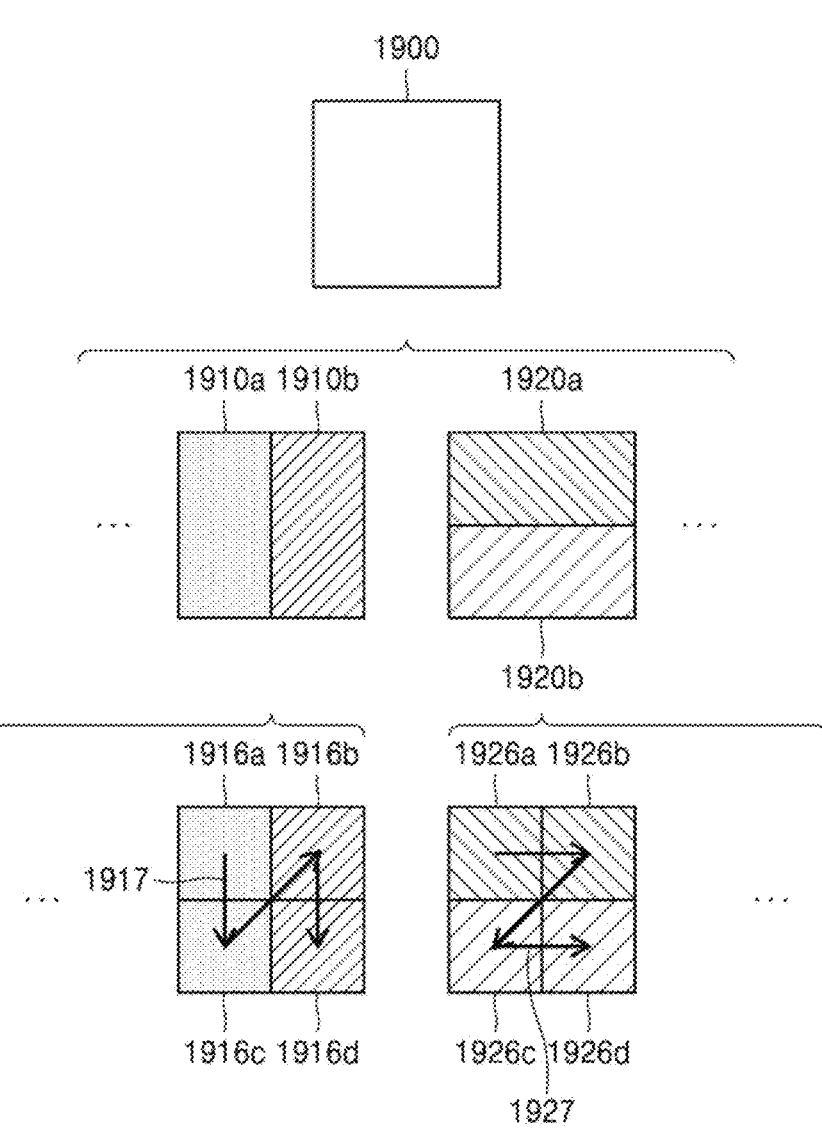
FIG. 19 illustrates that a processing order between a plurality of coding units may be changed depending on a process of splitting a coding unit, according to an embodiment.

FIG. 19 illustrates that a processing order between a plurality of coding units may be changed depending on a process of splitting a coding unit, according to an embodiment.

According to an embodiment, the video decoding apparatus 100 may split a first coding unit 1900, based on block shape information and split shape information. When the block shape information indicates a square shape and the split shape information indicates to split the first coding unit 1900 in at least one of horizontal and vertical directions, the video decoding apparatus 100 may determine second coding units 1910a, 1910b, 1920a, 1920b, 1930a, 1930b, 1930c, and 1930d by splitting the first coding unit 1900. Referring to FIG. 19, the non-square second coding units 1910a, 1910b, 1920a, and 1920b determined by splitting the first coding unit 1900 in only a horizontal direction or vertical direction may be independently split based on the block shape information and the split shape information of each coding unit. For example, the video decoding apparatus 100 may determine third coding units 1916a, 1916b, 1916c, and 1916*d* by splitting the second coding units 1910*a* and 1910*b*, which are generated by splitting the first coding unit 1900 in a vertical direction, in a horizontal direction, and may determine third coding units 1926*a*, 1926*b*, 1926*c*, and 1926*d* by splitting the second coding units 1920*a* and 1920*b*, which are generated by splitting the first coding unit 1900 in a horizontal direction, in a horizontal direction. An operation of splitting the second coding units 1910*a*, 1910*b*, 1920*a*, and 1920*b* has been described above in relation to FIG. 17, and thus detailed descriptions thereof will not be provided herein.

According to an embodiment, the video decoding apparatus 100 may process coding units in a predetermined order. An operation of processing coding units in a predetermined order has been described above in relation to FIG. 14, and thus detailed descriptions thereof will not be provided herein. Referring to FIG. 19, the video decoding apparatus 100 may determine four square third coding units 1916*a*, 1916*b*, 1916*c*, and 1916*d*, and 1926*a*, 1926*b*, 1926*c*, and 1926*d* by splitting the square first coding unit 1900. According to an embodiment, the video decoding apparatus 100 may determine processing orders of the third coding units 1916*a*, 1916*b*, 1916*c*, and 1916*d*, and 1926*a*, 1926*b*, 1926*c*, and 1926*d* based on a splitting method of the first coding unit 1900.

According to an embodiment, the video decoding apparatus 100 may determine the third coding units 1916*a*, 1916*b*, 1916*c*, and 1916*d* by splitting the second coding units 1910*a* and 1910*b* generated by splitting the first coding unit 1900 in a vertical direction, in a horizontal direction, and may process the third coding units 1916*a*, 1916*b*, 1916*c*, and 1916*d* in a processing order 1917 for initially processing the third coding units 1916*a* and 1916*b*, which are included in the left second coding unit 1910*a*, in a vertical direction and then processing the third coding unit 1916*c* and 1916*d*, which are included in the right second coding unit 1910*b*, in a vertical direction.

According to an embodiment, the video decoding apparatus 100 may determine the third coding units 1926*a*, 1926*b*, 1926*c*, and 1926*d* by splitting the second coding units 1920*a* and 1920*b* generated by splitting the first coding unit 1900 in a horizontal direction, in a vertical direction, and may process the third coding units 1926*a*, 1926*b*, 1926*c*, and 1926*d* in a processing order 1927 for initially processing the third coding units 1926*a* and 1926*b*, which are included in the upper second coding unit 1920*a*, in a horizontal direction and then processing the third coding unit 1926*c* and 1926*d*, which are included in the lower second coding unit 1920*b*, in a horizontal direction.

Referring to FIG. 19, the square third coding units 1916*a*, 1916*b*, 1916*c*, and 1916*d*, and 1926*a*, 1926*b*, 1926*c*, and 1926*d* may be determined by splitting the second coding units 1910*a*, 1910*b*, 1920*a*, and 1920*b*, respectively. Although the second coding units 1910*a* and 1910*b* are determined by splitting the first coding unit 1900 in a vertical direction differently from the second coding units 1920*a* and 1920*b* which are determined by splitting the first coding unit 1900 in a horizontal direction, the third coding units 1916*a*, 1916*b*, 1916*c*, and 1916*d*, and 1926*a*, 1926*b*, 1926*c*, and 1926*d* split therefrom eventually show same-shaped coding units split from the first coding unit 1900. As such, by recursively splitting a coding unit in different manners based on at least one of the block shape information and the split shape information, the video decoding apparatus 100 may process a plurality of coding units in different orders even when the coding units are eventually determined to be the same shape.

FIG. 20 illustrates a process of determining a depth of a coding unit as a shape and size of the coding unit change, when the coding unit is recursively split such that a plurality of coding units are determined, according to an embodiment.

According to an embodiment, the video decoding apparatus 100 may determine the depth of the coding unit, based on a predetermined criterion. For example, the predetermined criterion may be the length of a long side of the coding unit. When the length of a long side of a coding unit before being split is 2n times (n>0) the length of a long side of a split current coding unit, the video decoding apparatus 100 may determine that a depth of the current coding unit is increased from a depth of the coding unit before being split, by n. In the following description, a coding unit having an increased depth is expressed as a coding unit of a deeper depth.

Referring to FIG. 20, according to an embodiment, the video decoding apparatus 100 may determine a second coding unit 2002 and a third coding unit 2004 of deeper depths by splitting a square first coding unit 2000 based on block shape information indicating a square shape (for example, the block shape information may be expressed as '0: SQUARE'). Assuming that the size of the square first coding unit 2000 is 2N×2N, the second coding unit 2002 determined by dividing a width and height of the first coding unit 2000 to ½₁ may have a size of N×N. Furthermore, the third coding unit 2004 determined by dividing a width and height of the second coding unit 2002 to ½ may have a size of N/2×N/2. In this case, a width and height of the third coding unit 2004 are ½₂ times those of the first coding unit 2000. When a depth of the first coding unit 2000 is D, a depth of the second coding unit 2002, the width and height of which are ½₁ times those of the first coding unit 2000, may be D+1, and a depth of the third coding unit 2004, the width and height of which are ½₂ times those of the first coding unit 2000, may be D+2.

According to an embodiment, the video decoding apparatus 100 may determine a second coding unit 2012 or 2022 and a third coding unit 2014 or 2024 of deeper depths by splitting a non-square first coding unit 2010 or 2020 based on block shape information indicating a non-square shape (for example, the block shape information may be expressed as '1: NS_VER' indicating a non-square shape, a height of which is longer than a width, or as '2: NS_HOR' indicating a non-square shape, a width of which is longer than a height).

The video decoding apparatus 100 may determine a second coding unit 2002, 2012, or 2022 by dividing at least one of a width and height of the first coding unit 2010 having a size of N×2N. That is, the video decoding apparatus 100 may determine the second coding unit 2002 having a size of N×N or the second coding unit 2022 having a size of N×N/2 by splitting the first coding unit 2010 in a horizontal direction, or may determine the second coding unit 2012 having a size of N/2×N by splitting the first coding unit 2010 in horizontal and vertical directions.

According to an embodiment, the video decoding apparatus 100 may determine the second coding unit 2002, 2012, or 2022 by dividing at least one of a width and height of the first coding unit 2020 having a size of 2N×N. That is, the video decoding apparatus 100 may determine the second coding unit 2002 having a size of N×N or the second coding unit 2012 having a size of N/2×N by splitting the first coding unit 2020 in a vertical direction, or may determine the second coding unit 2022 having a size of N×N/2 by splitting the first coding unit 2020 in horizontal and vertical directions.

According to an embodiment, the video decoding apparatus 100 may determine a third coding unit 2004, 2014, or 2024 by dividing at least one of a width and height of the second coding unit 2002 having a size of N×N. That is, the video decoding apparatus 100 may determine the third coding unit 2004 having a size of N/2×N/2, the third coding unit 2014 having a size of N/2²×N/2, or the third coding unit 2024 having a size of N/2×N/2² by splitting the second coding unit 2002 in vertical and horizontal directions.

According to an embodiment, the video decoding apparatus 100 may determine the third coding unit 2004, 2014, or 2024 by dividing at least one of a width and height of the second coding unit 2012 having a size of N/2×N. That is, the video decoding apparatus 100 may determine the third coding unit 2004 having a size of N/2×N/2 or the third coding unit 2024 having a size of N/2×N/2² by splitting the second coding unit 2012 in a horizontal direction, or may determine the third coding unit 2014 having a size of N/2²×N/2 by splitting the second coding unit 2012 in vertical and horizontal directions.

According to an embodiment, the video decoding apparatus 100 may determine the third coding unit 2004, 2014, or 2024 by dividing at least one of a width and height of the second coding unit 2014 having a size of N×N/2. That is, the video decoding apparatus 100 may determine the third coding unit 2004 having a size of N/2×N/2 or the third coding unit 2014 having a size of N/2²×N/2 by splitting the second coding unit 2012 in a vertical direction, or may determine the third coding unit 2024 having a size of N/2×N/2² by splitting the second coding unit 2022 in vertical and horizontal directions.

According to an embodiment, the video decoding apparatus 100 may split the square coding unit 2000, 2002, or 2004 in a horizontal or vertical direction. For example, the video decoding apparatus 100 may determine the first coding unit 2010 having a size of N×2N by splitting the first coding unit 2000 having a size of 2N×2N in a vertical direction, or may determine the first coding unit 2020 having a size of 2N×N by splitting the first coding unit 2000 in a horizontal direction. According to an embodiment, when a depth is determined based on the length of the longest side of a coding unit, a depth of a coding unit determined by splitting the first coding unit 2000, 2002 or 2004 having a size of 2N×2N in a horizontal or vertical direction may be the same as the depth of the first coding unit 2000, 2002 or 2004.

According to an embodiment, a width and height of the third coding unit 2014 or 2024 may be ¼ times those of the first coding unit 2010 or 2020. When a depth of the first coding unit 2010 or 2020 is D, a depth of the second coding unit 2012 or 2014, the width and height of which are ½ times those of the first coding unit 2010 or 2020, may be D+1, and a depth of the third coding unit 2014 or 2024, the width and height of which are ¼ times those of the first coding unit 2010 or 2020, may be D+2.

Figure 21:
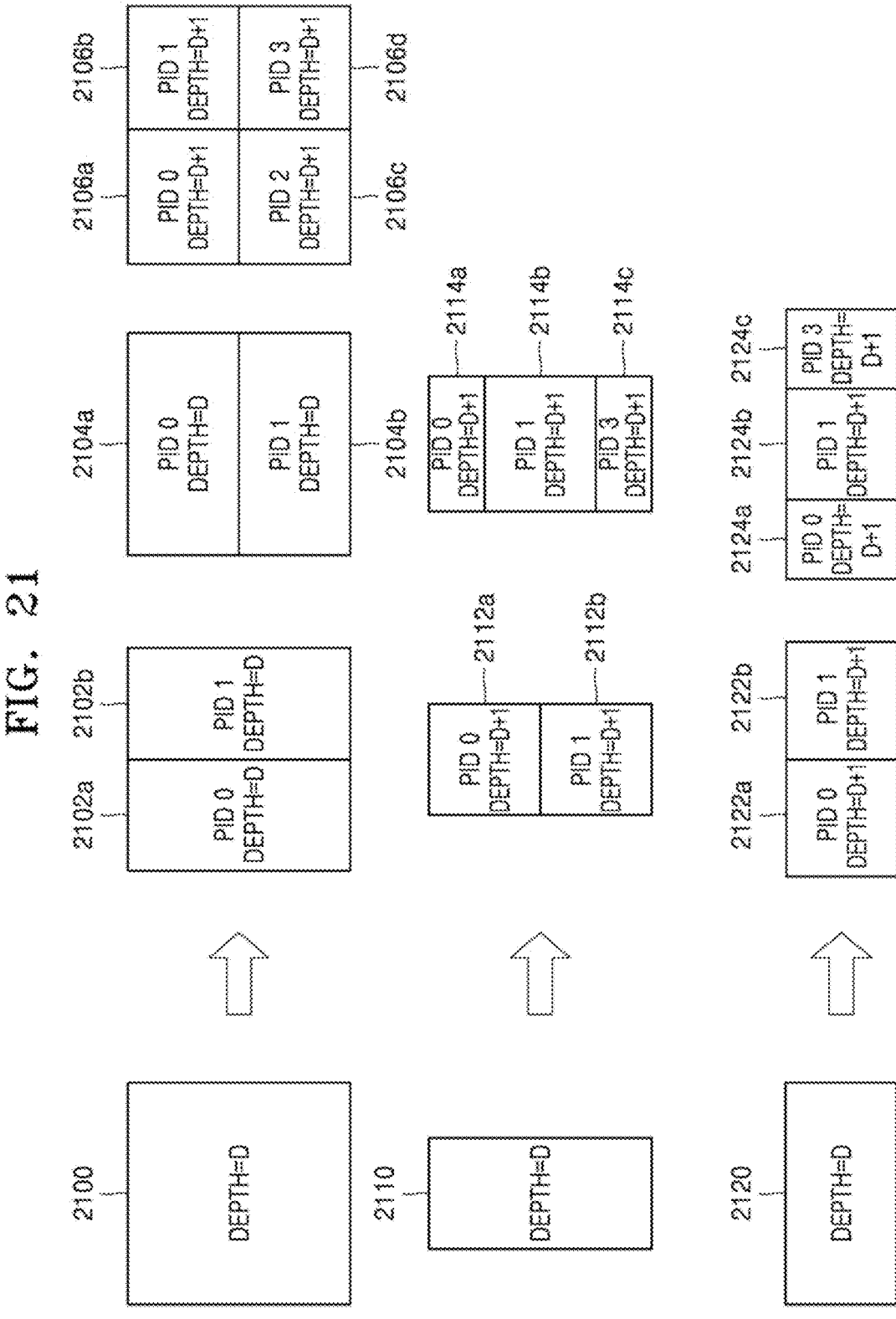
FIG. 21 illustrates depths determinable based on shapes and sizes of coding units, and part indexes (PIDs) for distinguishing the coding units, according to an embodiment.

FIG. 21 illustrates depths determinable based on shapes and sizes of coding units, and part indexes (PIDs) for distinguishing the coding units, according to an embodiment.

According to an embodiment, the video decoding apparatus 100 may determine various-shape second coding units by splitting a square first coding unit 2100. Referring to FIG. 21, the video decoding apparatus 100 may determine second coding units 2102a and 2102b, 2104a and 2104b, and 2106a, 2106b, 2106c, and 2106d by splitting the first coding unit 2100 in at least one of vertical and horizontal directions based on split shape information. That is, the video decoding apparatus 100 may determine the second coding units 2102a and 2102b, 2104a and 2104b, and 2106a, 2106b, 2106c, and 2106d, based on the split shape information of the first coding unit 2100.

According to an embodiment, a depth of the second coding units 2102a and 2102b, 2104a and 2104b, and 2106a, 2106b, 2106c, and 2106d, which are determined based on the split shape information of the square first coding unit 2100, may be determined based on the length of a long side thereof. For example, because the length of a side of the square first coding unit 2100 equals the length of a long side of the non-square second coding units 2102a and 2102b, and 2104a and 2104b, the first coding unit 2100 and the non-square second coding units 2102a and 2102b, and 2104a and 2104b may have the same depth, e.g., D. However, when the video decoding apparatus 100 splits the first coding unit 2100 into the four square second coding units 2106a, 2106b, 2106c, and 2106d based on the split shape information, because the length of a side of the square second coding units 2106a, 2106b, 2106c, and 2106d is ½ times the length of a side of the first coding unit 2100, a depth of the second coding units 2106a, 2106b, 2106c, and 2106d may be D+1 which is deeper than the depth D of the first coding unit 2100 by 1.

According to an embodiment, the video decoding apparatus 100 may determine a plurality of second coding units 2112a and 2112b, and 2114a, 2114b, and 2114c by splitting a first coding unit 2110, a height of which is longer than a width, in a horizontal direction based on the split shape information. According to an embodiment, the video decoding apparatus 100 may determine a plurality of second coding units 2122a and 2122b, and 2124a, 2124b, and 2124c by splitting a first coding unit 2120, a width of which is longer than a height, in a vertical direction based on the split shape information.

According to an embodiment, a depth of the second coding units 2112a and 2112b, 2114a, 2114b, and 2116a, 2116b, 2116c, and 2116d, which are determined based on the split shape information of the non-square first coding unit 2110 or 2120, may be determined based on the length of a long side thereof. For example, because the length of a side of the square second coding units 2112a and 2112b is ½ times the length of a long side of the first coding unit 2110 having a non-square shape, a height of which is longer than a width, a depth of the square second coding units 2102a, 2102b, 2104a, and 2104b is D+1 which is deeper than the depth D of the non-square first coding unit 2110 by 1.

Furthermore, the video decoding apparatus 100 may split the non-square first coding unit 2110 into an odd number of second coding units 2114a, 2114b, and 2114c based on the split shape information. The odd number of second coding units 2114a, 2114b, and 2114c may include the non-square second coding units 2114a and 2114c and the square second coding unit 2114b. In this case, because the length of a long side of the non-square second coding units 2114a and 2114c and the length of a side of the square second coding unit 2114b are ½ times the length of a long side of the first coding unit 2110, a depth of the second coding units 2114a, 2114b, and 2114c may be D+1 which is deeper than the depth D of the non-square first coding unit 2110 by 1. The video decoding apparatus 100 may determine depths of coding units split from the first coding unit 2120 having a non-square shape, a width of which is longer than a height, by using the above-described method of determining depths of coding units split from the first coding unit 2110.

According to an embodiment, the video decoding apparatus 100 may determine PIDs for identifying split coding units, based on a size ratio between the coding units when an odd number of split coding units do not have equal sizes. Referring to FIG. 21, a coding unit 2114*b* of a center location among an odd number of split coding units 2114*a*, 2114*b*, and 2114*c* may have a width equal to that of the other coding units 2114*a* and 2114*c* and a height which is two times that of the other coding units 2114*a* and 2114*c*. That is, in this case, the coding unit 2114*b* at the center location may include two of the other coding unit 2114*a* or 2114*c*. Therefore, when a PID of the coding unit 2114*b* at the center location is 1 based on a scan order, a PID of the coding unit 2114*c* located next to the coding unit 2114*b* may be increased by 2 and thus may be 3. That is, discontinuity in PID values may be present. According to an embodiment, the video decoding apparatus 100 may determine whether an odd number of split coding units do not have equal sizes, based on whether discontinuity is present in PIDs for identifying the split coding units.

According to an embodiment, the video decoding apparatus 100 may determine whether to use a specific splitting method, based on PID values for identifying a plurality of coding units determined by splitting a current coding unit. Referring to FIG. 21, the video decoding apparatus 100 may determine an even number of coding units 2112*a* and 2112*b* or an odd number of coding units 2114*a*, 2114*b*, and 2114*c* by splitting the first coding unit 2110 having a rectangular shape, a height of which is longer than a width. The video decoding apparatus 100 may use PIDs to identify respective coding units. According to an embodiment, the PID may be obtained from a sample of a predetermined location of each coding unit (e.g., a top left sample).

According to an embodiment, the video decoding apparatus 100 may determine a coding unit at a predetermined location from among the split coding units, by using the PIDs for distinguishing the coding units. According to an embodiment, when the split shape information of the first coding unit 2110 having a rectangular shape, a height of which is longer than a width, indicates to split a coding unit into three coding units, the video decoding apparatus 100 may split the first coding unit 2110 into three coding units 2114*a*, 2114*b*, and 2114*c*. The video decoding apparatus 100 may assign a PID to each of the three coding units 2114*a*, 2114*b*, and 2114*c*. The video decoding apparatus 100 may compare PIDs of an odd number of split coding units to determine a coding unit at a center location from among the coding units. The video decoding apparatus 100 may determine the coding unit 2114*b* having a PID corresponding to a middle value among the PIDs of the coding units, as the coding unit at the center location from among the coding units determined by splitting the first coding unit 2110. According to an embodiment, the video decoding apparatus 100 may determine PIDs for distinguishing split coding units, based on a size ratio between the coding units when the split coding units do not have equal sizes. Referring to FIG. 21, the coding unit 2114*b* generated by splitting the first coding unit 2110 may have a width equal to that of the other coding units 2114*a* and 2114*c* and a height which is two times that of the other coding units 2114*a* and 2114*c*. In this case, when the PID of the coding unit 2114*b* at the center location is 1, the PID of the coding unit 2114*c* located next to the coding unit 2114*b* may be increased by 2 and thus may be 3. When the PID is not uniformly increased as described above, the video decoding apparatus 100 may determine that a coding unit is split into a plurality of coding units including a coding unit having a size different from that of the other coding units. According to an embodiment, when the split shape information indicates to split a coding unit into an odd number of coding units, the video decoding apparatus 100 may split a current coding unit in such a manner that a coding unit of a predetermined location among an odd number of coding units (e.g., a coding unit of a centre location) has a size different from that of the other coding units. In this case, the video decoding apparatus 100 may determine the coding unit of the centre location, which has a different size, by using PIDs of the coding units. However, the PIDs and the size or location of the coding unit of the predetermined location are not limited to the above-described examples, and various PIDs and various locations and sizes of coding units may be used.

According to an embodiment, the video decoding apparatus 100 may use a predetermined data unit where a coding unit starts to be recursively split.

Figure 22:
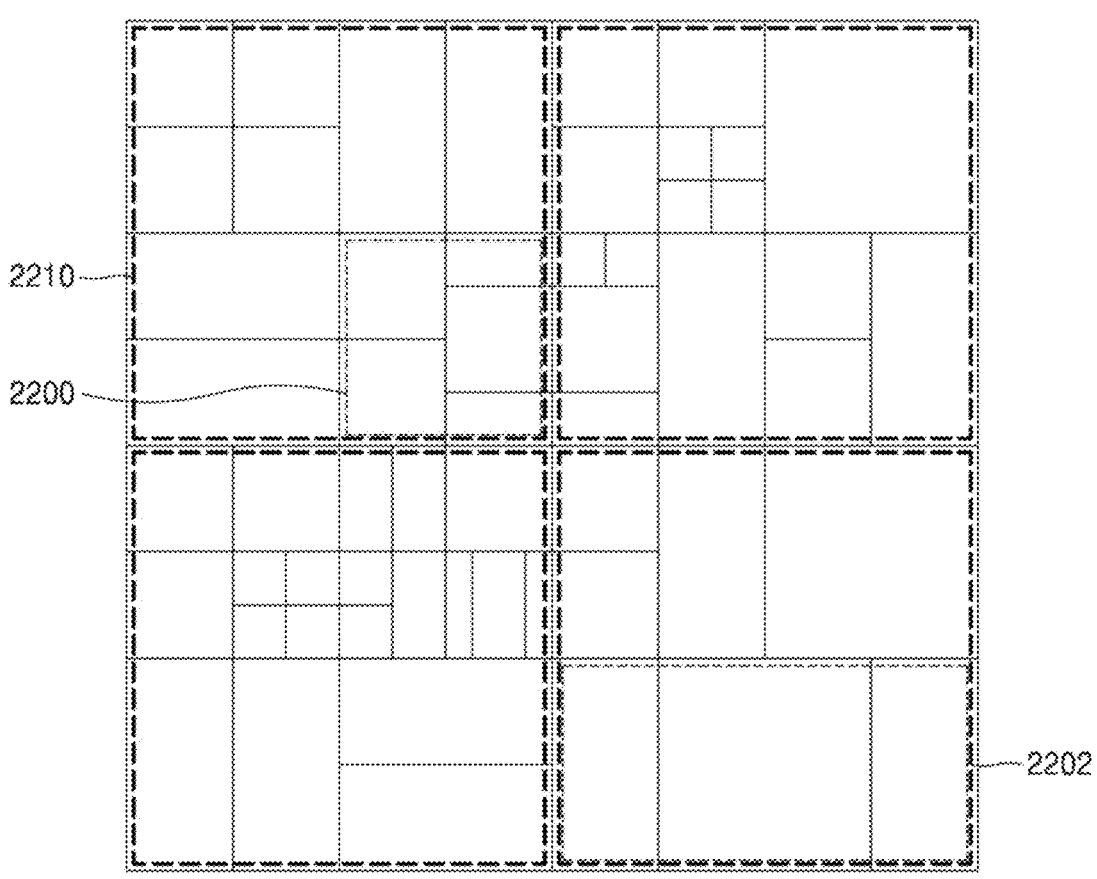
FIG. 22 illustrates that a plurality of coding units are determined based on a plurality of predetermined data units included in a picture, according to an embodiment.

FIG. 22 illustrates that a plurality of coding units are determined based on a plurality of predetermined data units included in a picture, according to an embodiment.

According to an embodiment, a predetermined data unit may be defined as a data unit where a coding unit starts to be recursively split by using at least one of block shape information and split shape information. That is, the predetermined data unit may correspond to a coding unit of an uppermost depth, which is used to determine a plurality of coding units split from a current picture. In the following descriptions, for convenience of explanation, the predetermined data unit is referred to as a reference data unit.

According to an embodiment, the reference data unit may have a predetermined size and a predetermined size shape. According to an embodiment, the reference data unit may include M×N samples. Herein, M and N may be equal to each other, and may be integers expressed as multipliers of 2. That is, the reference data unit may have a square or non-square shape, and may be split into an integer number of coding units.

According to an embodiment, the video decoding apparatus 100 may split the current picture into a plurality of reference data units. According to an embodiment, the video decoding apparatus 100 may split the plurality of reference data units, which are split from the current picture, by using splitting information about each reference data unit. The operation of splitting the reference data unit may correspond to a splitting operation using a quadtree structure.

According to an embodiment, the video decoding apparatus 100 may previously determine the minimum size allowed for the reference data units included in the current picture. Accordingly, the video decoding apparatus 100 may determine various reference data units having sizes equal to or greater than the minimum size, and may determine one or more coding units by using the block shape information and the split shape information with reference to the determined reference data unit.

Referring to FIG. 22, the video decoding apparatus 100 may use a square reference coding unit 2200 or a non-square reference coding unit 2202. According to an embodiment, the shape and size of reference coding units may be determined based on various data units capable of including one or more reference coding units (e.g., sequences, pictures, slices, slice segments, largest coding units, or the like).

According to an embodiment, the obtainer 105 of the video decoding apparatus 100 may obtain, from a bitstream, at least one of reference coding unit shape information and reference coding unit size information with respect to each of the various data units. An operation of splitting the square reference coding unit 2200 into one or more coding units has been described above in relation to the operation of splitting the current coding unit 300 of FIG. 10, and an operation of splitting the non-square reference coding unit 2200 into one or more coding units has been described above in relation to the operation of splitting the current coding unit 1100 or 1150 of FIG. 11. Thus, detailed descriptions thereof will not be provided herein.

According to an embodiment, the video decoding apparatus 100 may use a PID for identifying the size and shape of reference coding units, to determine the size and shape of reference coding units according to some data units previously determined based on a predetermined condition. That is, the obtainer 105 may obtain, from the bitstream, only the PID for identifying the size and shape of reference coding units with respect to each slice, slice segment, or largest coding unit which is a data unit satisfying a predetermined condition (e.g., a data unit having a size equal to or smaller than a slice) among the various data units (e.g., sequences, pictures, slices, slice segments, largest coding units, or the like). The video decoding apparatus 100 may determine the size and shape of reference data units with respect to each data unit, which satisfies the predetermined condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the video decoding apparatus 100 may determine at least one of the size and shape of reference coding units included in a data unit serving as a unit for obtaining the PID, by selecting the previously determined at least one of the size and shape of reference coding units based on the PID.

According to an embodiment, the video decoding apparatus 100 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the video decoding apparatus 100 may determine the reference coding units by splitting the largest coding unit n times based on a quadtree structure, and may split the reference coding unit based on at least one of the block shape information and the split shape information according to various embodiments.

Figure 23:
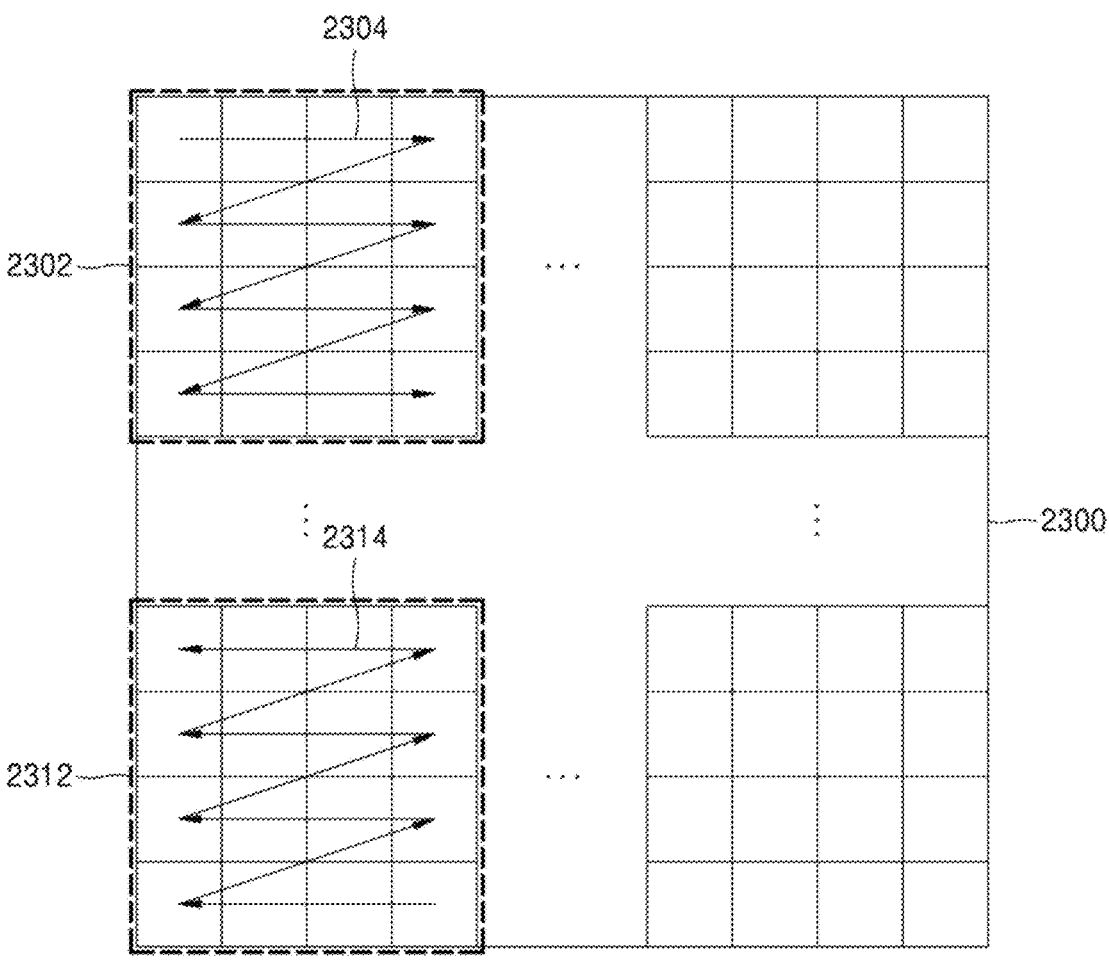
FIG. 23 illustrates a processing block serving as a unit for determining a determination order of reference coding units included in a picture, according to an embodiment.

FIG. 23 illustrates a processing block serving as a unit for determining a determination order of reference coding units included in a picture 2300, according to an embodiment.

According to an embodiment, the video decoding apparatus 100 may determine one or more processing blocks split from a picture. The processing block is a data unit including one or more reference coding units split from a picture, and the one or more reference coding units included in the processing block may be determined according to a specific order. That is, a determination order of one or more reference coding units determined in each processing block may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the above-mentioned scan orders.

According to an embodiment, the video decoding apparatus 100 may obtain processing block size information and may determine the size of one or more processing blocks included in the picture. The video decoding apparatus 100 may obtain the processing block size information from a bitstream and may determine the size of one or more processing blocks included in the picture. The size of processing blocks may be a predetermined size of data units, which is indicated by the processing block size information.

According to an embodiment, the obtainer 105 of the video decoding apparatus 100 may obtain the processing block size information from the bitstream according to each specific data unit. For example, the processing block size information may be obtained from the bitstream in a data unit such as an image, sequence, picture, slice, or slice segment. That is, the obtainer 105 may obtain the processing block size information from the bitstream according to each of the various data units, and the video decoding apparatus 100 may determine the size of one or more processing blocks, which are split from the picture, by using the obtained processing block size information. The size of the processing blocks may be integer times that of the reference coding units.

According to an embodiment, the video decoding apparatus 100 may determine the size of processing blocks 2302 and 2312 included in the picture 2300. For example, the video decoding apparatus 100 may determine the size of processing blocks based on the processing block size information obtained from the bitstream. Referring to FIG. 23, according to an embodiment, the video decoding apparatus 100 may determine a width of the processing blocks 2302 and 2312 to be four times the width of the reference coding units, and may determine a height of the processing blocks 2302 and 2312 to be four times the height of the reference coding units. The video decoding apparatus 100 may determine a determination order of one or more reference coding units in one or more processing blocks.

According to an embodiment, the video decoding apparatus 100 may determine the processing blocks 2302 and 2312, which are included in the picture 2300, based on the size of processing blocks, and may determine a determination order of one or more reference coding units in the processing blocks 2302 and 2312. According to an embodiment, determination of reference coding units may include determination of the size of the reference coding units.

According to an embodiment, the video decoding apparatus 100 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the video decoding apparatus 100 may obtain, from the bitstream, the determination order information of reference coding units according to each specific data unit. For example, the obtainer 105 may obtain the determination order information of reference coding units from the bitstream according to each data unit such as an image, sequence, picture, slice, slice segment, or processing block. Because the determination order information of reference coding units indicates an order for determining reference coding units in a processing block, the determination order information may be obtained with respect to each specific data unit including an integer number of processing blocks.

According to an embodiment, the video decoding apparatus 100 may determine one or more reference coding units based on the determined determination order.

According to an embodiment, the obtainer 105 may obtain the determination order information of reference coding units from the bitstream as information related to the processing blocks 2302 and 2312, and the video decoding apparatus 100 may determine a determination order of one or more reference coding units included in the processing blocks 2302 and 2312 and determine one or more reference coding units, which are included in the picture 2300, based on the determination order. Referring to FIG. 23, the video decoding apparatus 100 may determine determination orders 2304 and 2314 of one or more reference coding units in the processing blocks 2302 and 2312, respectively. For example, when the determination order information of reference coding units is obtained with respect to each processing block, different types of the determination order information of reference coding units may be obtained for the processing blocks 2302 and 2312. When the determination order 2304 of reference coding units in the processing block 2302 is a raster scan order, reference coding units included in the processing block 2302 may be determined according to a raster scan order. On the contrary, when the determination order 2314 of reference coding units in the other processing block 2312 is a backward raster scan order, reference coding units included in the processing block 2312 may be determined according to the backward raster scan order.

According to an embodiment, the video decoding apparatus 100 may decode the determined one or more reference coding units. The video decoding apparatus 100 may decode an image, based on the reference coding units determined as described above. A method of decoding the reference coding units may include various image decoding methods.

According to an embodiment, the video decoding apparatus 100 may obtain block shape information indicating the shape of a current coding unit or split shape information indicating a splitting method of the current coding unit, from the bitstream, and may use the obtained information. The block shape information or the split shape information may be included in the bitstream related to various data units. For example, the video decoding apparatus 100 may use the block shape information or the split shape information included in a sequence parameter set, a picture parameter set, a video parameter set, a slice header, or a slice segment header. Furthermore, the video decoding apparatus 100 may obtain, from the bitstream, syntax corresponding to the block shape information or the split shape information according to each largest coding unit, each reference coding unit, or each processing block, and may use the obtained syntax.

While the present disclosure has been particularly shown and described with reference to embodiments thereof, it will be understood by one of ordinary skill in the art that various changes in form and details may be made therein without departing from the scope of the disclosure as defined by the following claims. Therefore, the embodiments should be considered in a descriptive sense only and not for purposes of limitation. The scope of the present disclosure is defined not by the detailed descriptions of the disclosure but by the following claims, and all differences within the scope will be construed as being included in the present disclosure.

Meanwhile, the aforedescribed embodiments of the present disclosure can be written as a program executable on a computer and can be implemented in general-use digital computers that execute the program by using a computer-readable recording medium. Examples of the computer-readable recording medium include magnetic storage media (e.g., ROM, floppy disks, hard disks, etc.), optical recording media (e.g., CD-ROMs, or DVDs), or the like.

The invention claimed is:

1. A video decoding method by a video decoding apparatus comprising a processor, the video decoding method comprising:

obtaining a bitstream including encoding results of a current block;

obtaining a first extended reference block in a first reference picture and a second extended reference block in a second reference picture, wherein the first extended reference block comprises a first reference block and a first portion extended from the first reference block, and the second extended reference block comprises a second reference block and a second portion extended from the second reference block;

determining a displacement vector of a pixel group of the current block, the pixel group comprising at least one pixel adjacent to an inside of a boundary of the current block, by using a gradient value of at least one reference pixel in the first extended reference block and a gradient value of at least one reference pixel in the second extended reference block, wherein the first portion of the first extended reference block is used to calculate a gradient value of at least one reference pixel in the first reference block, and the second portion of the second extended reference block is used to calculate a gradient value of at least one reference pixel in the second reference block;

obtaining a predicted pixel value of the current block by performing optical flow based compensation on the current block by using the gradient value of the at least one reference pixel in the first reference block, the gradient value of the at least one reference pixel in the second reference block, and the displacement vector of the pixel group; and reconstructing the current block based on the predicted pixel value, wherein a size of the pixel group is equal to or greater than 2×2.

2. A video encoding method by a video encoding apparatus comprising a processor, the video encoding method comprising:

obtaining a predicted pixel value of a current block by performing optical flow based compensation on the current block by using a gradient value of at least one reference pixel in a first reference block, a gradient value of at least one reference pixel in a second reference block, and a displacement vector of a pixel group of the current block, the pixel group comprising at least one pixel adjacent to an inside of a boundary of the current block;

encoding the current block based on the predicted pixel value; and generating a bitstream including encoding results of the current block, wherein a first extended reference block in a first reference picture and a second extended reference block in a second reference picture are obtained, wherein the first extended reference block comprises the first reference block and a first portion extended from the first reference block, and the second extended reference block comprises the second reference block and a second portion extended from the second reference block, wherein the displacement vector of the pixel group of the current block is determined by using a gradient value of at least one reference pixel in the first extended reference block and a gradient value of at least one reference pixel in the second extended reference block, wherein the first portion of the first extended reference block is used to calculate the gradient value of the at least one reference pixel in the first reference block, and the second portion of the second extended reference block is used to calculate the gradient value of the at least one reference pixel in the second reference block, wherein a size of the pixel group is equal to or greater than 2×2.

3. A method for transmitting a bitstream, the method comprising:

transmitting the bitstream generated by a video encoding method, wherein the video encoding method comprises:

obtaining a predicted pixel value of a current block by performing optical flow based compensation on the current block by using a gradient value of at least one reference pixel in a first reference block, a gradient value of at least one reference pixel in a second reference block, and a displacement vector of a pixel group of the current block, the pixel group comprising at least one pixel adjacent to an inside of a boundary of the current block;

encoding the current block based on the predicted pixel value; and generating the bitstream including encoding results of the current block, wherein a first extended reference block in a first reference picture and a second extended reference block in a second reference picture are obtained, wherein the first extended reference block comprises the first reference block and a first portion extended from the first reference block, and the second extended reference block comprises the second reference block and a second portion extended from the second reference block, wherein the displacement vector of the pixel group of the current block is determined by using a gradient value of at least one reference pixel in the first extended reference block and a gradient value of at least one reference pixel in the second extended reference block, wherein the first portion of the first extended reference block is used to calculate the gradient value of the at least one reference pixel in the first reference block, and the second portion of the second extended reference block is used to calculate the gradient value of the at least one reference pixel in the second reference block, wherein a size of the pixel group is equal to or greater than 2×2.

\* \* \* \* \*